(12) United States Patent
Huliyar et al.

(10) Patent No.: US 9,377,921 B2
(45) Date of Patent: Jun. 28, 2016

(54) DIGITAL LINK VIEWER

(75) Inventors: Jagadeesh Virupaksha Huliyar, Bangalore (IN); Lam D. Hoang, San Jose, CA (US); Kiran Dintakurthi, Fremont, CA (US); Vasudha N. Bhaskara, Bangalore (IN); Dharmendra Naik, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 814 days.

(21) Appl. No.: 13/538,116

(22) Filed: Jun. 29, 2012

(65) Prior Publication Data
US 2014/0006961 A1    Jan. 2, 2014

(51) Int. Cl.
*G06F 3/048* (2013.01)

(52) U.S. Cl.
CPC ..................................... *G06F 3/048* (2013.01)

(58) Field of Classification Search
CPC .............. H04L 41/22; H04L 12/2602; H04L 12/20602; H04J 14/00; H04Q 11/0067; G06F 11/30; G06F 3/0481; G06F 3/0484; G06F 2201/875
USPC .......................... 715/734–737, 853–855, 969
See application file for complete search history.

(56) References Cited

U.S. PATENT DOCUMENTS

| | | | |
|---|---|---|---|
| 6,625,375 B1 * | 9/2003 | Mahony | 385/135 |
| 6,654,803 B1 * | 11/2003 | Rochford et al. | 709/224 |
| 7,149,975 B1 * | 12/2006 | Johnson et al. | 715/734 |
| 7,962,588 B1 * | 6/2011 | Deopura et al. | 709/223 |
| 8,169,920 B2 * | 5/2012 | Nanjundaswamy et al. | 370/242 |
| 8,861,957 B2 * | 10/2014 | Cavaliere et al. | 398/49 |
| 2004/0073663 A1 * | 4/2004 | Scarth | 709/224 |
| 2007/0109974 A1 * | 5/2007 | Cutillo et al. | 370/254 |
| 2009/0214204 A1 * | 8/2009 | Bengtsson et al. | 398/38 |
| 2012/0087665 A1 * | 4/2012 | Li et al. | 398/79 |

FOREIGN PATENT DOCUMENTS

WO    WO 02075972 A1 *  9/2002

* cited by examiner

*Primary Examiner* — Andrew Tank
(74) *Attorney, Agent, or Firm* — Harrity & Harrity LLP; David L. Soltz

(57) ABSTRACT

A system may receive first user input that identifies an optical route in an optical network, may receive a second user input that identifies a view type, and may provide, based on the first user input and the second user input, a user interface. The user interface may display, based on the identified view type, a representation of components associated with the optical route, a representation of ports on each of the components, a representation of a first parameter associated with each port, and a representation of an optical link associated with the optical route, where the representation of the optical link identifies a port on each of the components that connects the optical link to each of the components.

20 Claims, 54 Drawing Sheets

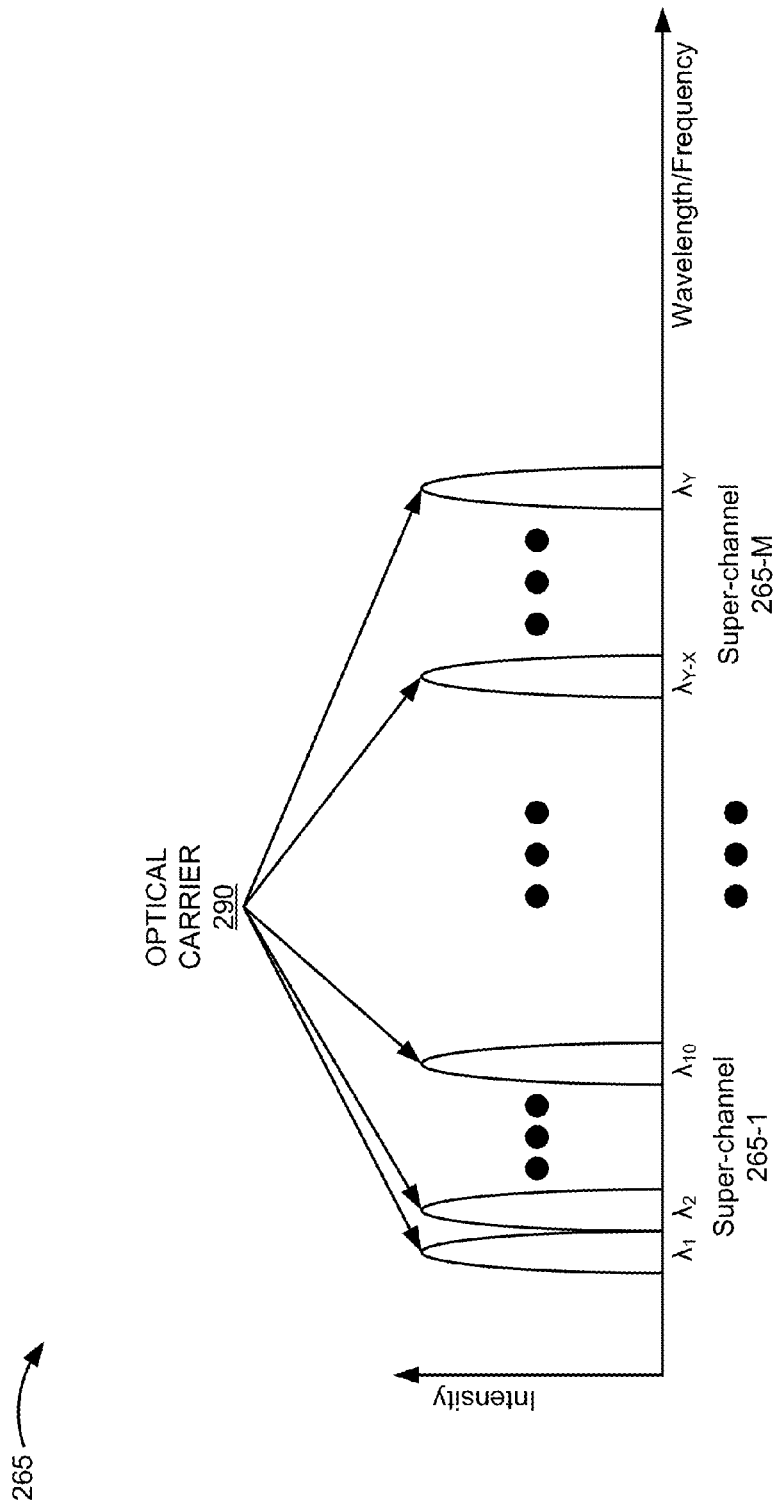

DIGITAL LINK VIEWER

BACKGROUND

In optical networks, signals may be transmitted at various wavelengths, with each wavelength corresponding to a transmission channel. Optical links may connect network nodes so that signals may be transmitted throughout the optical network. An optical route may use a series of network nodes and optical links to connect a source of an optical transmission with a destination for the optical transmission.

SUMMARY

A system may receive first user input that identifies an optical route in an optical network, may receive a second user input that identifies a view type, and may provide, based on the first user input and the second user input, a user interface. The user interface may display, based on the identified view type, a representation of components associated with the optical route, a representation of ports on each of the components, a representation of a first parameter associated with each port, and a representation of an optical link associated with the optical route, where the representation of the optical link identifies a port on each of the components that connects the optical link to each of the components.

BRIEF DESCRIPTION OF DRAWINGS

FIG. 2C is a diagram of example super-channels that may be monitored and/or configured according to implementations described herein;

FIGS. 8, 9A-9C, 10A, 10B, 11, 12A-12D, 13, 14A-14C, 15-18, 19A-19D, 20A, 20B, 21A, 21B, 22A, 22B, 23, 26, 27, 29, and 31-35 are diagrams of example elements of a user interface that displays optical network information; and FIGS. 24, 25, 28, 30, 36A, and 36B are diagrams of example data structures that store information associated with an optical network

DETAILED DESCRIPTION

The following detailed description of example embodiments refers to the accompanying drawings. The same reference numbers in different drawings may identify the same or similar elements.

As used herein, a "route" and/or an "optical route" may correspond to an optical path and/or an optical lightpath. For example, an optical route may specify a path along which light is carried between two or more network entities.

Users of optical networks may want to determine information associated with the optical network. Optical network information may be difficult to obtain, aggregate, and display. Implementations described herein assist a user in obtaining and viewing aggregated optical network information, such as network information associated with network entities and optical links between the network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Figure 1A:
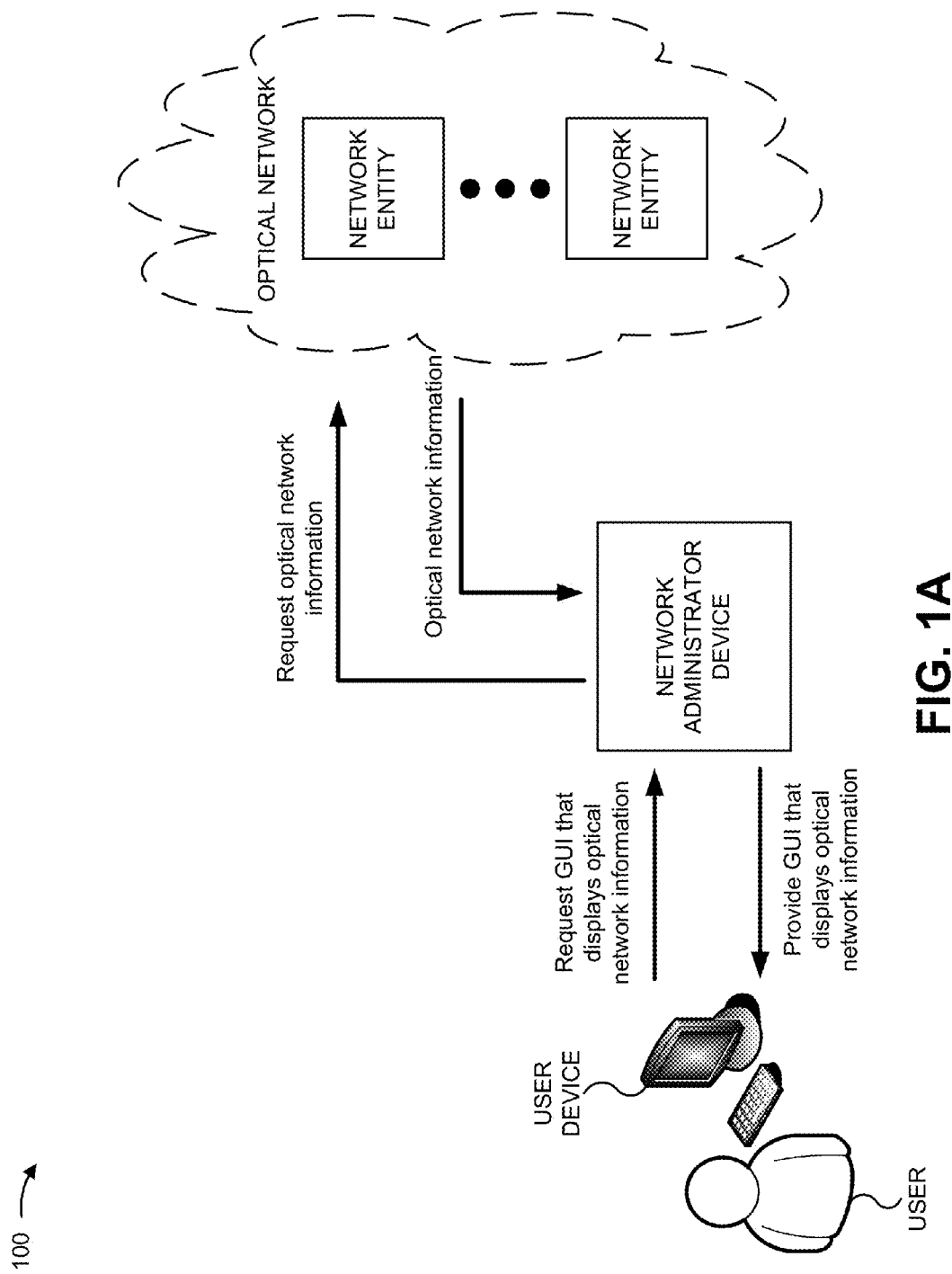
FIGS. 1A and 1B are diagrams of an overview of an implementation described herein.
Figure 1B:
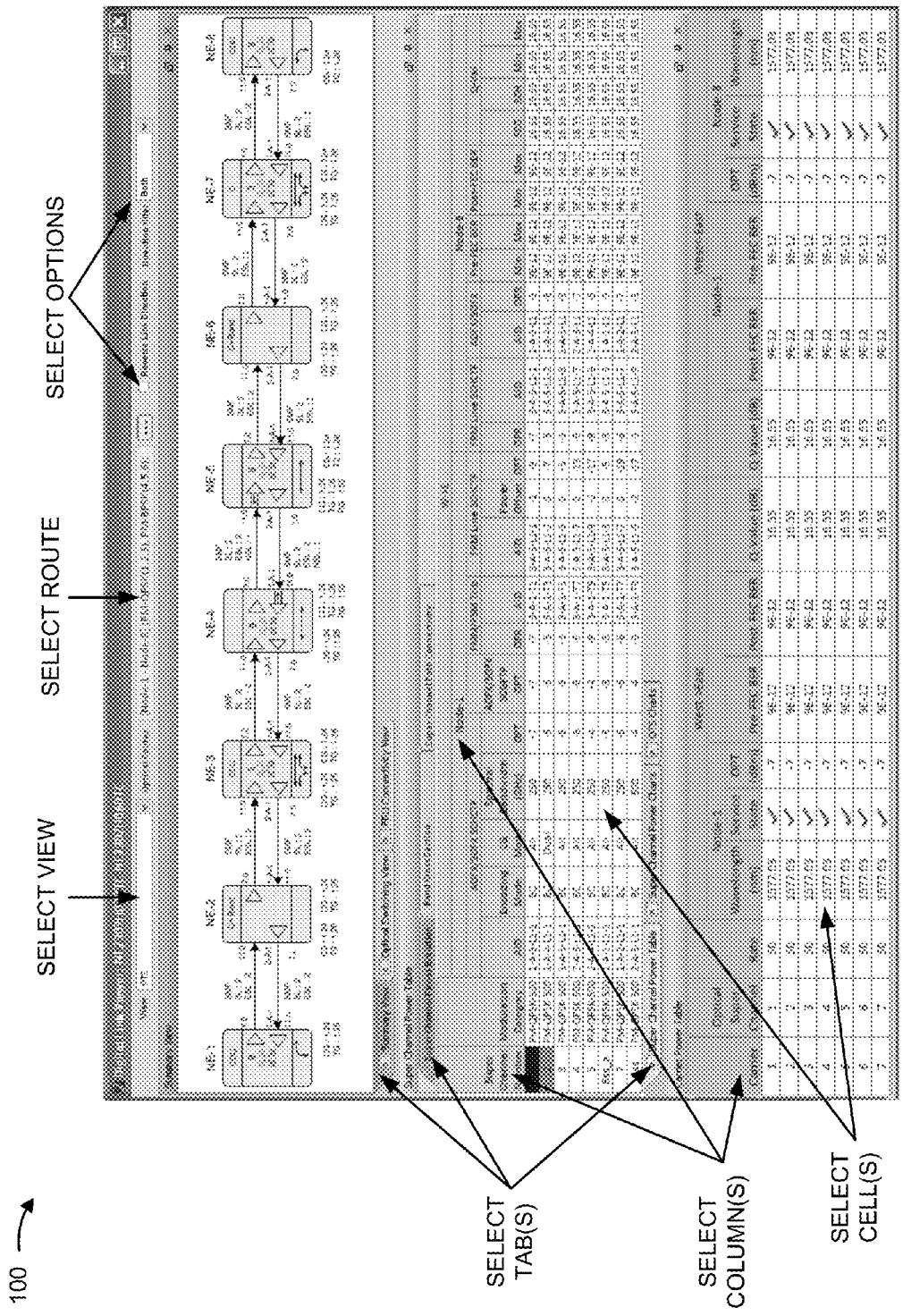

FIGS. 1A and 1B are diagrams of an overview 100 of an implementation described herein. As illustrated in FIG. 1A, a user interacting with a user device may request, from a network administrator device, a graphical user interface ("GUI") that displays optical network information. The network administrator device may request the optical network information from one or more network entities in an optical network. The network administrator device may receive the requested information from the network entities, and may provide the requested GUI to the user device.

As illustrated in FIG. 1B, a user may interact with the GUI via different input mechanisms. For example, a user may select different tabs to change the displayed information on the GUI. The user may select different columns and/or cells in displayed tables to change the displayed information on the GUI. The user may change the displayed information by selecting a view (e.g., from a drop-down box and/or a drop-down menu). The user may change the displayed information by selecting a route to view on the GUI (e.g., a route between different network entities). The user may select different options to change the displayed information on the GUI. Additionally, or alternatively, the user may select other elements displayed on the GUI to change the displayed information on the GUI. In some implementations, a user may change a configuration and/or a parameter associated with a network entity by interacting with the GUI.

Figure 2A:
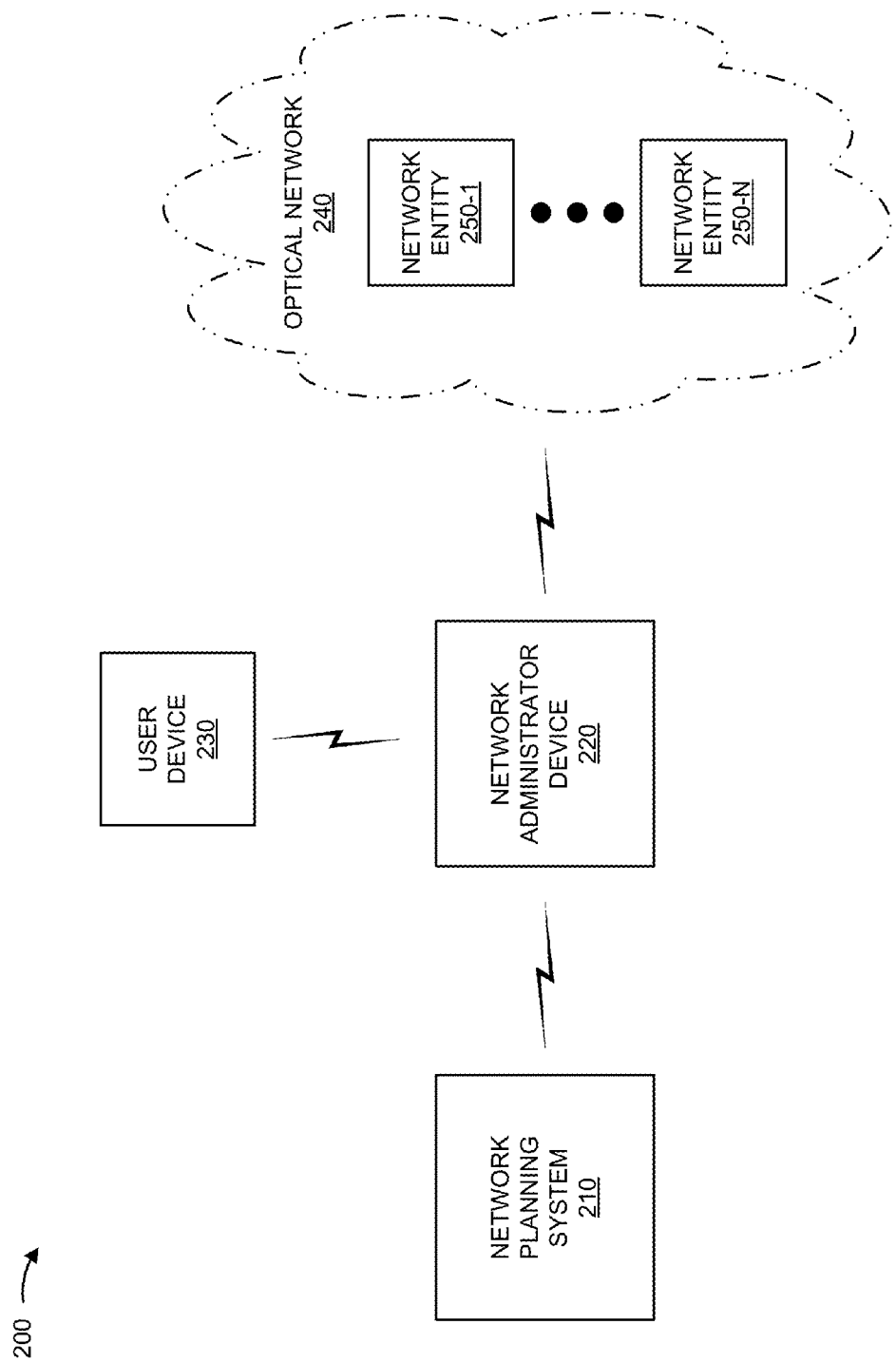
FIG. 2A is a diagram of an example environment in which systems and/or methods described herein may be implemented.

FIG. 2A is a diagram of an example environment 200 in which systems and/or methods described herein may be implemented. Environment 200 may include a network planning system 210 ("NPS 210"), a network administrator device 220 ("NA 220"), a user device 230, and an optical network 240 that includes one or more network entities 250-1 through 250-N (N≥1) (hereinafter referred to individually as "NE 250" and collectively as "NEs 250").

The number of devices and/or networks illustrated in FIG. 2A is provided for explanatory purposes. In practice, there may be additional devices and/or networks, fewer devices and/or networks, different devices and/or networks, or differently arranged devices and/or networks than are shown in FIG. 2A. Furthermore, two or more of the devices illustrated in FIG. 2A may be implemented within a single device, or a single device illustrated in FIG. 2A may be implemented as multiple, distributed devices. Additionally, or alternatively, one or more of the devices of environment 200 may perform one or more functions described as being performed by another one or more of the devices of environment 200. Devices of environment 200 may interconnect via wired connections, wireless connections, or a combination of wired and wireless connections.

NPS 210 may include one or more devices that gather, process, search, store, and/or provide information in a manner described herein. NPS 210 may assist a user in modeling and/or planning an optical network, such as optical network 240. For example, NPS 210 may assist in modeling and/or planning an optical network configuration, which may include quantities, locations, capacities, parameters, and/or configurations of NEs 250, characteristics and/or configurations (e.g., capacities) of optical links between NEs 250, traffic demands of NEs 250 and/or optical links between NEs 250, and/or any other network information associated with optical network 240 (e.g., optical device configurations, digital device configurations, etc.). NPS 210 may provide information associated with optical network 240 to NA 220 so that a user may view, change, and/or interact with the optical network information.

NA 220 may include one or more devices that gather, process, search, store, and/or provide information in a manner described herein. NA 220 may receive the optical network information, and may provide the network information for display on a GUI. For example, NA 220 may receive the optical network information from NPS 210, user device 230, optical network 240, and/or NEs 250. NA 220 may provide the optical network information to another device, such as user device 230, so that a user may interact with the optical network information. NA 220 may receive information associated with changes to optical network 240 from another device (e.g., user device 230). NA 220 may provide information associated with the network changes to optical network 240 and/or NEs 250 in order to configure optical network 240 based on the information associated with network changes. NA 220 may provide information associated with network changes to another device, such as user device 230, so that a user may interact with the changed network information.

User device 230 may include one or more devices that gather, process, search, store, and/or provide information in a manner described herein. In some implementations, user device 230 may include a computer (e.g., a desktop computer, a laptop computer, a tablet computer, etc.), a radiotelephone, a personal communications system ("PCS") terminal (e.g., that may combine a cellular telephone with data processing and data communications capabilities), a personal digital assistant ("PDA") (e.g., that may include a radiotelephone, a pager, Internet/intranet access, etc.), a smart phone, and/or any other type of computation and/or communication device. User device 230 may provide information to and/or receive information from other devices, such as NA 220. For example, user device 230 may receive network information from NA 220, and may send information associated with network changes to NA 220.

Optical network 240 may include any type of network that uses light as a transmission medium. For example, optical network 240 may include a fiber-optic based network, an optical transport network, a light-emitting diode network, a laser diode network, an infrared network, and/or a combination of these or other types of optical networks.

NEs 250 may include one or more devices that gather, process, store, and/or provide information in a manner described herein. For example, NEs 250 may include one or more optical data processing and/or traffic transfer devices, such as an optical node, an optical amplifier (e.g., a doped fiber amplifier, an erbium doped fiber amplifier, a Raman amplifier, etc.), an optical add-drop multiplexer ("OADM"), a reconfigurable optical add-drop multiplexer ("ROADM"), a flexibly reconfigurable optical add-drop multiplexer module ("FRM"), an optical source component (e.g., a laser source), an optical source destination (e.g., a laser sink), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic.

In some implementations, NEs 250 may include OADMs and/or ROADMs capable of being configured to add, drop, multiplex, and demultiplex optical signals. NEs 250 may process and transmit optical signals to other NEs 250 throughout optical network 240 in order to deliver optical transmissions.

Figure 2B:
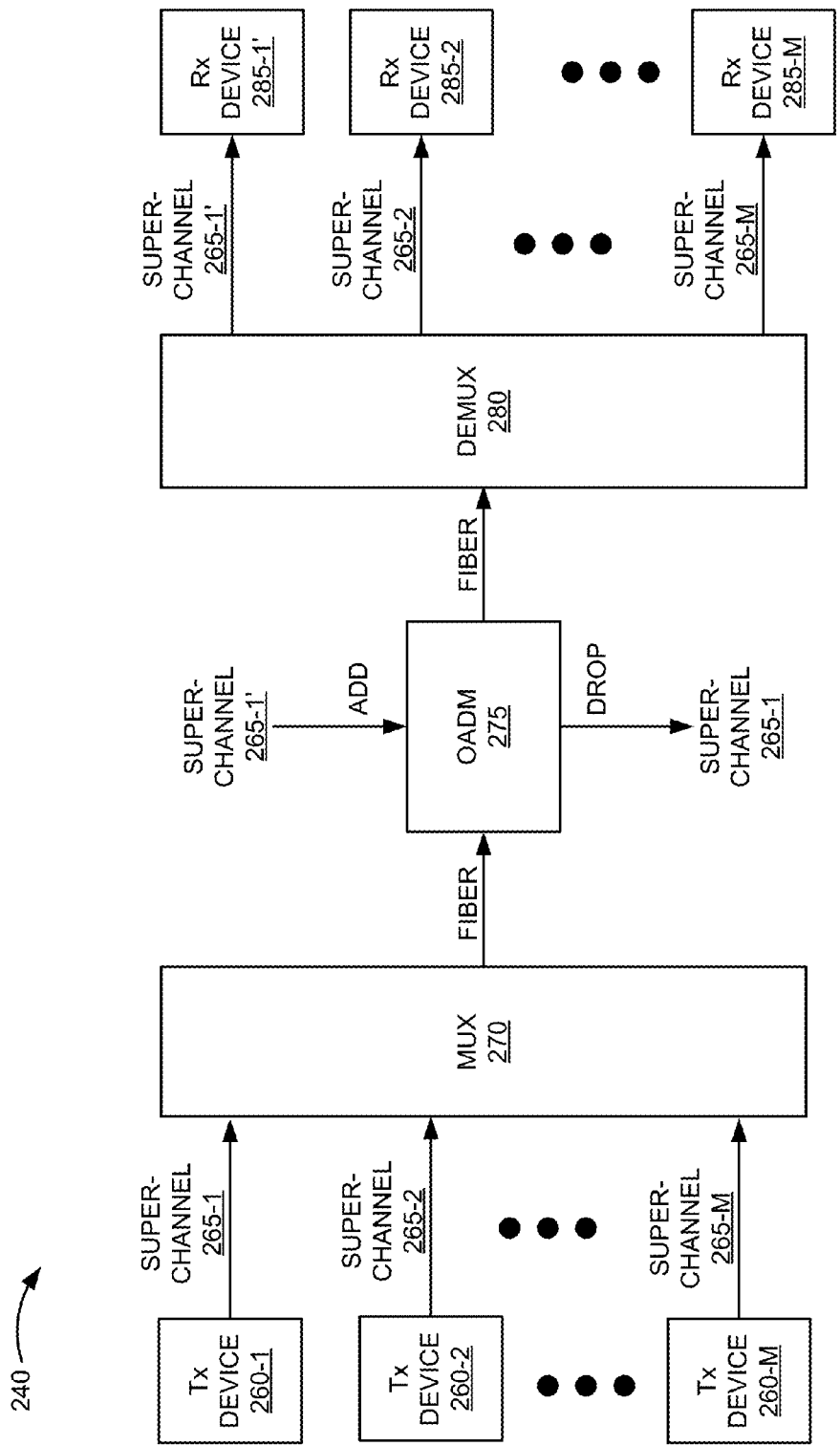
FIG. 2B is a diagram of example devices of an optical network that may be monitored and/or configured according to implementations described herein.

FIG. 2B is a diagram of example devices of optical network 240 that may be monitored and/or configured according to implementations described herein. One or more devices illustrated in FIG. 2B may operate within optical network 240, and may correspond to NEs 250. Optical network 240 may include one or more optical transmitter devices 260-1 through 260-M (M≥1) (hereinafter referred to individually as "Tx device 260" and collectively as "Tx devices 260"), one or more super-channels 265-1 through 265-M (M≥1) (hereinafter referred to individually as "super-channel 265" and collectively as "super-channels 265"), a multiplexer ("MUX") 270, an OADM 275, a demultiplexer ("DEMUX") 280, and one or more optical receiver devices 285-1 through 285-M (M≥1) (hereinafter referred to individually as "Rx device 285" and collectively as "Rx devices 285").

The number of devices illustrated in FIG. 2B is provided for explanatory purposes. In practice, there may be additional devices, fewer devices, different devices, or differently arranged devices than are shown in FIG. 2B. Furthermore, two or more of the devices illustrated in FIG. 2B may be implemented within a single device, or a single device illustrated in FIG. 2B may be implemented as multiple, distributed devices. Additionally, one or more of the devices illustrated in FIG. 2B may perform one or more functions described as being performed by another one or more of the devices illustrated in FIG. 2B. Devices illustrated in FIG. 2B may interconnect via wired connections (e.g., fiber-optic connections).

Tx device 260 may correspond to NE 250. For example, Tx device 260 may include an optical transmitter and/or an optical transceiver that generates an optical signal. One or more optical signals may be carried via super-channel 265. In some implementations, Tx device 260 may be associated with one super-channel 265. Additionally, or alternatively, Tx device 260 may be associated with multiple super-channels 265.

Additionally, or alternatively, multiple Tx devices 260 may be associated with one super-channel 265.

FIG. 2C is a diagram of example super-channels 265 that may be monitored and/or configured according to implementations described herein. A super-channel, as used herein, may refer to multiple optical carriers that are simultaneously transported over the same optical waveguide (e.g., a single mode optical fiber). Each optical carrier included in a super-channel may be associated with a particular optical wavelength (or set of optical wavelengths). The multiple optical carriers may be combined to create a super-channel using wavelength division multiplexing. For example, the multiple optical carriers may be combined using dense wavelength division multiplexing, in which carrier-to-carrier spacing may be less than 1 nanometer. In some implementations, each optical carrier may be modulated to carry an optical signal.

An example frequency and/or wavelength spectrum associated with super-channels 265 is illustrated in FIG. 2C. In some implementations, the frequency and/or wavelength spectrum may be associated with a particular optical spectrum (e.g., C Band, C+Band, CDC Band, etc.). As illustrated, super-channel 265-1 may include multiple optical carriers 290, each of which corresponds to a wavelength λ (e.g., $\lambda_1$, $\lambda_2$, through $\lambda_{10}$) within a first wavelength band. Similarly, super-channel 265-M may include multiple optical carriers 290, each of which corresponds to a wavelength λ (e.g., $\lambda_1$, $\lambda_2$, through $\lambda_y$) within a second wavelength band. The quantity of illustrated optical carriers 290 per super-channel 265 is provided for explanatory purposes. In practice, super-channel 265 may include any quantity of optical carriers 290.

Optical carrier 290 may be associated with a particular frequency and/or wavelength of light. In some implementations, optical carrier 290 may be associated with a frequency and/or wavelength at which the intensity of light carried by optical carrier 290 is strongest (e.g., a peak intensity, illustrated by the peaks on each optical carrier 290). In some implementations, optical carrier 290 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., $\lambda_1$ and $\lambda_2$) may be equal to or substantially equal to a bandwidth (or bit rate) associated with a data stream carried by optical carrier 290. For example, assume each optical carrier 290 included in super-channel 265-1 (e.g., $\lambda_1$ through $\lambda_{10}$) is associated with a 50 Gigabit per second ("Gbps") data stream. In this example, super-channel 265-1 may have a collective data rate of 500 Gbps (e.g., 50 Gbps× 10). In some implementations, the collective data rate of super-channel 265 may be greater than or equal to 100 Gbps. Additionally, or alternatively, the spacing between adjacent wavelengths may be non-uniform, and may vary within a particular super-channel band (e.g., super-channel 265-1). In some implementations, optical carriers 290 included in super-channel 265 may be non-adjacent (e.g., may be associated with non-adjacent wavelengths in an optical spectrum).

Returning to FIG. 2B, each super-channel 265 may be provisioned in optical network 240 as one optical channel and/or as an individual optical channel. Provisioning of an optical channel may include designating a route and/or path for the optical channel through optical network 240. For example, an optical channel may be provisioned to be transmitted via a set of NEs 250. In some implementations, NEs 250 may be configured as a ring. Additionally, or alternatively, NEs 250 may be configured in a point-to-point configuration. Provisioning may be referred to as "allocating" and/or "allocation" herein. Even though each super-channel 265 is a composite of multiple optical carriers 290, the optical carriers 290 included in super-channel 265 may be routed together through optical network 240. Additionally, or alternatively, super-channel 265 may be managed and/or controlled in optical network 240 as though it included one optical channel and/or one optical carrier at one wavelength.

MUX 270 may correspond to NE 250. For example, MUX 270 may include an optical multiplexer that combines multiple input super-channels 265 for transmission over an output fiber.

OADM 275 may correspond to NE 250. For example, OADM 275 may include a remotely reconfigurable optical add-drop multiplexer. OADM 275 may multiplex, de-multiplex, add, drop, and/or route multiple super-channels 265 into and/or out of a fiber (e.g., a single mode fiber). As illustrated, OADM 275 may drop super-channel 265-1 from a fiber, and may allow super-channels 265-2 through 265-M to continue propagating toward Rx device 285. Dropped super-channel 265-1 may be provided to a device (not shown) that may demodulate and/or otherwise process super-channel 265-1 to output the data stream carried by super-channel 265-1. As illustrated, super-channel 265-1 may be provisioned for transmission from Tx device 260-1 to OADM 275, where super-channel 265-1 may be dropped.

As further illustrated in FIG. 2B, OADM 275 may add super-channel 265-1' (e.g., $265\text{-}1^{prime}$) to the fiber. Super-channel 265-1' may include optical carriers 290 at the same or substantially the same wavelengths as super-channel 265-1. Super-channel 265-1' and super-channels 265-2 through 265-M may propagate to DEMUX 280.

DEMUX 280 may correspond to NE 250. For example, DEMUX 280 may include an optical de-multiplexer that separates multiple super-channels 265 carried over an input fiber. For example, DEMUX 280 may separate super-channels 265-1' and super-channels 265-2 through 265-M, and may provide each super-channel 265 to a corresponding Rx device 285.

Rx device 285 may correspond to NE 250. For example, Rx device 285 may include an optical receiver and/or an optical transceiver that receives an optical signal. One or more optical signals may be received at Rx device 285 via super-channel 265. Rx device 285 may convert a super-channel 265 into one or more electrical signals, which may be processed to output the information associated with each data stream carried by optical carriers 290 included in super-channel 265. In some implementations, Rx device 285 may be associated with one super-channel 265. Additionally, or alternatively, Rx device 285 may be associated with multiple super-channels 265. Additionally, or alternatively, multiple Rx devices 285 may be associated with one super-channel 265.

Figure 3:
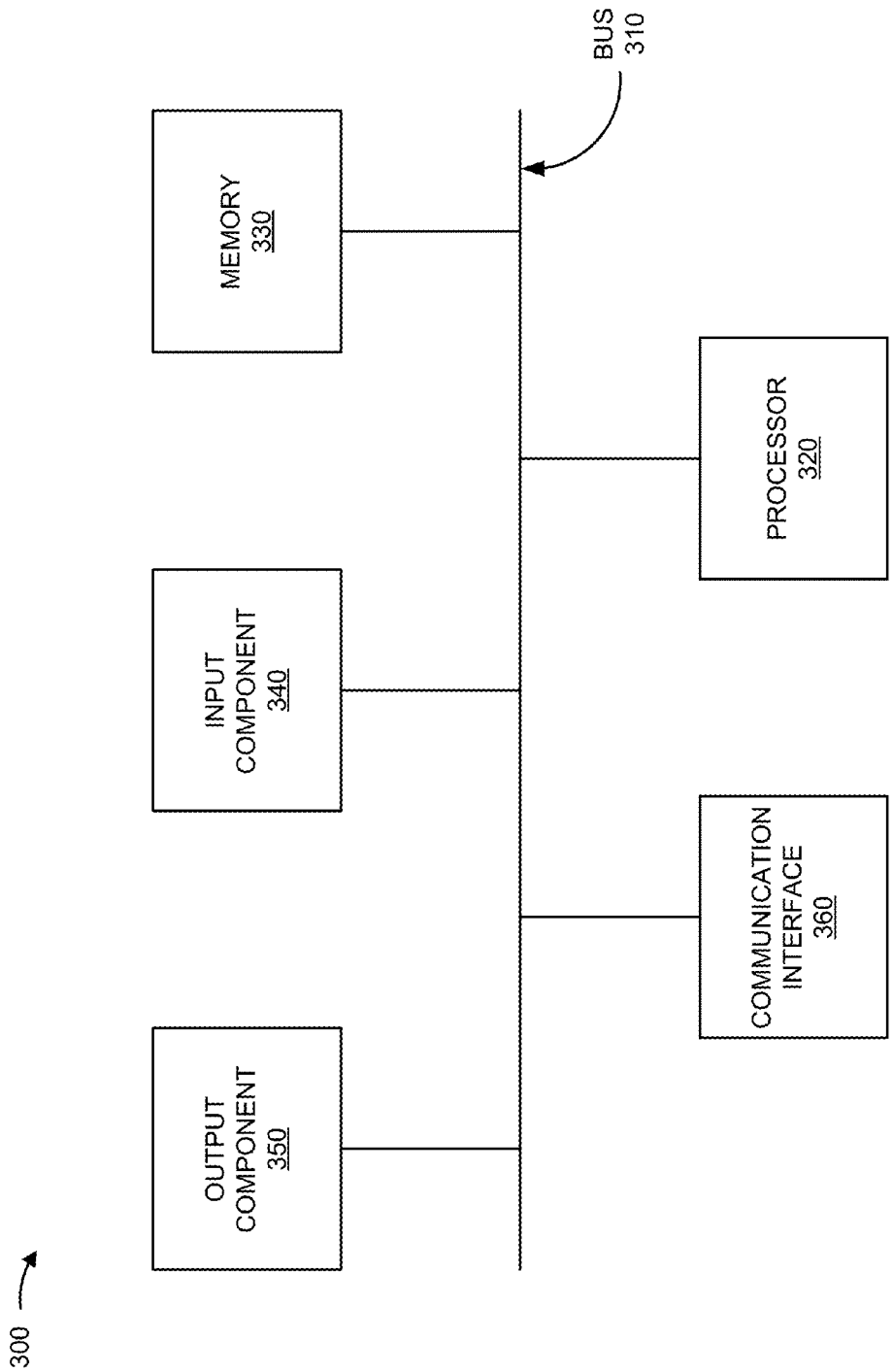
FIG. 3 is a diagram of example components of one or more devices and/or systems of FIG. 2A and/or FIG. 2B.

FIG. 3 is a diagram of example components of a device 300. Device 300 may correspond to NPS 210, NA 220, user device 230, and/or NE 250. Additionally, or alternatively, each of NPS 210, NA 220, user device 230, and/or NEs 250 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than those illustrated in FIG. 3.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and executes instructions. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information (e.g., a display, a speaker, one or more light-emitting diodes ("LEDs"), etc.). Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include mechanisms for communicating with another device and/or system via a network, such as optical network 240. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

Figure 4:
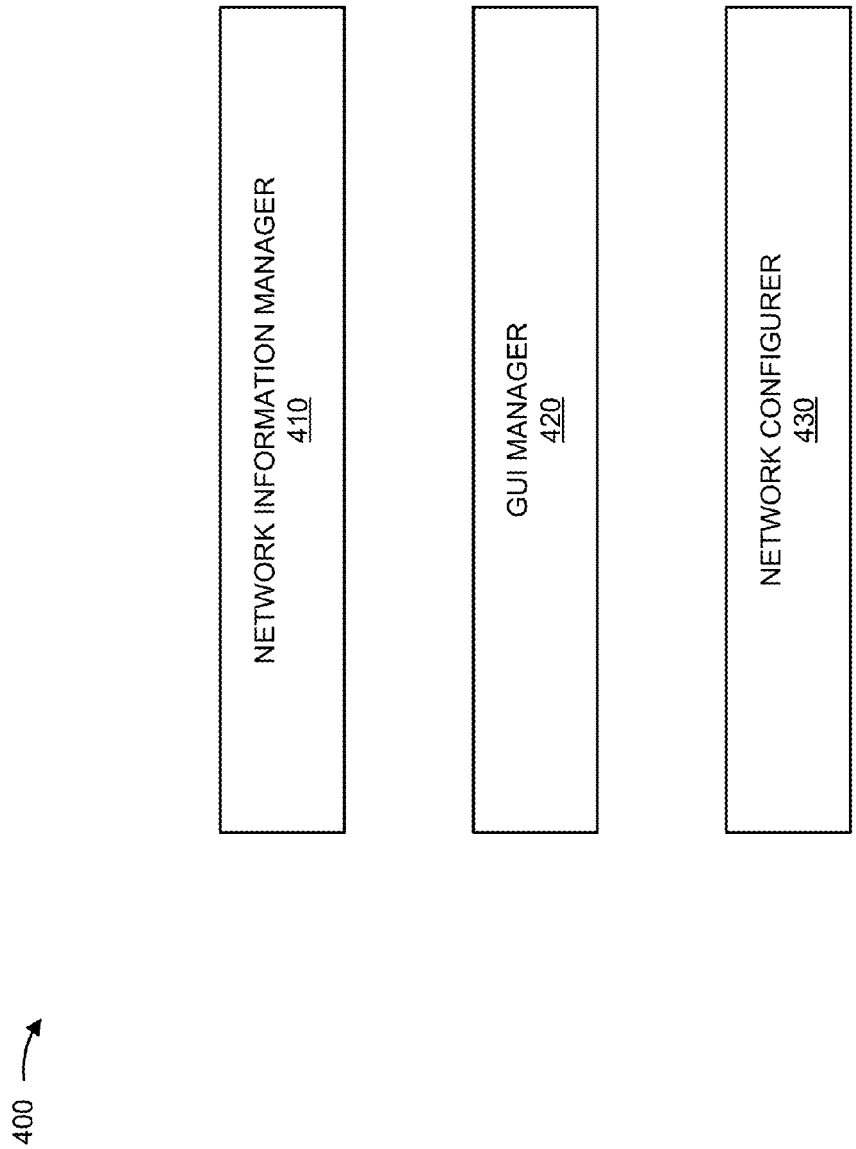
FIG. 4 is a diagram of example functional components of one or more devices of FIG. 2A and/or FIG. 2B.

FIG. 4 is a diagram of example functional components of a device 400 that may correspond to NA 220 and/or user device 230. As illustrated, device 400 may include a network information manager 410, a GUI manager 420, and a network configurer 430. Each of functional components 410-430 may be implemented using one or more components of device 300. NA 220 and/or user device 230 may individually include all of the functional components illustrated in FIG. 4, or the functional components illustrated in FIG. 4 may be distributed singularly or duplicatively in any manner between the devices illustrated in FIG. 2A. In some implementations, NA 220 and/or user device 230 may include other functional components (not shown) that aid in managing optical network information and/or providing optical network information for display.

Network information manager 410 ("NIM 410") may perform operations associated with managing network information. In some implementations, NIM 410 may receive network information from NPS 210 and/or NEs 250.

Network information received from NPS 210 may include quantities, locations, capacities, parameters, and/or configurations of NEs 250; characteristics and/or configurations (e.g., capacities) of optical links between NEs 250; traffic demands of NEs 250 and/or optical links between NEs 250, and/or any other network information associated with optical network 240 (e.g., optical device configurations, digital device configurations, etc.). In some implementations, a user may model and/or plan optical network 240 using NPS 210. NIM 410 may receive the network information modeled and/or planned using NPS 210, thus providing initial network information to NIM 410.

The initial network information provided to NIM 410 may be supplemented with network information received from NEs 250. For example, NEs 250 may provide real-time network deployment information to update the initial network information provided by NPS 210. For example, NIM 410 may receive network information from NEs 250 that identifies newly-deployed NEs 250 and/or new optical links between NEs 250. Additionally, or alternatively, NIM 410 may receive other network information from NEs 250, such as operational information associated with NEs 250 and/or optical links (e.g., optical link allocation information).

NIM 410 may transmit the network information received from NPS 210 and/or NEs 250 to GUI manager 420 to provide a GUI that displays network information (e.g., on NA 220 and/or user device 230).

GUI manager 420 may perform operations associated with managing a GUI that displays network information. GUI manager 420 may receive network information from NIM 410, and may provide the network information for display on a device, such as NA 220 and/or user device 230. GUI manager 420 may receive a user request for information (e.g., via the GUI), and may provide the requested information for display on the GUI. Additionally, or alternatively, GUI manager 420 may receive information associated with changes to a network configuration from a user interacting with a GUI (e.g., via NA 220 and/or user device 230). GUI manager 420 may provide the information associated with the network configuration changes to network configurer 430 so that optical network 240 and/or NEs 250 may be configured in accordance with the changes.

Network configurer 430 may perform operations associated with configuring an optical network and/or a network entity associated with an optical network. For example, network configurer 430 may aid in configuring optical network 240 and/or NEs 250. Network configurer 430 may receive information associated with network configuration changes from GUI manager 420. Network configurer 430 may communicate the information associated with the changes to NEs 250 (and/or other devices in optical network 240) so that NEs 250 may adjust their configuration in accordance with the network configuration changes. For example, network configurer 430 may provide instructions to NEs 250 that indicate that NEs 250 are to change a particular parameter. In some implementations, network configurer 430 may receive information validating a changed configuration from NEs 250, and may provide the configuration validation information to GUI manager 420 so that the validated changes may be displayed on a GUI (e.g., on NA 220 and/or user device 230).

Figure 5:
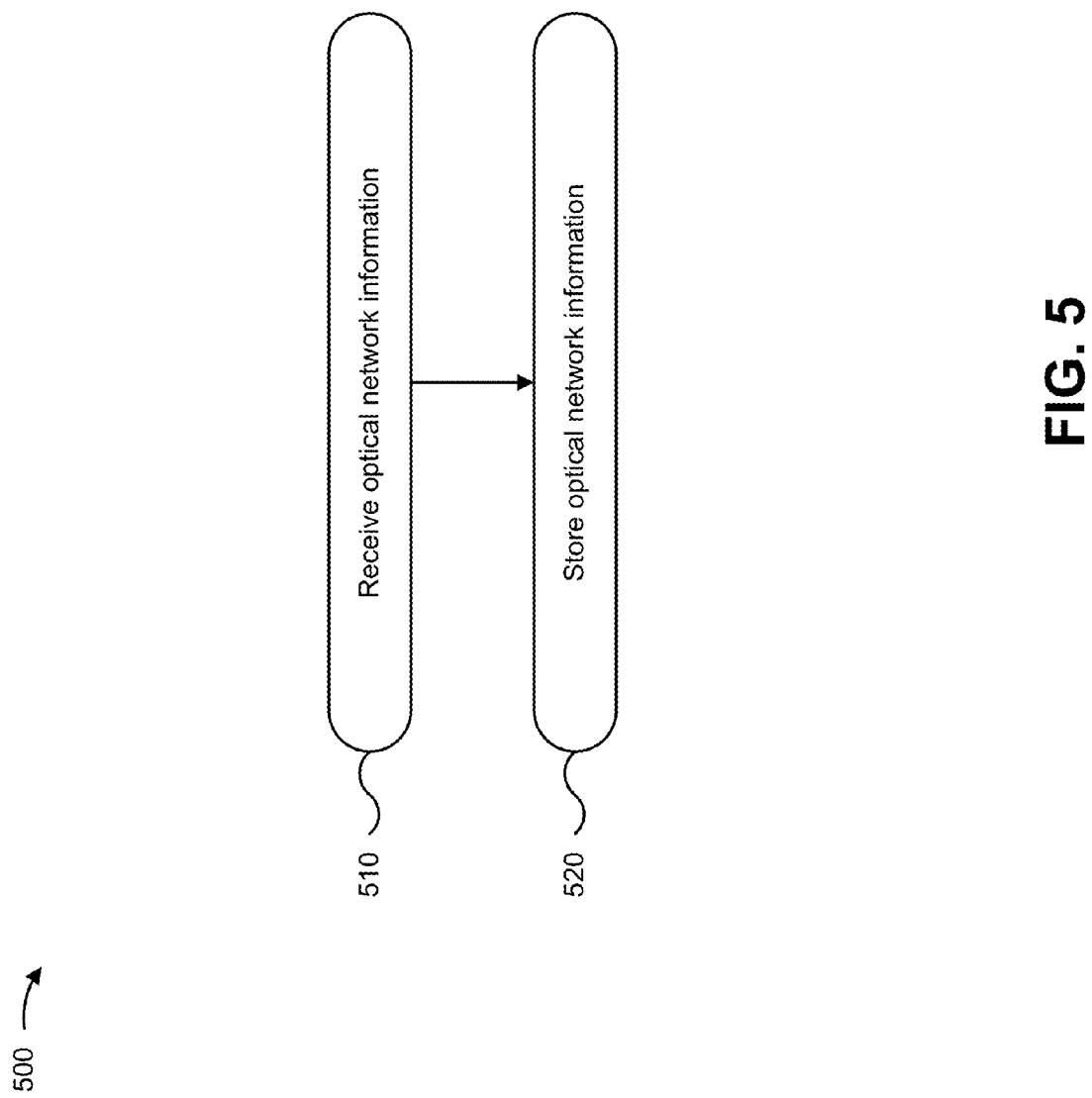
FIG. 5 is a diagram of an example process for receiving and storing optical network information.

FIG. 5 is a diagram of an example process 500 for receiving and storing optical network information. In some implementations, one or more process blocks of FIG. 5 may be performed by one or more components of NA 220 and/or user device 230.

Process 500 may include receiving optical network information (block 510). For example, NIM 410 may receive the optical network information from NPS 210 and/or NEs 250. NIM 410 may request the network information on a periodic basis (e.g., every second, every minute, every hour, every day, every week, etc.). Additionally, or alternatively, NIM 410 may request the network information in response to a user request for the network information. Additionally, or alternatively, NPS 210 and/or NEs 250 may automatically provide the network configuration information to NIM 410 (e.g., on a periodic basis and/or when a configuration is changed).

Process 500 may include storing the optical network information (block 520). For example, NIM 410 may store the optical network information in a memory associated with NA 220 and/or user device 230. For example, NIM 410 may store network information associated with NEs 250 and/or optical links between NEs 250, allocation statuses of optical links, alert information associated with NEs 250 and/or optical links, etc. NIM 410 may associate the stored information with a particular NE 250 and/or a particular optical route. An optical route may refer to a series of NEs 250 that connect a source NE 250 to a destination NE 250 for a particular optical transmission.

Figure 6:
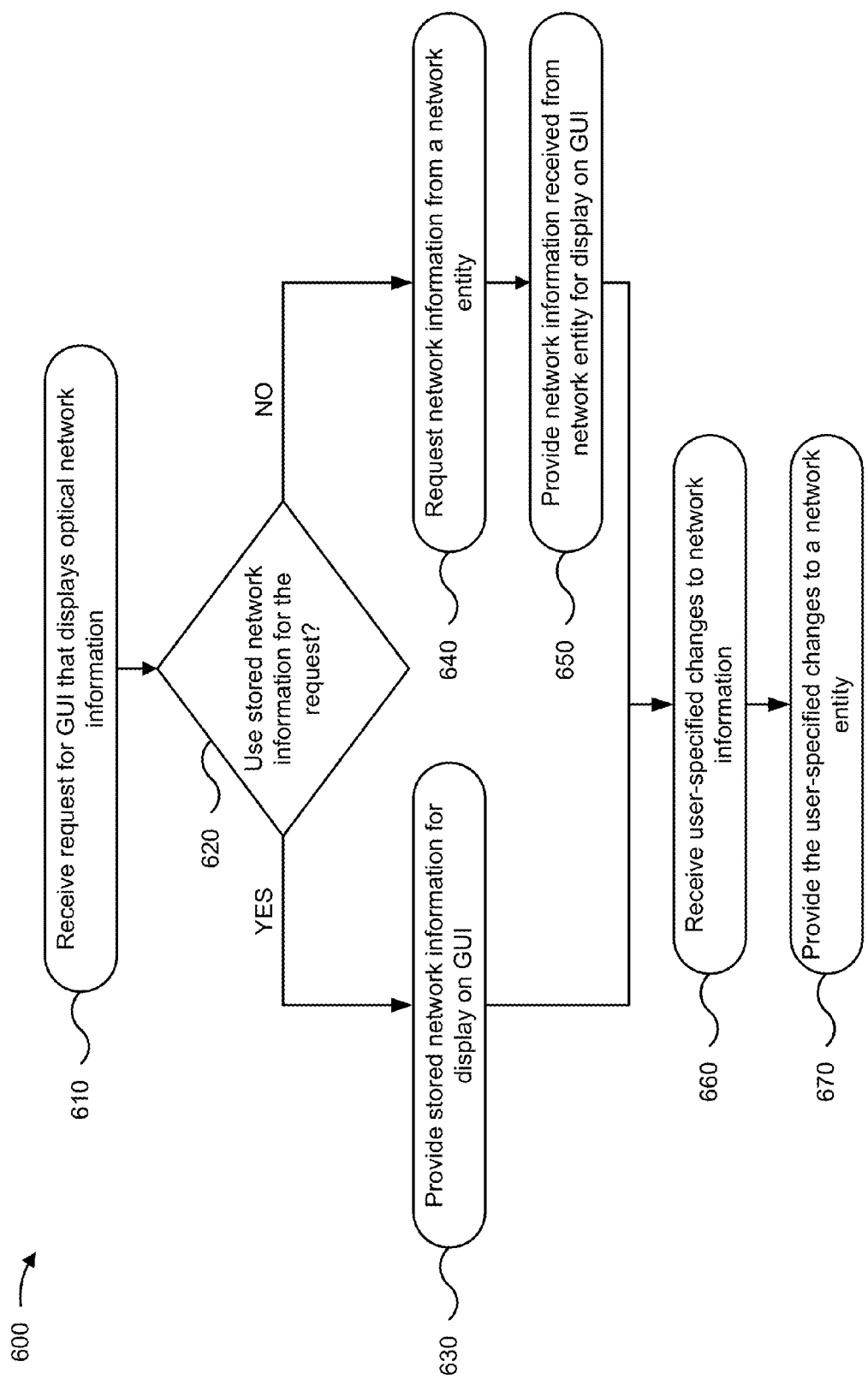
FIG. 6 is a diagram of an example process for providing a user interface that displays optical network information.

FIG. 6 is a diagram of an example process 600 for providing a user interface that displays optical network information. In some implementations, one or more process blocks of FIG. 6 may be performed by one or more components of NA 220 and/or user device 230.

Process 600 may include receiving a request for a GUI that displays optical network information (block 610). In some implementations, GUI manager 420 may receive a request from a user (e.g., interacting with a GUI on NA 220 and/or user device 230) for a GUI that displays network information associated with a particular optical route. For example, a user may specify an optical route using a GUI (e.g., using a button, a drop-down menu or box, a link, a text box, etc.). The user may specify a particular optical route, NEs 250 associated with an optical route, optical links associated with an optical route, and/or any other information associated with an optical route. In some implementations, GUI manager 420 may authenticate the user (e.g., using a user name and/or password). Additionally, or alternatively, GUI manager 420 may provide the user request to NIM 410.

Process 600 may include determining whether to use stored network information for the request (block 620). In some implementations, NIM 410 may determine whether to use stored network information based on whether the requested information is stored in a memory (e.g., a memory associated with NA 220 and/or user device 230). Additionally, or alternatively, NIM 410 may determine whether to use stored network information based on a period of time that has passed since the network information and/or the requested information stored in the memory was last updated. Additionally, or alternatively, NIM 410 may receive user input indicating whether to use stored network information or to request network information from NEs 250.

If NIM 410 determines that stored network information should be used (block 620—YES), process 600 may include providing the stored network information for display on a GUI (block 630). In some implementations, NIM 410 may provide the stored network information to GUI manager 420 for display on a device (e.g., NA 220 and/or user device 230). Additionally, or alternatively, NIM 410 may provide GUI manager 420 with information that identifies a date and/or time associated with the stored network information (e.g., when the stored network information was last updated).

If NIM 410 determines that stored network information should not be used (block 620—NO), process 600 may include requesting the optical network information from a network entity (block 640). In some implementations, NIM 410 may request user-specified network information from NEs 250 associated with a user-specified optical route. NIM 410 may receive the requested network information from NEs 250, and may provide the network information to GUI manager 420. In some implementations, NIM 410 may periodically request and/or receive network information from NEs 250 and provide the network information to GUI manager 420 for display on a GUI. Additionally, or alternatively, NIM 410 may receive network information from NEs 250 when there is a change to the network information so that the GUI may display real-time network information.

Process 600 may include providing the network information received from the network entity for display on a GUI (block 650). In some implementations, NIM 410 may provide the received network information to GUI manager 420 for display on a device (e.g., NA 220 and/or user device 230). Additionally, or alternatively, NIM 410 may provide a combination of stored network information and network information received from NEs 250 to GUI manager 420 for display on a device (e.g., NA 220 and/or user device 230). When information and/or a configuration associated with NEs 250 changes, the GUI may be updated to display real-time information associated with NEs 250.

Process 600 may include receiving user-specified changes to the network information (block 660). In some implementations, GUI manager 420 and/or network configurer 430 may receive input from a user, via the GUI, that specifies a change to a parameter associated with an NE 250. For example, a user may specify a change to a power parameter, a gain parameter, or any other parameter associated with an NE 250. Additionally, or alternatively, a user may specify whether a parameter should be automatically adjusted on an NE 250 based on a network condition.

Process 600 may include providing the user-specified changes to a network entity (block 670). In some implementations, network configurer 430 may provide information associated with a user-specified parameter to NE 250 so that NE 250 may update its configuration based on the user-specified parameter. Network configurer 430 may instruct NE 250 to update a parameter according to user input.

Figure 7:
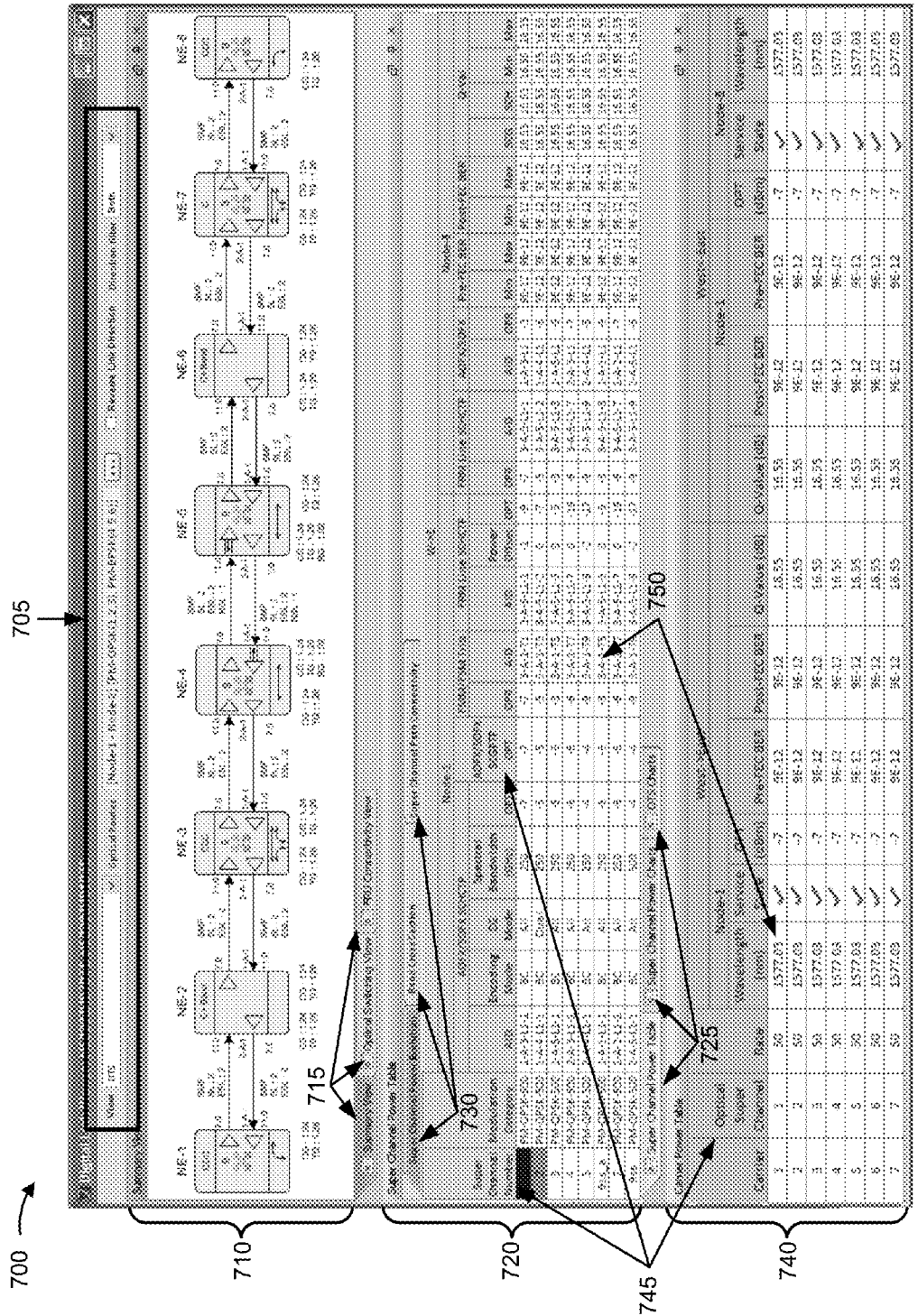
FIG. 7 is a diagram of an example user interface that displays optical network information.

FIG. 7 is a diagram of an example user interface 700 ("UI 700") that may display optical network information. In some implementations, UI 700 may be displayed by NA 220 and/or user device 230. As illustrated, UI 700 may include a user input element 705, a graphical element 710, a tab element 715, a chart element 720, a tab element 725, a tab element 730, a table element 740, a column element 745, and a cell element 750. Additionally, or alternatively, UI 700 may include fewer elements, additional elements, different elements, or differently arranged elements than those illustrated in FIG. 7. UI 700 may be updated in real-time and/or periodically to provide current network configuration information.

User input element 705 may provide one or more mechanisms (e.g., a drop-down box, a button, a menu, a link, a text box, a check box, a list box, a tab, etc.) for a user to provide input. The information displayed on UI 700 may be based on the user input. For example, a user may input an optical route, a set of NEs 250, and/or a set of optical links (e.g., between a set of NEs 250). In some implementations, UI 700 may provide a mechanism for a user to launch another user interface that may assist a user in selecting an optical route, a set of NEs 250, and/or a set of optical links. The user input may be displayed on UI 700. Additionally, or alternatively, information associated with the user inputted optical route, set of NEs 250, and/or set of optical links may be displayed on UI 700. In some implementations, UI 700 may provide display options. Information displayed on UI 700 and/or the manner in which information is displayed on UI 700 may be based on a user-specified display option.

Graphical element 710 may display a representation of an optical route, NEs 250 associated with an optical route, and/or optical links associated with an optical route. The representation may include information associated with the optical route, the NEs 250, and/or the optical links. Graphical element 710 may display the representation based on user input (e.g., via user input element 705). For example, a user may input an optical route, one or more NEs 250, one or more optical links, etc., using user input element 705.

In some implementations, graphical element 710 may display a particular representation based on user input. For example, graphical element 710 may display a summary view (discussed herein in connection with FIGS. 8, 9A-9C, 10A, and 10B), an optical switching view (discussed herein in connection with FIGS. 11 and 12A-12D), and/or a field replaceable unit ("FRU") connectivity view (discussed herein in connection with FIGS. 13. 14A-C, 15-18, 19A, 19B, 20A, 20B, 21A, 21B, 22A, and 22B). In some implementations, a user may select a tab element 715, and graphical element 710 may display a particular representation based on the user selection. Additionally, or alternatively, graphical element 710 may display a particular representation based on user input via user input element 705.

Chart element 720 may display information associated with an optical route, information associated with NEs 250, and/or information associated with optical links. Chart element 720 may display the information based on user input (e.g., via user input element 705, a selection of an item in graphical element 710, etc.).

In some implementations, chart element 720 may display a particular table based on user input. For example, chart element 720 may display a power evolution table (discussed herein in connection with FIGS. 23-26), a band cross-section table, (discussed herein in connection with FIGS. 27 and 28), and/or a path connectivity table (discussed herein in connection with FIGS. 29 and 30). In some implementations, a user may select a tab element 725 and/or a tab element 730, and chart element 720 may display a particular table based on the user selection. In some implementations, tab element 730 may display a different set of tabs based on user selection of tab element 725.

Additionally, or alternatively, chart element 720 may display a particular graph based on user input. For example, chart element 720 may display an optical link power graph (discussed herein in connection with FIG. 31), a band cross-section graph (discussed herein in connection with FIG. 32), an optical transport system power graph (discussed herein in connection with FIG. 33), and/or a gain/loss graph (discussed herein in connection with FIG. 34). In some implementations, a user may select a tab element 725 and/or a tab element 730, and chart element 720 may display a particular graph based on the user selection. In some implementations, tab element 730 may display different sets of tabs based on user selection of tab element 725.

Table element 740 may display information associated with an optical route, information associated with NEs 250, and/or information associated with optical links. Table element 740 may display the information based on user input (e.g., via user input element 705, a selection of an item in graphical element 710 and/or chart element 720, etc.). In some implementations, table element 740 may display a carrier power table (discussed herein in connection with FIGS. 35, 36A, and 36B).

In some implementations, chart element 720 and/or table element 740 may contain one or more column elements 745 and/or cell elements 750. Column element 745 and/or cell element 750 may provide one or more mechanisms (e.g., a clickable element, a selectable element, a link, etc.) for a user to provide input. The information displayed on UI 700 and/or the manner in which information is displayed on UI 700 may be based on the user input. For example, a user may input, via column element 745 and/or cell element 750, an optical route, a set of network nodes (e.g., NEs 250), a set of optical links between network nodes, etc., which may be displayed on UI 700 (e.g., in graphical element 710, chart element 720, and/or table element 740).

In some implementations, a user may change a parameter associated with an NE 250 and/or an optical link by interacting with UI 700. For example, UI 700 may provide a mechanism (e.g., a button, a clickable element, a text box, a link, etc.) for a user to change a parameter. In some implementations, the mechanism may launch another user interface that may assist a user in changing a parameter. Additionally, or alternatively, the mechanism may allow a user to directly edit a parameter via UI 700 (e.g., by changing the value of a cell element).

Figure 8:
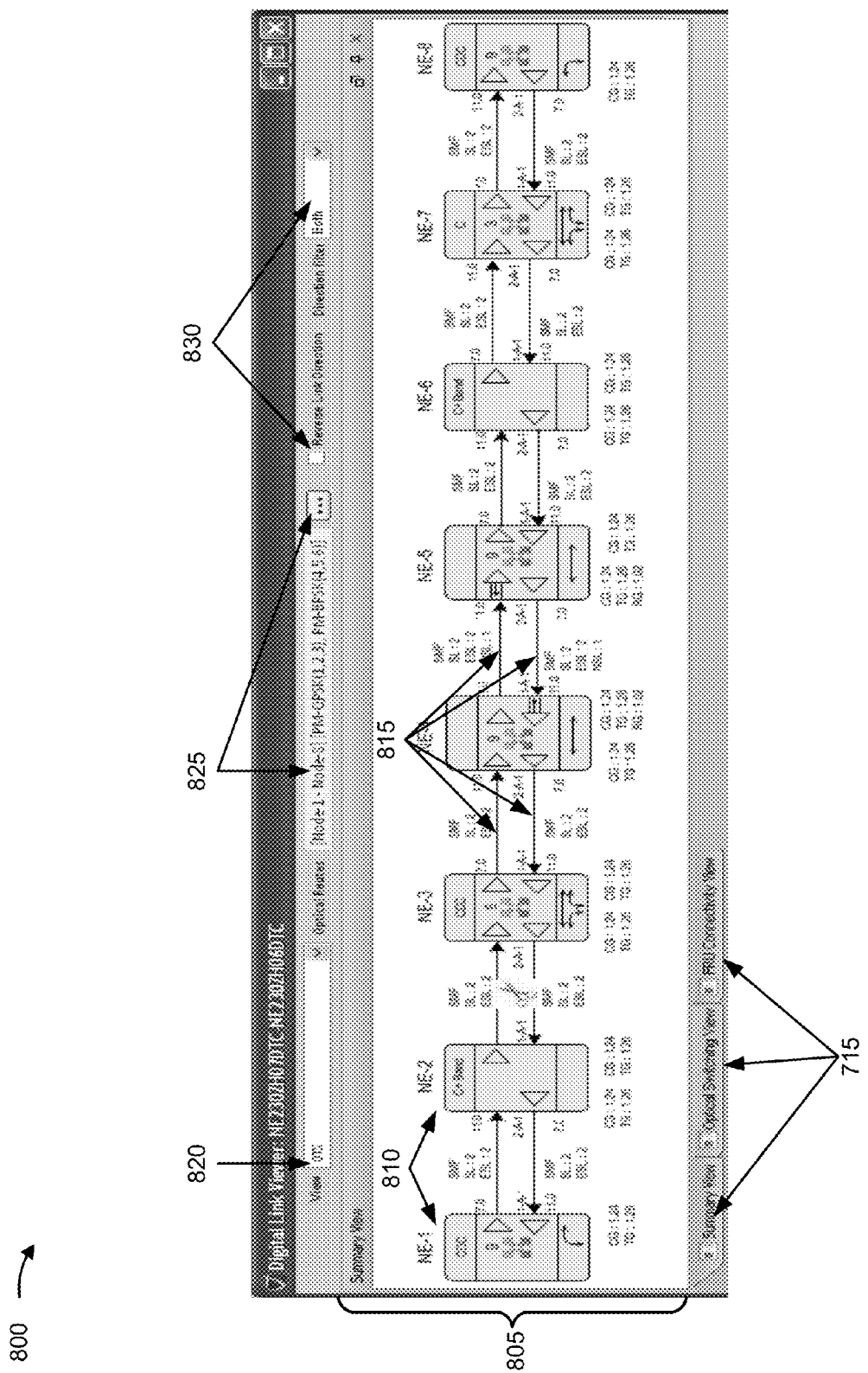

FIG. 8 is a diagram of an example element 800 of a user interface that displays optical network information. Element 800 may be displayed by UI 700. Element 800 may include tab element 715, a summary view element 805, node elements 810, optical link elements 815, a view selection element 820, a route selection element 825, and an option element 830. Additionally, or alternatively, element 800 may include fewer elements, additional elements, different elements, or differently arranged elements than those illustrated in FIG. 8.

Summary view element 805 may display a representation of NE 250, a capability associated with NE 250, a parameter associated with NE 250, an optical link associated with NE 250, an optical link parameter associated with NE 250, and/or any other information associated with NE 250. Summary view element 805 may be displayed by graphical element 710. In some implementations, summary view element 805 may be displayed based on user selection of a tab element 715 corresponding to summary view element 805, and/or based on user input via user input element 705 (e.g., view selection element 820, route selection element 825, and/or option element 830).

Node element 810 may display a representation of NE 250, a capability associated with NE 250, and/or a parameter associated with NE 250. Node element 810 may display the representation based on user input. For example, a user may input (e.g., via a drop-down box, a button, a menu, a text box, etc.) an optical route, a set of NEs 250, a set of optical links, etc. (e.g., via route selection element 825). Node element 810 may represent NE 250 associated with the user input by displaying a rectangle with identifiers (e.g., symbols, text, images, etc.) that identify capabilities and/or attributes associated with NE 250.

Optical link element 815 may display a representation of an optical link and/or an optical link parameter. Optical link element 815 may display the representation based on user input. For example, a user may input (e.g., via a drop-down box, a button, a menu, a text box, etc.) an optical route, a set of NEs 250, a set of optical links, etc. (e.g., via route selection element 825). Optical link element 815 may represent an optical link associated with the user input by displaying an arrow between NEs 250 associated with the optical link.

View selection element 820 may provide a mechanism (e.g., a drop-down box, a text box, a button, a menu, a link, etc.) that allows a user to input a view type. User input of a view type may cause UI 700 and/or summary view element 805 to display information based on the user-input view type. A view type may include a control channel view (e.g., a signaling channel view, an optical supervisory channel ("OSC") view), a data channel view (e.g., a "BAND" view), an optical link termination view, and/or any combination of these or other views. Herein, a control channel view may be referred to as an OSC view, a data channel view may be referred to as a BAND view, a combined control channel and data channel view may be referred to as an OTS view, an optical link termination view may be referred to as an OL view, and a combined data channel and optical link termination view may be referred to as a BAND/OL view.

An optical fiber may contain a control channel (OSC) and a data channel (BAND). Parameters associated with a fiber as a whole (OTS) may be different from parameters associated with a control channel (OSC) and/or a data channel (BAND) carried on the fiber.

Route selection element 825 may provide a mechanism (e.g., a drop-down box, a text box, a button, a menu, a link, etc.) that allows a user to input an optical route. A user may input an optical route using an optical route identifier, a set of NEs 250 that identify an optical route, a set of optical links that identify an optical route, an optical fiber that identifies an optical route, and/or any other information that identifies an optical route. UI 700 and/or summary view element 805 may display a representation of the identified optical route based on the user input. For example, node element 810 may display a set of NEs 250 associated with the identified optical route, and/or optical link element 815 may display a set of optical links associated with the identified optical route.

As an example, in FIG. 8, a user has selected (via route element 825) an optical route between node 1 and node 8 (which also include nodes 2-7). As illustrated, summary view element 805 may display a representation of the selected optical route. For example, node element 810 may display a representation of nodes 1 through 8 (e.g., NE-1 through NE-8) based on the user selection, as illustrated. Additionally, or alternatively, node element 810 may display information associated with nodes 1 through 8. In some implementations, optical link element 815 may display a representation of optical links between one or more nodes that connect node 1 to node 8 (e.g., arrows between nodes NE-1 and NE-2, arrows between nodes NE-2 and NE-3, etc.), as illustrated. Additionally, or alternatively, optical link element 815 may display information associated with optical links between one or more nodes that connect node 1 to node 8.

Option element 830 may provide a mechanism (e.g., a button, a check box, a drop-down box, a menu, etc.) that allows a user to input display options. In some implementations, option element 830 may include a mechanism that permits a user to indicate a desire to show and/or hide particular display elements. For example, option element 830 may include a mechanism to show and/or hide node element 810, optical link element 815, and/or particular information displayed by node element 810 and/or optical link element 815 (e.g., one or more NEs 250, one or more optical links, and/or particular types of information associated with one or more NEs 250, one or more NE components, and/or one or more optical links). Option element 830 may include a mechanism to show and/or hide particular NEs 250 and/or optical links based on a parameter associated with the NEs 250 and/or the optical links (e.g., an add/drop location of an optical route, an alert associated with an NE 250, etc.)

In some implementations, option element 830 may include a mechanism (e.g., a check box, a button, etc.) that receives user input to display an optical route in reverse order. For example, summary view element 805 may display nodes 1 through 8 in ascending order (NE-1, NE-2, NE-3, etc.) from left to right, as illustrated. Option element 830 may receive user input to reverse the order of the displayed nodes, and may display nodes 1 through 8 in descending order (NE-8, NE-7, NE-6, etc.) from left to right.

Additionally, or alternatively, option element 830 may include a mechanism (e.g., drop-down box, a check box, a button) that receives user input to display optical links in one direction (e.g., from left to right, from right to left) or more than one direction (e.g., both from left to right and from right to left). For example, summary view element 805 may display arrows representing optical links in two directions (e.g., to the left, to the right) between NEs 250, as illustrated. Option element 830 may receive user input to display the optical link representation (e.g., the arrows), in only one direction (e.g., only to the left, or only to the right), or in more than one direction (e.g., both to the left and to the right).

Figure 9A:
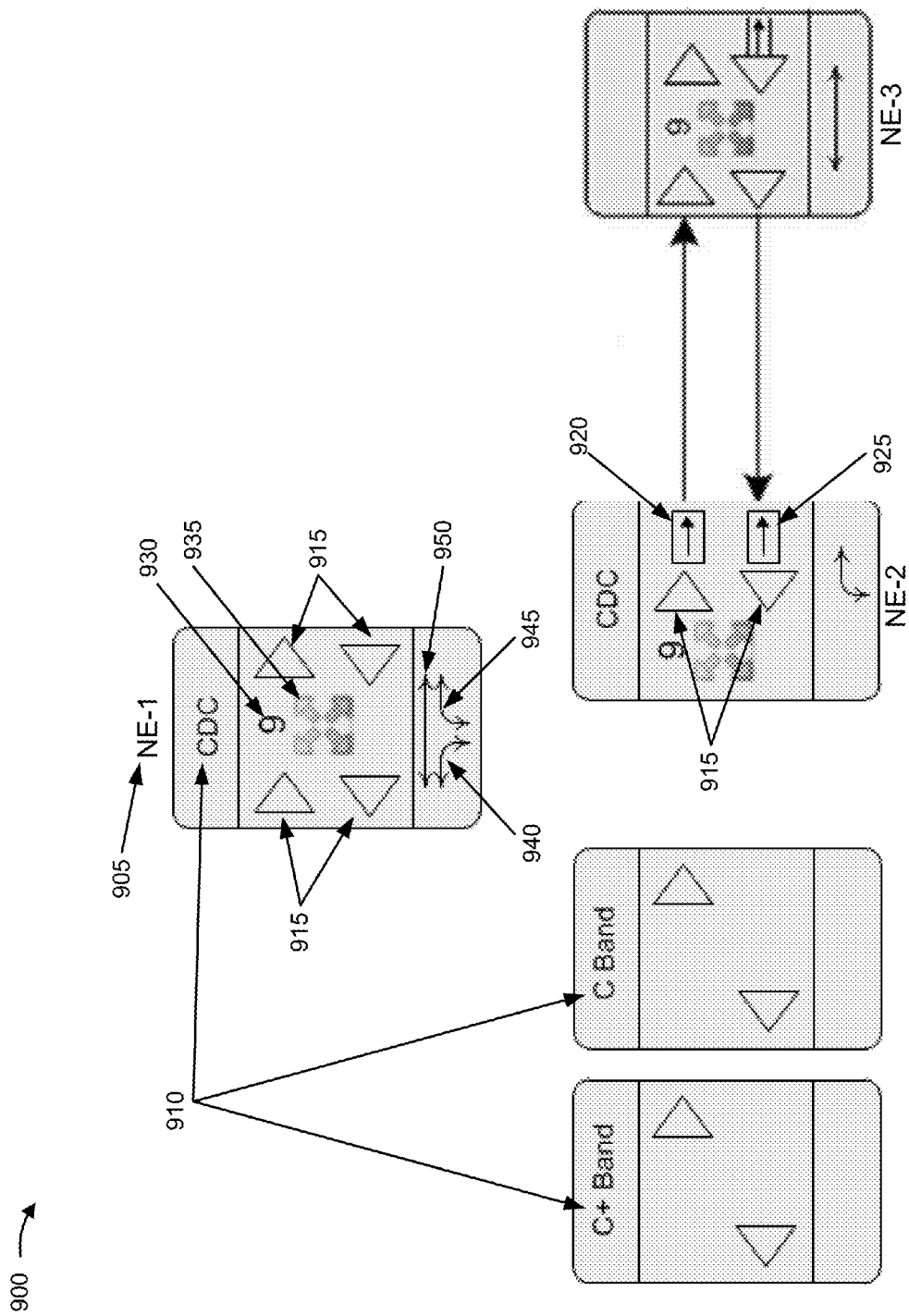

FIG. 9A is a diagram of an example element 900 of a user interface that displays optical network information. Element 900 may be displayed by UI 700 (e.g., by summary view element 805, node element 810, and/or optical link element 815). Element 900 may include node information elements 905-950 (hereinafter referred to collectively as "NIEs," and individually as "NIE"). Additionally, or alternatively, element 900 may include fewer elements, additional elements, different elements, or differently arranged elements than those illustrated in FIG. 9A.

NIE 905 may display information that identifies an NE 250. For example, NIE 905 may display an NE identifier (e.g., NE-1, as illustrated). NIE 905 may display information that identifies NE 250 based on user input. For example, NIE 905 may display an identifier of NE 250 included in a user-specified optical route.

NIE 910 may display information that identifies a functional capability of an NE 250. For example, NIE 910 may display a functional capability identifier (e.g., CDC, C Band, C+Band, as illustrated). NE 250 may have a functional capability of transmitting and/or receiving optical signals on a particular wavelength/frequency band of an optical spectrum. NE 250 may capable of transmitting and/or receiving an optical signal on a colorless band ("C" or "C Band"), an extended colorless band ("C+" or "C+Band"), a colorless, directionless, and contentionless band ("CDC" or "CDC Band"), and/or any other band on an optical spectrum.

NIEs 915-925 may display information that identifies an amplification capability of NE 250. An amplification capability may include doped fiber amplification ("DFA"), erbium doped fiber amplification ("EDFA"), Raman amplification, counter-propagating Raman amplification, co-propagating Raman amplification, and/or any combination of these amplification capabilities and/or other amplification capabilities.

NIEs 915-925 may use different identifiers (e.g., labels, symbols, colors, text, etc.) to identify different amplification capabilities. For example, NIE 915 may represent EDFA using a triangle. NIEs 920 and 925 may represent Raman amplification using an arrow. NIE 920 may represent co-propagating Raman amplification using an arrow that points in the same direction as a triangle that represents EDFA and/or an arrow that points in the same direction as an arrow representing a signal transmission (e.g., the signal transmission arrow connecting NE-2 to NE-3). NIE 925 may represent counter-propagating Raman amplification using an arrow that points in the opposite direction as a triangle that represents EDFA, and/or an arrow that points in the opposite direction as an arrow representing a signal transmission (e.g., the signal transmission arrow connecting NE-3 to NE-2). In some implementations, NIEs 915-925 may display multiple identifiers to represent multiple and/or hybrid amplification capabilities. For example, NIE 920 may represent a hybrid EDFA and co-propagating Raman amplification capability, and NIE 925 may represent a hybrid EDFA and counter-propagating Raman amplification capability.

NIEs 915-925 may display information that identifies an amplification direction capability associated with NE 250. An amplification direction capability may include an amplification capability in a direction from one NE 250 to another NE 250. In some implementations, NIEs 915-925 may use different locations (e.g., on-screen positions) to display information that identifies an amplification direction capability. For example, NIEs 915-925 may display an identifier on a left side of NE 250 to represent transmissions to and/or from another NE 250 represented to the left of NE 250. Similarly, NIEs 915-925 may display an identifier on a right side of NE 250 to represent transmissions to and/or from another NE 250 represented to the right of NE 250.

Additionally, or alternatively, an amplification direction may include a receiving direction and/or a transmitting direction. In some implementations, NIEs 915-925 may use different identifiers to display information that identifies a receiving and/or transmitting direction. Additionally, or alternatively, NIEs 915-925 may use different locations (e.g., on-screen positions) to display information that identifies a receiving direction and/or a transmitting direction. For example, NIEs 915-925 may display triangles and/or arrows pointing in different directions to represent a receiving direction and/or a transmitting direction. NIEs 915-925 are described in more detail herein in connection with FIG. 9B.

Figure 9B:
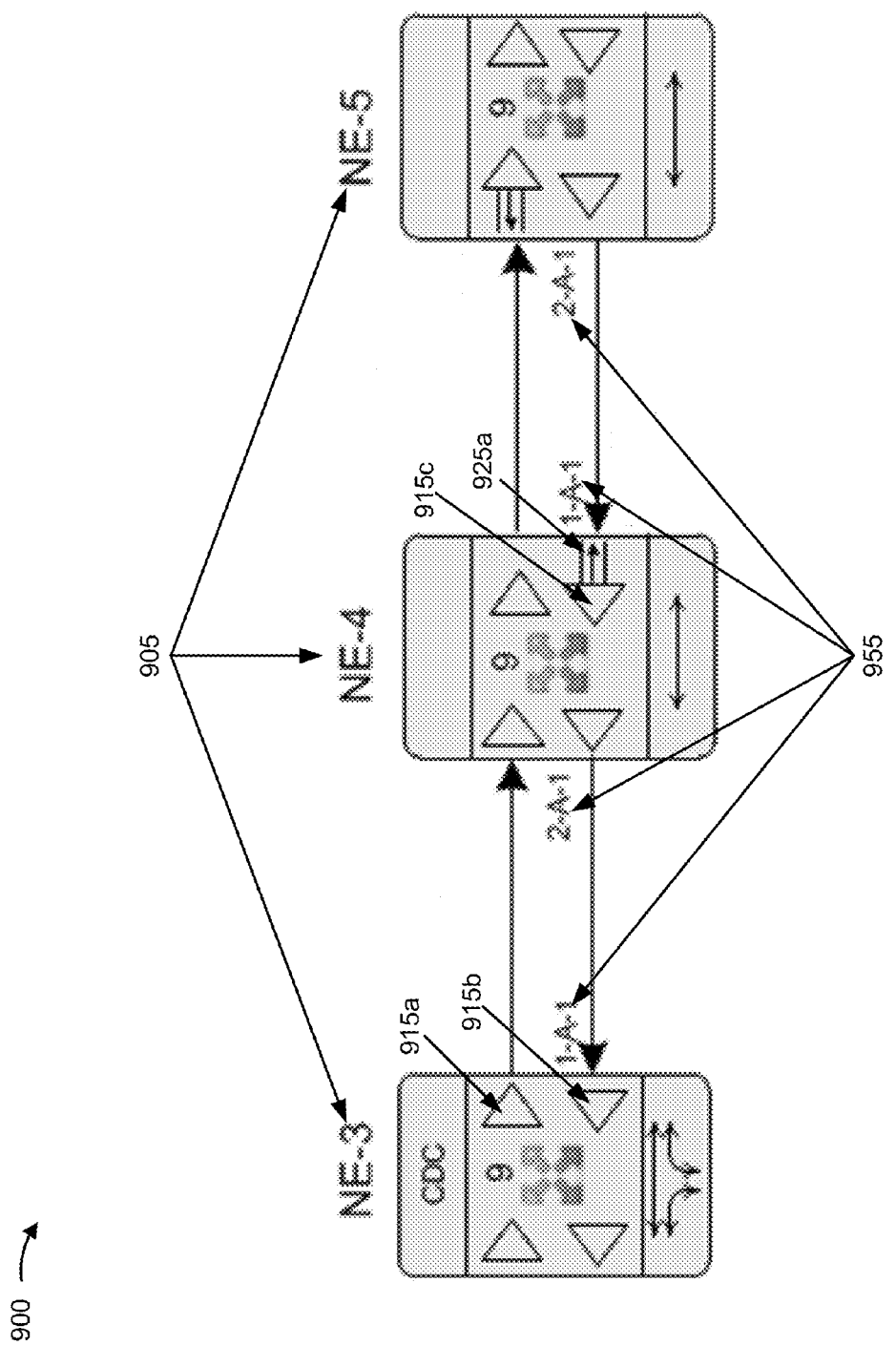

FIG. 9B is a diagram of an example element 900 of a user interface that displays optical network information. Element 900 may be displayed by UI 700 (e.g., by summary view element 805, node element 810, and/or optical link element 815). Element 900 may include NIEs 905-950, discussed herein in connection with FIG. 9A. Additionally, or alternatively, element 900 may include node information elements ("NIE") 955. Additionally, or alternatively, element 900 may include fewer elements, additional elements, different elements, or differently arranged elements than those illustrated in FIG. 9B.

As illustrated in FIG. 9B, NIE 905 may display information that identifies network entities NE-3, NE-4, and NE-5 (e.g., based on user input of a route between NE-3 and NE-5). NIE 955 may display information that identifies components associated with NE-3, NE-4, and NE-5. NE 250 may contain another NE 250 as a component. For example, NE 250 may include an optical amplifier, which may be a doped fiber amplifier (identified in the figures as "IAM") and/or a Raman amplifier (identified in the figures as "IRM"). NIE 955 may display a representation of IAM 1-A-1 on NE-3, IAM 2-A-1 on NE-4, IRM 1-A-1 on NE-4, and IRM 2-A-1 on NE-5, as illustrated.

NIEs 915-925 may display a representation of an amplification direction of a node. For example, NIE 915*a* may indicate that IAM 1-A-1 of NE-3 has an EDFA amplification capability when transmitting optical signals to IAM 2-A-1 of NE-4. Similarly, NIE 915*b* may indicate that IAM 1-A-1 of NE-3 has an EDFA amplification capability when receiving optical signals from IAM 2-A-1 of NE-4. NIEs 915*c* and 925*a* may indicate that IRM 1-A-1 of NE-4 has both an EDFA amplification capability and a counter-propagating Raman amplification capability when receiving optical signals from IRM 2-A-1 of NE-5.

Returning to FIG. 9A, NIE 930 may display information that identifies a quantity of directions in which NE 250 is capable of transmitting and/or receiving optical transmissions. For example, NE 250 may include a component that is capable of transmitting and/or receiving optical signals in nine directions (e.g., to and/or from nine different ports of other components). In some implementations, NE 250 may include a component that is capable of transmitting and/or receiving optical signals in three directions. Additionally, or alternatively, NE 250 may be capable of transmitting and/or receiving signals in any quantity of directions. NIE 930 may display an identifier (e.g., a label, a number, a symbol, etc.) that indicates a quantity of directions that NE 250 is capable of using for optical transmissions (e.g., 9 directions, as illustrated).

NIE 935 may display information that identifies a capability of NE 250. For example, NIE 935 may display an identifier (e.g., a symbol, a label, an image, text, etc.) that indicates that NE 250 is capable of transmitting and/or receiving optical signals in multiple directions (e.g., four arrows radiating from a central point, as illustrated). In some implementations, NIE 935 may not display a symbol if NE 250 does not have multi-directional capabilities. For example, NE 250 may be an optical amplifier capable of receiving a signal from one direction and transmitting the received signal in one direction.

NIEs 940-950 may display information indicating that an optical transmission, associated with a user-specified and/or non-user-specified optical link, is added, dropped, and/or transmitted via NE 250. Additionally, or alternatively, NIEs 940-950 may display information indicating a transmitting direction and/or a receiving direction for the optical transmission that is added, dropped, and/or transmitted. NIEs 940-950 may display an identifier (e.g., a single-headed arrow, a double-headed arrow, a line, a symbol, etc.) that indicates that the transmission is added, dropped, and/or transmitted at NE 250.

For example, NIE 940 may indicate that an optical transmission, received from a node displayed to the left of NE-1, is dropped at NE-1. Alternatively, NIE 940 may indicate that an optical transmission is added at NE-1 and transmitted to a node displayed to the left of NE-1. NIE 945 may indicate that an optical transmission, received from a node displayed to the right of NE-1, is dropped at NE-1. Alternatively, NIE 945 may indicate that an optical transmission is added at NE-1 and transmitted to a node displayed to the right of NE-1. NIE 950 may indicate that an optical transmission is transmitted, via NE-1, between a node displayed to the left of NE-1 and a node displayed to the right of NE-1. NIEs 940-950 are described in more detail herein in connection with FIG. 9C.

Figure 9C:
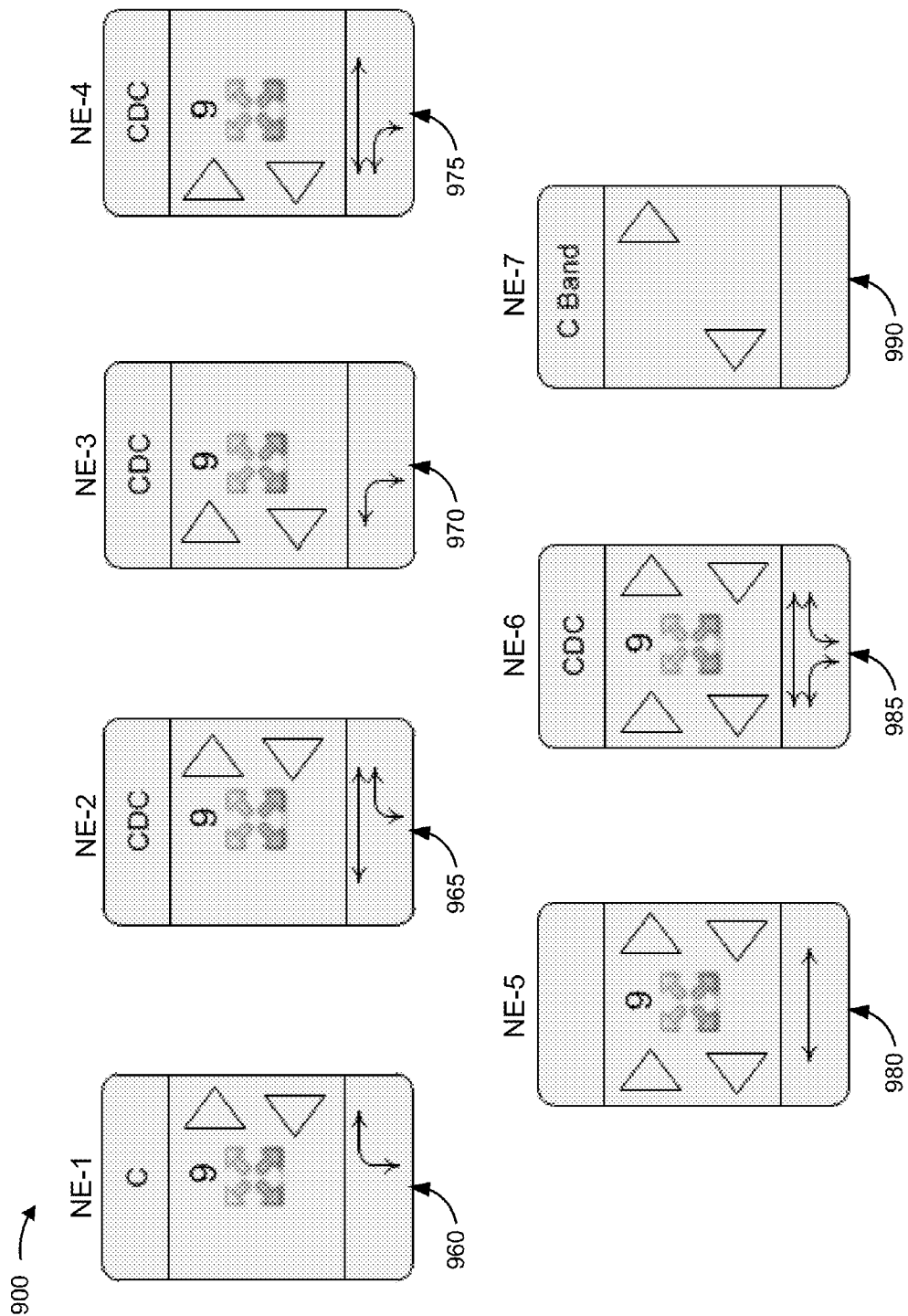

FIG. 9C is a diagram of an example element 900 of a user interface that displays optical network information. Element 900 may be displayed by UI 700 (e.g., by summary view element 805 and/or node element 810). Element 900 may include NIEs 905-950, discussed herein in connection with FIG. 9A. Additionally, or alternatively, element 900 may include NIEs 960-990. NIEs 960-990 may correspond to NIEs 940, 945, and/or 950. Additionally, or alternatively, element 900 may include fewer elements, additional elements, different elements, or differently arranged elements than those illustrated in FIG. 9C.

NIE 960 may indicate that a transmission, carried on a user-specified optical link and received from a node displayed to the right of NE-1, is dropped at NE-1 (e.g., by displaying a double-headed arrow with one head pointing right and the other head pointing down). Alternatively, NIE 960 may indicate that a transmission, carried on a user-specified optical link, is added at NE-1 and transmitted to a node displayed to the right of NE-1 (e.g., by displaying a double-headed arrow with one head pointing down and the other head pointing right). NIE 960 may also indicate that there are no non-user-specified optical links carrying a transmission, via NE-1, between a node displayed to the left of NE-1 and a node displayed to the right of NE-1.

NIE 965 may indicate that a transmission, carried on a user-specified optical link and received from a node displayed to the right of NE-2, is dropped at NE-2 (e.g., by displaying a double-headed arrow with one head pointing right and the other head pointing down). Alternatively, NIE 965 may indicate that a transmission, carried on a user-specified optical link, is added at NE-2 and transmitted to a node displayed to the right of NE-2 (e.g., by displaying a double-headed arrow with one head pointing down and the other head pointing right). NIE 965 may also indicate that there is a non-user-specified optical link carrying a transmission, via NE-2, between a node displayed to the left of NE-2 and a node displayed to the right of NE-2 (e.g., by displaying a double-headed arrow with one head pointing left and the other head pointing right).

NIE 970 may indicate that a transmission, carried on a user-specified optical link and received from a node displayed to the left of NE-3, is dropped at NE-3 (e.g., by displaying a double-headed arrow with one head pointing left and the other head pointing down). Alternatively, NIE 970 may indicate that a transmission, carried on a user-specified optical link, is added at NE-3 and transmitted to a node displayed to the left of NE-3 (e.g., by displaying a double-headed arrow with one head pointing down and the other head pointing left). NIE 970 may also indicate that there are no non-user-specified optical links carrying a transmission, via NE-3, between a node displayed to the left of NE-3 and a node displayed to the right of NE-3.

NIE 975 may indicate that a transmission, carried on a user-specified optical link and received from a node displayed to the left of NE-4, is dropped at NE-4 (e.g., by displaying a double-headed arrow with one head pointing left and the other head pointing down). Alternatively, NIE 975 may indicate that a transmission, carried on a user-specified optical link, is added at NE-4 and transmitted to a node displayed to the left of NE-4 (e.g., by displaying a double-headed arrow with one head pointing down and the other head pointing left). NIE 975 may also indicate that there is a non-user-specified optical link carrying a transmission, via NE-4, between a node displayed to the left of NE-4 and a node displayed to the right of NE-4 (e.g., by displaying a double-headed arrow with one head pointing left and the other head pointing right).

NIE 980 may indicate that a user-specified optical link and/or a non-user-specified optical link is carrying a transmission, via NE-5, between a node displayed to the left of NE-5 and a node displayed to the right of NE-5 (e.g., by displaying a double-headed arrow with one head pointing left and the other head pointing right).

NIE 985 may indicate that that a user-specified optical link is carrying a transmission, via NE-6, between a node displayed to the left of NE-6 and a node displayed to the right of NE-6 (e.g., by displaying a double-headed arrow with one head pointing left and the other head pointing right). NIE 985 may also indicate that a transmission, carried on a non-user-specified optical link and transmitted to or received from a node displayed to the left of NE-6, is added or dropped at NE-6 (e.g., by displaying a double-headed arrow with one head pointing left and the other head pointing down). NIE 985 may also indicate that a transmission, carried on a non-user-specified optical link and transmitted to or received from a node displayed to the right of NE-6, is added or dropped at NE-6 (e.g., by displaying a double-headed arrow with one head pointing right and the other head pointing down).

NIE 990 may indicate that NE 250 is only capable of performing amplification (e.g., by not displaying any double-headed arrows). For example, NE-7 may not be capable of adding and/or dropping an optical transmission and/or may not be capable of transmitting an optical transmission in multiple directions.

Figure 10A:
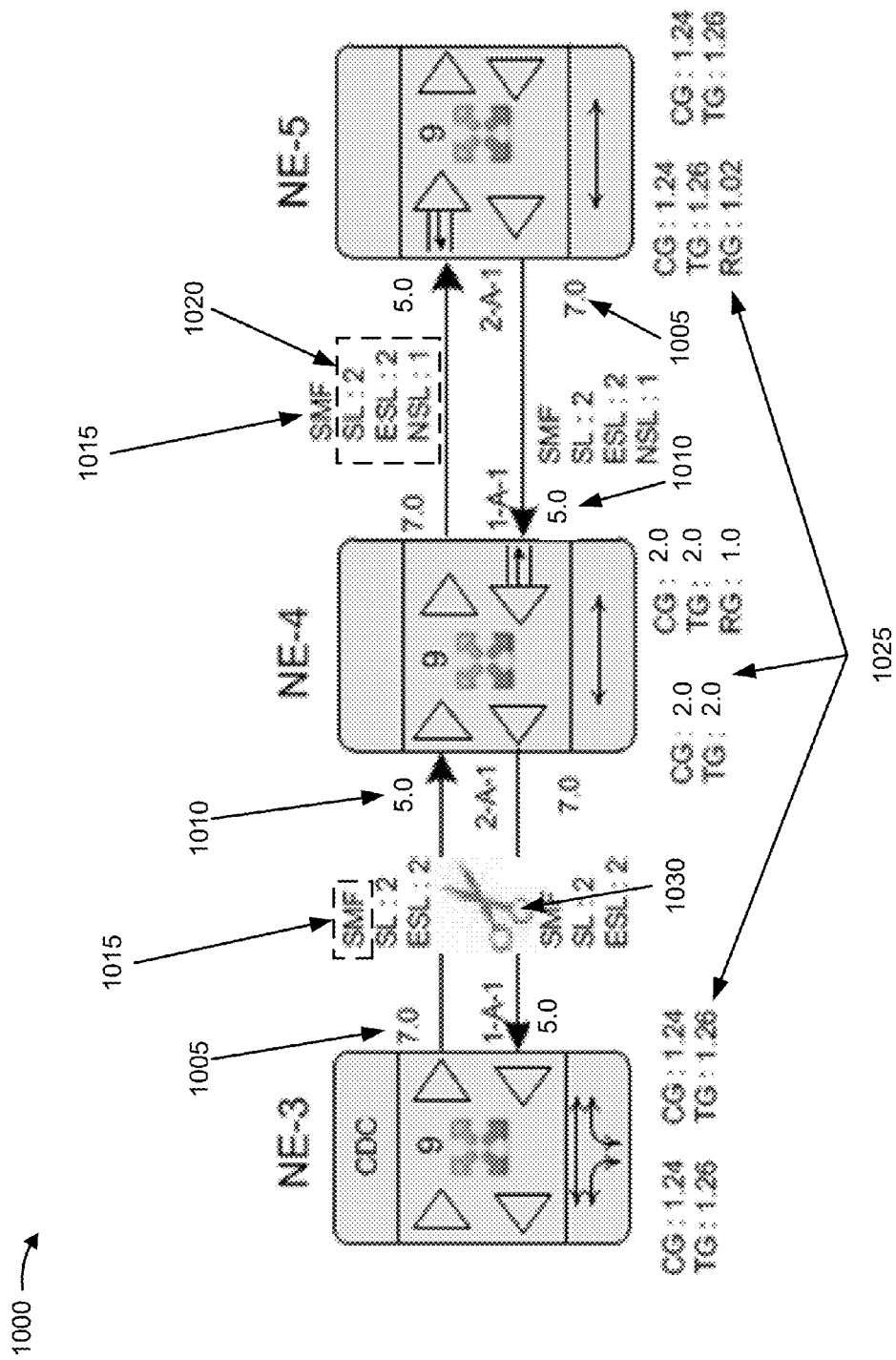

FIG. 10A is a diagram of an example element 1000 of a user interface that displays optical network information. Element 1000 may be displayed by UI 700 (e.g., by summary view element 805, node element 810, and/or optical link element 815). Element 1000 may include link information elements 1005-1030 (hereinafter referred to collectively as "LIEs," and individually as "LIE"). Additionally, or alternatively, element 1000 may include fewer elements, additional elements, different elements, or differently arranged elements than those illustrated in FIG. 10A.

Element 1000 may be displayed by UI 700 based on user input of a view type (e.g., via user input element 705 and/or view selection element 820). In some implementations, when a user inputs a data channel view (e.g., BAND), element 1000 may display a representation and/or a parameter (e.g., a power parameter, a span loss parameter, a gain parameter, etc.) associated with a data channel of a fiber. Additionally, or alternatively, when a user inputs a control channel view (e.g., OSC), element 1000 may display a representation and/or a parameter (e.g., a power parameter, a span loss parameter, an address parameter, etc.) associated with the control channel. For example, FIG. 10A may represent elements that are displayed when a user has input a data channel view (e.g., BAND), a combined control channel and data channel view (e.g., OTS), and/or a combined data channel and optical link termination view (e.g., BAND/OL).

LIE 1005 may display information that identifies an amount of optical power transmitted ("OPT") from one NE 250 to another NE 250 via an optical link. In a data channel view, OPT may represent OPT associated with a data channel. In a control channel view, OPT may represent OPT associated with a control channel. In a combined control channel and data channel view, OPT may represent OPT associated with a combined channel (e.g., at a fiber level). OPT may be displayed in any unit of power, such as decibels per watt ("dBW"), decibels per milliwatt ("dBm"), etc.

LIE 1010 may display information that identifies an amount of optical power received ("OPR") from NE 250 to another NE 250 via an optical link. In a data channel view, OPR may represent OPR associated with a data channel. In a control channel view, OPR may represent OPR associated with a control channel. In a combined control channel and data channel view, OPR may represent OPR associated with a combined channel (e.g., at a fiber level). OPR may be displayed in any unit of power, such as dBw, dBm, etc.

LIE 1015 may display information that identifies a fiber type associated with an optical link. A fiber type may include a single-mode optical fiber ("SMF"), a multi-mode optical fiber ("MMF"), a graded-index optical fiber ("GIF"), or any other type of optical fiber. LIE 1015 may use different identifiers (e.g., labels, symbols, colors, text, etc.) to identify different fiber types.

LIE 1020 may display information that identifies a span loss parameter of an optical link. A span loss parameter may identify an amount of power lost by an optical signal on an optical link between two NEs 250. A span loss parameter may include a span loss ("SL"), an expected span loss ("ESL"), a net span loss ("NSL"), and/or any other type of span loss parameter. A span loss parameters may be displayed in any unit of power, such as dBw, dBm, etc.

UI 700 may display different span loss parameters based on a type of amplification capability associated with NE 250. For example, UI 700 may display SL and/or ESL when EDFA is used to amplify the optical signal at NE 250. SL may identify the actual amount of power lost by an optical signal on an optical link between two NEs 250 (e.g., OPT of a signal at NE-3 may equal 7, and the SL of the signal may be 2, so that OPR of the signal at NE-4 is equal to 5). ESL may identify the amount of power expected to be lost by an optical signal on an optical link between two NEs 250 (e.g., based on historical data, a fiber type, a transmission distance, an amplification type, etc.).

UI 700 may display SL, ESL, and/or NSL when Raman amplification (e.g., co-propagating and/or counter-propagating) is used to amplify the optical signal at NE 250. NSL may identify the amount of power that would have been lost between two NEs 250 if Raman amplification had not occurred.

LIE 1025 may display information that identifies a gain parameter associated with an optical link and/or an NE 250. A gain parameter may identify an amount of power gained by an optical signal due to amplification by NE 250. A gain parameter may include a current gain ("CG"), a target gain ("TG"), a Raman gain ("RG"), and/or any other type of gain parameter. A gain parameter may be displayed in any unit of power, such as dBw, dBm, etc.

UI 700 may display different gain parameters based on a type of amplification capability associated with NE 250. For example, UI 700 may display CG and/or TG when EDFA is used to amplify the optical signal at NE 250. CG may identify an actual amount of power gained by an optical signal due to EDFA amplification at NE 250 (e.g., NE-4 may receive a signal with OPR of 5, may amplify the signal with a CG of 2, and may transmit the signal with an OPT of 7). TG may identify a target amount of power gain that NE 250 should apply to a signal using EDFA and/or Raman amplification (e.g., based on an amount of power necessary to reach another NE 250, such as an adjacent NE 250 and/or a destination NE 250).

UI 700 may display CG, TG, and/or RG when Raman amplification (e.g., co-propagating and/or counter-propagating) is used to amplify the optical signal at NE 250. RG may identify an actual amount of power gained by an optical signal due to Raman amplification at NE 250. For example, a signal transmitted from NE-5 to NE-4 may arrive with an OPR of 5, may be amplified with a Raman gain of 1 and an EDFA gain of 1, for a total CG of 2, and may be transmitted from NE-4 to NE-3 with an OPT of 7).

LIE 1030 may display information that identifies an alert (e.g., a problem, an issue, a warning, a malfunction, a notification, etc.) associated with an optical link between two NEs 250. For example, LIE 1030 may indicate that an optical link is unable to transmit a signal (e.g., because a fiber has been cut, damaged, degraded, etc.). LIE 1030 may display an identifier (e.g., an image, text, a label, a color, etc.) to identify the problem associated with the optical link. For example, LIE 1030 may display an image of scissors to indicate that an optical link is unable to transmit a signal between NE-3 and NE-4, as illustrated. In some implementations, LIE 1030 may display different identifiers to represent different problems associated with an optical link.

In some implementations, LIE 1030 may provide a mechanism (e.g., a clickable element, a button, a link, etc.) that allows a user to indicate a desire to view alert information associated with an alert. For example, a user may click on LIE 1030, and UI 700 may display information associated with an alert identified by LIE 1030. Alert information may include information that identifies an NE 250 associated with an alert, information that identifies an optical link associated with an alert, information that describes an alert, information that describes conditions that caused the alert, information that identifies a date and/or time associated with the alert (e.g., when the conditions that caused the alert arose), information that describes a solution to remedy the alert, and/or other information associated with an alert.

Figure 10B:
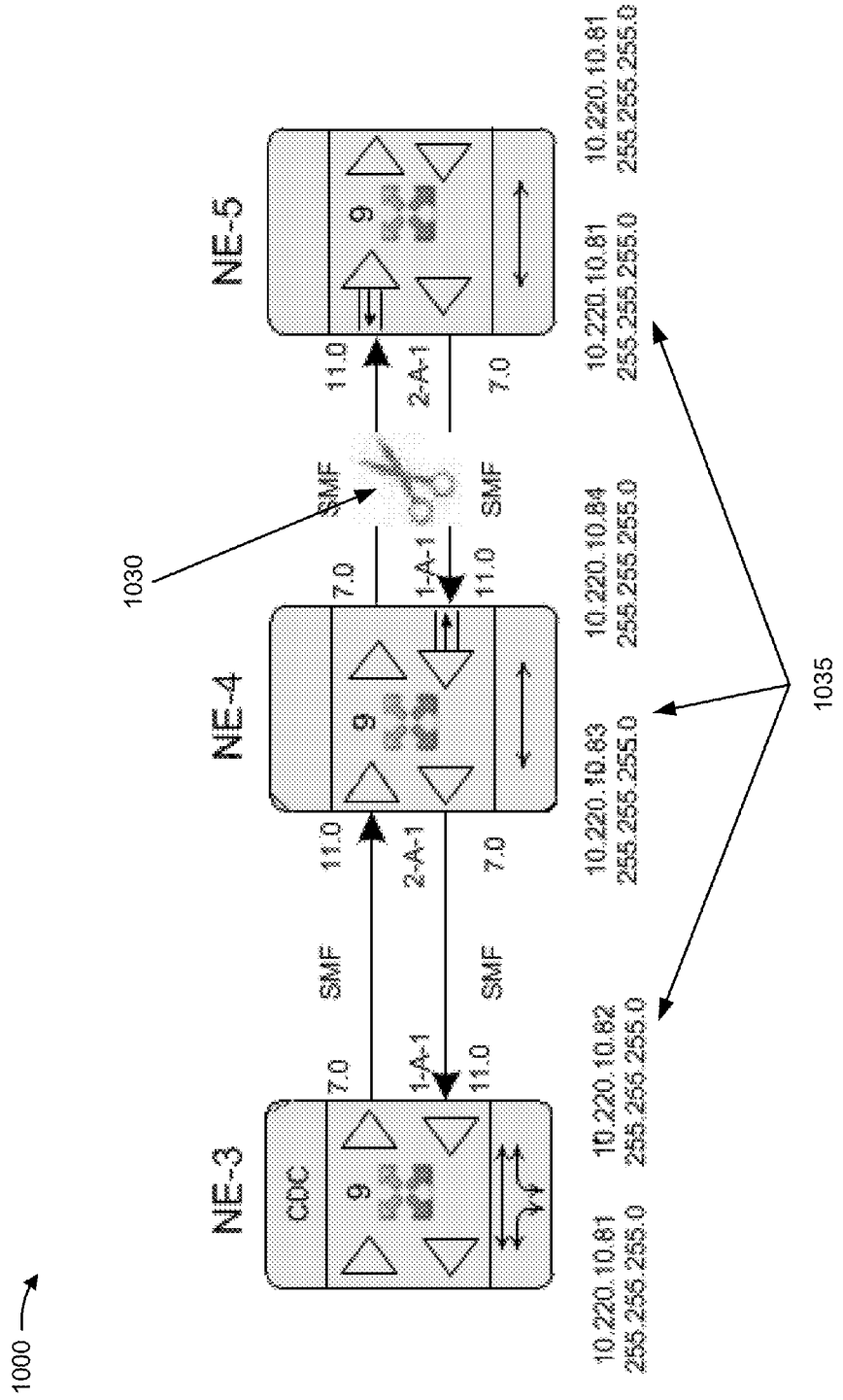

FIG. 10B is a diagram of an example element 1000 of a user interface that displays optical network information. Element 1000 may be displayed by UI 700 (e.g., by summary view element 805, node element 810, and/or optical link element 815). Element 1000 may include LIEs 1005-1030, discussed herein in connection with FIG. 10A. Additionally, or alternatively, element 1000 may include LIEs 1035. Additionally, or alternatively, element 1000 may include fewer elements, additional elements, different elements, or differently arranged elements than those illustrated in FIG. 10B.

Element 1000 may be displayed by UI 700 based on user input of a view type (e.g., via user input element 705 and/or view selection element 820). For example, FIG. 10B may represent elements that are displayed when a user has input a control channel view (e.g., OSC).

LIE 1035 may display information that identifies an address parameter of a control channel (e.g., an optical supervisory channel) associated with NE 250. For example, LIE 1035 may identify an internet protocol ("IP") address and/or a subnet mask address associated with a control channel on NE 250.

Figure 11:
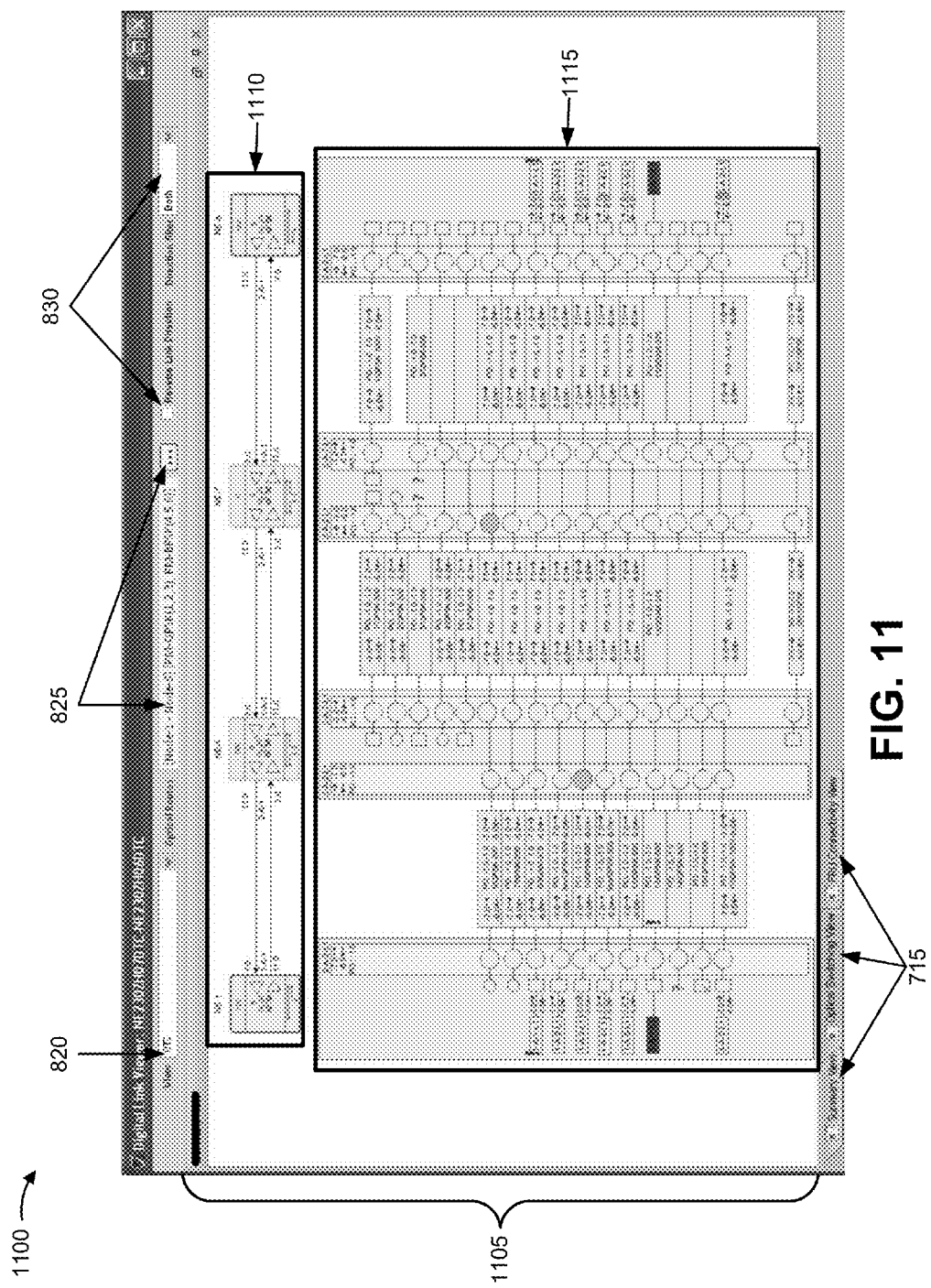

FIG. 11 is a diagram of an example element 1100 of a user interface that displays optical network information. Element 1100 may be displayed by UI 700. Element 1100 may include tab element 715, view selection element 820, route selection element 825, option element 830, an optical switching view element 1105, a route summary view element 1110, and a route detail view element 1115. Additionally, or alternatively, element 1100 may include fewer elements, additional elements, different elements, or differently arranged elements than those illustrated in FIG. 11.

Optical switching view element 1105 may display a representation of NEs 250, a representation of optical links between NEs 250, and/or information associated with the represented NEs 250 and/or the represented optical links. Optical switching view element 1105 may be displayed by graphical element 710. In some implementations, optical switching view element 1105 may be displayed based on user selection of a tab element 715 corresponding to optical switching view element 1105, and/or based on user input via user input element 705 (e.g., view selection element 820, route selection element 825, and/or option element 830).

View element 1110 and/or 1115 may display a representation of NEs 250, a representation of optical links between NEs 250, and/or information associated with the represented NEs 250 and/or the represented optical links. In some implementations, view element 1110 and/or 1115 may correspond to summary view element 805, and may display node element 810, optical link element 815, NIEs 905-990, and/or LIEs 1005-1030. View element 1110 and/or 1115 may display information associated with elements 810, 815, 905-990, and 1005-1030 based on user input (e.g., via user input element 705). Additionally, or alternatively, view element 1110 and/or 1115 may display NEs 250 and/or optical links associated with a user-specified route and/or associated with particular criteria (e.g., NEs 250 where an optical transmission is added, dropped, and/or transmitted, NEs 250 associated with a problem, etc.).

View selection element 820 may provide a mechanism (e.g., a drop-down box, a text box, a button, a menu, a link, etc.) for a user to input a view type. User input of a view type may cause UI 700 and/or optical switching view element 1105 to display information based on the view type. In some implementations, view selection element 820 may be disabled when UI 700 is displaying optical switching view element 1105.

Route selection element 825 may provide a mechanism (e.g., a drop-down box, a text box, a button, a menu, a link, etc.) that allows a user to input an optical route to be displayed by view element 1110 and/or 1115. The user may input an optical route identifier, a set of NEs 250 that identify an optical route, a set of optical links that identify an optical route, and/or any other information that identifies an optical route. In some implementations, view element 1110 and/or 1115 may display the identified optical route based on the user input. Additionally, or alternatively, view element 1110 and/or 1115 may display a subset of NEs 250 and/or optical links associated with the identified optical route based on particular criteria (e.g., a user-specified criteria).

For example, in FIG. 11, a user has selected (via route element 825) an optical route between node 1 and node 8. View element 1110 and/or 1115 may display a representation of the selected optical route. Additionally, or alternatively, view element 1110 and/or 1115 may display particular NEs 250 and/or optical links in the selected optical route based on particular criteria (e.g., NEs 250 where an optical transmission is added, dropped, and/or transmitted, NEs 250 that are experiencing a problem, error, or issue, etc.). For example, view element 1110 and/or 1115 may display a representation of nodes 1, 4, 7, and 8 (e.g., NE-1, NE-4, NE-7, and NE-8) based on nodes 1, 4, 7, and 8 being in the selected optical route and/or meeting a particular criteria, as illustrated. Additionally, or alternatively, view element 1110 and/or 1115 may display information associated with displayed NEs 250 and/or displayed optical links.

Option element 830 may provide a mechanism (e.g., a button, a check box, a drop-down box, a menu, etc.) that allows a user to input display options, as discussed herein in connection with FIG. 8.

Figure 12A:
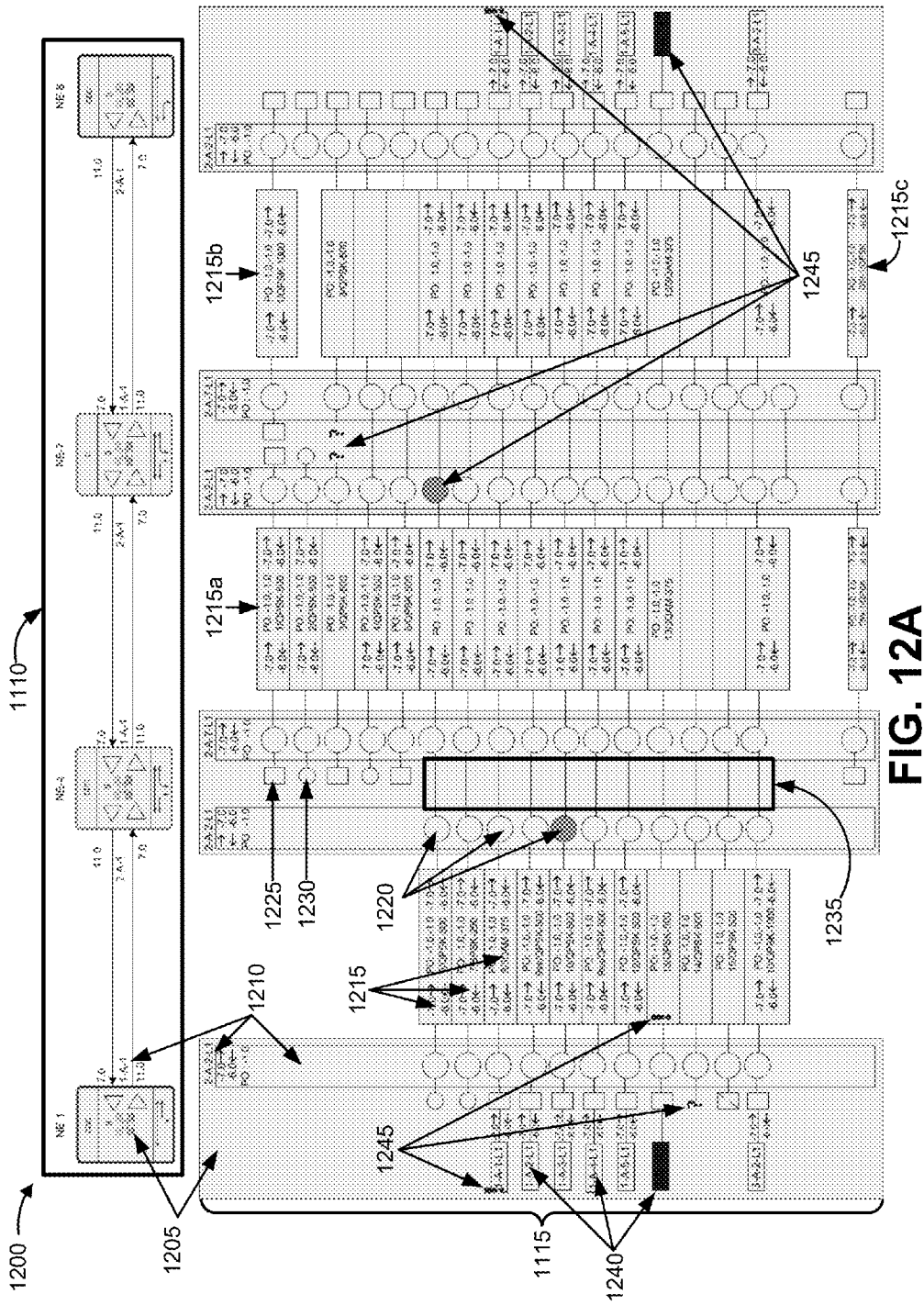

FIG. 12A is a diagram of an example element 1200 of a user interface that displays optical network information. Element 1200 may be displayed by UI 700 (e.g., by optical switching view element 1105). Element 1200 may include route summary view element 1110 and route detail view element 1115, as discussed herein in connection with FIG. 11. Additionally, or alternatively, element 1200 may include a node display element 1205, a component display element 1210, an optical link display element 1215, a connection point display element 1220, an add/drop display element 1225, a route direction element 1230, a local route element 1235, a source/destination element 1240, and an alert element 1245. Additionally, or alternatively, element 1200 may include fewer elements, additional elements, different elements, or differently arranged elements than those illustrated in FIG. 12A.

Node display element 1205 may provide information associated with network nodes (e.g., NEs 250). For example, node display element 1205 may display a representation of nodes associated with a particular optical route (e.g., a user-specified route connecting multiple NEs 250), an identification of the displayed nodes (e.g., NE-1, NE-4, NE-7, and NE-8, as illustrated), and/or other information associated with nodes. Node display element 1205 may display a particular node in optical network 240 based on user input of a node, user input of an optical route associated with a node, and/or user input of other information associated with a node (e.g., via user input element 705). Node display element 1205 may display a summary representation of a node in route summary view element 1110, and may display a detailed representation of a node in route detail view element 1115, as illustrated. In some implementations, a node may be displayed in route detail view element 1115 relative to a node displayed in route summary view element 1110 (e.g., NE-1 in route detail view element 1115 may be displayed directly below NE-1 in route summary view element 1110, as illustrated).

Component display element 1210 may provide information associated with components of a displayed node (e.g., NE 250). A node may include one or more components (e.g., NEs 250). For example, NE-1 may represent an IAM and a ROADM that includes multiple FRMs. In some implementations, component display element 1210 may display a representation of a component, an identification of a component (e.g., IAM "1-A-1" and FRM "2-A-2-L1" on NE-1, as illustrated), and/or other information associated with a component.

In some implementations, component display element 1210 may include a component label that displays information that identifies a power parameter associated with a component. A power parameter may include an OPR at a component, an OPT at a component, and/or a power adjustment made to an optical transmission at a component, (e.g., a power offset, an increase or decrease of power, etc.). For example, a component label may indicate that a component is associated with an OPT of −7 and an OPR of −6, and a power offset ("PO") of −1, as illustrated (e.g., at FRM 2-A-2-L1 on NE-1). Additionally, or alternatively, a component label may display other parameters associated with a component (e.g., a gain parameter, an address parameter, etc.).

Optical link display element ("OLDE") 1215 may provide a representation of one or more optical links that may transmit a signal between displayed nodes. In some implementations, OLDE 1215 may display one or more optical links that are assigned and/or being used to carry signals between the displayed nodes.

OLDE 1215 may display an optical link in a particular manner depending on characteristics of the optical link, such as a quantity of spectral slices associated with the optical link (e.g., 20 slices, 32 slices, etc.), a relative position of the associated spectral slices within an optical spectrum (e.g., slices 1-20 may occupy a different wavelength and/or position than slices 21-54), an optical link type associated with the optical link (e.g., a bandwidth and/or modulation format associated with an optical link), an allocation status associated with the optical link (e.g., assigned, used, blocked, and/or available), an alert status associated with the optical link (e.g., in service, out of service, misconfigured, not optically viable, and/or other alerts), and/or other information associated with a displayed optical link.

OLDE 1215 may display an optical link in a particular and/or relative position (e.g., a position on a display) to convey information associated with the optical link. For example, OLDE 1215 may display an optical link in a particular position based on the spectral slices associated with the optical link. In some implementations, optical links may be displayed in an order or a sequence, with the first optical link including spectral slices at the beginning of an optical spectrum (e.g., slice 1), and the last optical link including spectral slices at the end of the spectrum (e.g., slice 384). OLDE 1215a illustrates a first optical link on top of a stack of optical links because the first optical link is associated with spectral slices 1-20.

OLDE 1215 may display an optical link using a particular and/or relative size to convey information associated with the optical link. For example, OLDE 1215 may display an optical link using a size that is proportional to the quantity of spectral slices included in the optical link. The quantity of spectral slices included in an optical link may depend on an optical link type (e.g., a super-channel type). As illustrated, OLDE 1215a may display a first super-channel of type "QPSK-500," which includes 20 spectral slices, and OLDE 1215b may display a second super-channel of type "QPSK-1000," which includes 32 spectral slices. The second super-channel may be displayed in a more prominent manner (e.g., larger, bolder, in a different color, etc.) than the first super-channel, as illustrated, because the second super-channel includes more spectral slices than the first super-channel.

OLDE 1215 may display an optical link using an optical link label to convey information associated with the optical link. An optical link label may provide an indication of an optical link identifier (e.g., a number) associated with an optical link, an optical link type associated with an optical link, a capacity of an optical link, an allocation status associated with an optical link, an alert status associated with an optical link, and/or other characteristics associated with an optical link. For example, OLDE 1215a may display an optical link label that provides an indication of an optical link identifier associated with the optical link (e.g., "1"), a bandwidth associated with the optical link (e.g., "500" Gbps), a modulation format associated with the optical link (e.g., "QPSK"), and an optical link type associated with the optical link (e.g., "QPSK-500"), as illustrated.

In some implementations, an optical link may be an "open wave," where a user may input a set of spectral slices to be included in the optical link. Open wave may allow optical signals to be transmitted over any set of spectral slices. For example, OLDE 1215c may represent a set of ten spectral slices allocated using open wave, labeled "OW-1/QPSK."

In some implementations, an optical link label may display information that identifies a power parameter associated with an optical link. A power parameter may include an amount of power transmitted over an optical link (e.g., an OPT at one end of the optical link and an OPR at another end of the optical link) OPR and/or OPT may be displayed in one direction or in both directions. Additionally, or alternatively, a power parameter may include a PO at a node associated with an optical link (e.g., a transmitting node and/or a receiving node). Additionally, or alternatively, an optical link label may display information that identifies other parameters associated with an optical link (e.g., a span loss parameter, a gain parameter, etc.).

In some implementations, information displayed by an optical link label may only be displayed on one optical link representation in a span of associated optical links. For example, optical links 6, 7, 8, 9ss, 10, and 12 between NE-1 and NE-4 may display an optical link modulation format and an optical link bandwidth. These characteristics may not be displayed on the optical link representations between NE-4 and NE-7, and between NE-7 and NE-8. In some implementations, information displayed by an optical link label may only be displayed on the first optical link in the span.

OLDE 1215 may display an optical link using a particular color and/or pattern in order to convey information associated with the optical link. For example, OLDE 1215 may display an optical link using a particular color to indicate an allocation status associated with the optical link. For example, OLDE 1215 may display an assigned optical link using a first color, may display a used optical link using a second color, may display a blocked optical link and/or a set of spectral slices using a third color, and may display an available optical link using a fourth color.

An allocation status may include, for example, assigned, used, blocked, and/or available. In some implementations, an assigned status may indicate that an optical link has been assigned to transmit optical signals, but is not currently transmitting optical signals. Additionally, or alternatively, an assigned status may indicate that an optical link has been assigned to a component (e.g. an FRM) and/or a cross-connect (e.g., a termination point on an FRM) on one node (e.g., on NE-4), but has not been assigned to a component and/or a cross-connect on another node (e.g., on NE-7). OLDE 1215 may display assigned optical links using a first color.

In some implementations, a used status may indicate that an optical link is currently transmitting a signal. Additionally, or alternatively, a used status may indicate that an optical link is associated with components (e.g., FRMs) and/or cross-connects (e.g., termination points on FRMs) on both nodes that the optical link connects (e.g., NE-1 and NE-4). OLDE 1215 may display used optical links using a second color.

In some implementations, a blocked status may indicate that an optical link and/or a set of spectral slices are unavailable for allocation. For example, an optical link may be blocked when there is not enough capacity to support allocation of the optical link and/or spectral slices using a particular optical link type. Additionally, or alternatively, a blocked status may indicate that an optical link and/or a set of spectral slices have not been configured for allocation between nodes. OLDE 1215 may display used optical links using a third color. In some implementations, OLDE 1215 may not display blocked optical links and/or spectral slices (e.g., there may be blank space to represent blocked optical links and/or spectral slices, as illustrated).

In some implementations, an available status may indicate that an optical link is available for data transmission (e.g., the optical link is not assigned, used, or blocked). Additionally, or alternatively, an available status may indicate that an optical link is not associated with a component or a cross-connect on either node that the optical link connects. OLDE 1215 may display available optical links using a fourth color.

Connection point display element ("CPDE") 1220 may provide an indication of an optical link connection point (e.g., a port) on a component (e.g., an FRM) associated with a node (e.g., NE 250). CPDE 1220 may provide an indication of an allocation status for a connection point. For example, CPDE 1220 may display a line connecting allocated (e.g., used and/or assigned) connection points to allocated optical links. In some implementations, the line may be displayed in the same color as the super-channel to which it is connected in order to indicate an allocation status of the connection point. Additionally, or alternatively, connection points that have not been allocated may be displayed without a line connecting the connection point to an optical link.

Add/drop display element ("ADDE") 1225 may provide an indication of transmissions (e.g., via optical links) that are added or dropped at a displayed node (e.g., NE 250). In some implementations, ADDE 1225 may display a particular shape (e.g., a square), connected to an optical link, to indicate an add/drop location of a transmission. As illustrated, ADDE 1225 may display a square on NE-4 to indicate that the transmission carried by optical link "1/QPSK-500" between NE-4 and NE-7 is added or dropped at NE-4. In some implementations, ADDE 1225 may use a different indicator for an added transmission than for a dropped transmission.

Route direction element ("RDE") 1230 may provide an indication of a route (e.g., an optical link) that has been allocated between a displayed component (e.g., FRM 2-A-7-L1 on NE-4) and a component that is not displayed. Additionally, or alternatively, RDE 1230 may indicate that an optical transmission is being routed between a displayed component and a non-displayed component. For example, UI 700 may display FRMs 2-A-7-L1 and 2-A-2-L1 on NE-4, as illustrated. There may be other FRMs on NE-4 that are not displayed by UI 700. RDE 1230 may provide an indication that a route has been allocated between FRM 2-A-7-L1 on NE-4 (which is displayed by UI 700) and one of the other FRMs on NE-4 that is not displayed by UI 700. In some implementations, RDE 1230 may display a particular shape (e.g., a circle) connected to an optical link to provide this indication. As illustrated, RDE 1230 may display a circle on NE-4 to indicate that the transmission associated with optical link "2/QPSK-500" between NE-4 and NE-7 is routed between FRM 2-A-7-L1 on NE4 and another FRM (one that is not displayed on UI 700) on NE-4 other than FRM 2-A-2-L1 (which is displayed on UI 700).

Local route element 1235 may provide an indication of a route that has been allocated between displayed components (e.g., FRMs displayed by UI 700). Additionally, or alternatively, local route element 1235 may indicate that an optical transmission is being routed between two displayed components. For example, local route element 1235 may display a line connecting allocated optical links. In some implementations, the line may be displayed in the same color as an optical link to which it is connected in order to indicate an allocation status of the route. As illustrated, local route element 1235 may display a line on NE-4 connecting optical link "10/QPSK-1000" between NE-1 and NE-7. The line connects connection points on FRM 2-A-2-L1 and FRM 2-A-7-L1 on NE-4 to indicate that the route is allocated between these FRMs (both of which are displayed on UI 700).

Source/destination element 1240 may provide a representation of a source component and/or a destination component associated with an optical link. Source/destination element 1240 may display an identifier (e.g., a label, text, a number, an image, etc.) that identifies a source component, a destination component, a port on a source component, and/or a port on a destination component (e.g., port L1 on component 1-A-4, illustrated as "1-A-4-L1"). Source/destination element 1240 may be displayed as connected to an add/drop display element 1225, as illustrated.

In some implementations, source/destination element 1240 may include a source/destination component label that displays information that identifies a power parameter associated with a source and/or destination component. A power parameter may include an OPR at a component, an OPT at a component, and/or a PO at a component. For example, a source/destination component label may indicate that a component is associated with an OPT of −7 and an OPR of −6, as illustrated (e.g., at source/destination component 1-A-4-L1 on NE-1). Additionally, or alternatively, a source/destination component label may display other parameters associated with a source and/or destination component (e.g., a gain parameter, an address parameter, etc.).

Alert element 1245 may provide an indication of an alert (e.g., an error, a notification, an alarm, a warning, etc.) associated with an optical link, a component, a connection point (e.g., a port, an add/drop, a cross-connect, etc.), a node (e.g., NE 250), and/or any other element of an optical network. For example, an alert may be associated with a cross-connect problem associated with a node, a service state associated with an optical link, a configuration problem associated with an optical link, an optical viability problem associated with an optical link and/or route, and/or any other alert that may convey information (e.g., an issue, problem, alarm, error, etc.) associated with an optical network.

Alert element 1245 may display an alert in a particular manner based on a severity level associated with the alert. For example, an alert with high severity may be displayed in red, an alert with medium severity may be displayed in orange, and an alert with low severity may be displayed in yellow. Alert element 1245 may display an indication of an alert in route summary view element 1110 and/or route detail view element 1115. For example, source/destination component 3-A-1-L1 on NE-1 may be associated with a high severity alert. Alert element 1245 may display source/destination component 3-A-1-L1 in red in route detail view element 1115, and may display a red outline around NE-1 in route summary view element 1110.

In some implementations, alert element 1245 may provide a mechanism (e.g., a clickable element, a button, a link, etc.) that allows a user to indicate a desire to view alert information associated with an alert. For example, a user may click on alert element 1245, and UI 700 may display information associated with an alert identified by alert element 1245. Alert information may include information that identifies an NE 250 associated with an alert, information that identifies an optical link associated with an alert, information that describes an alert, information that describes conditions that caused the alert, information that identifies a date and/or time associated with the alert (e.g., when the conditions that caused the alert arose), information that describes a solution to remedy the alert, and/or other information associated with an alert.

Figure 12B:
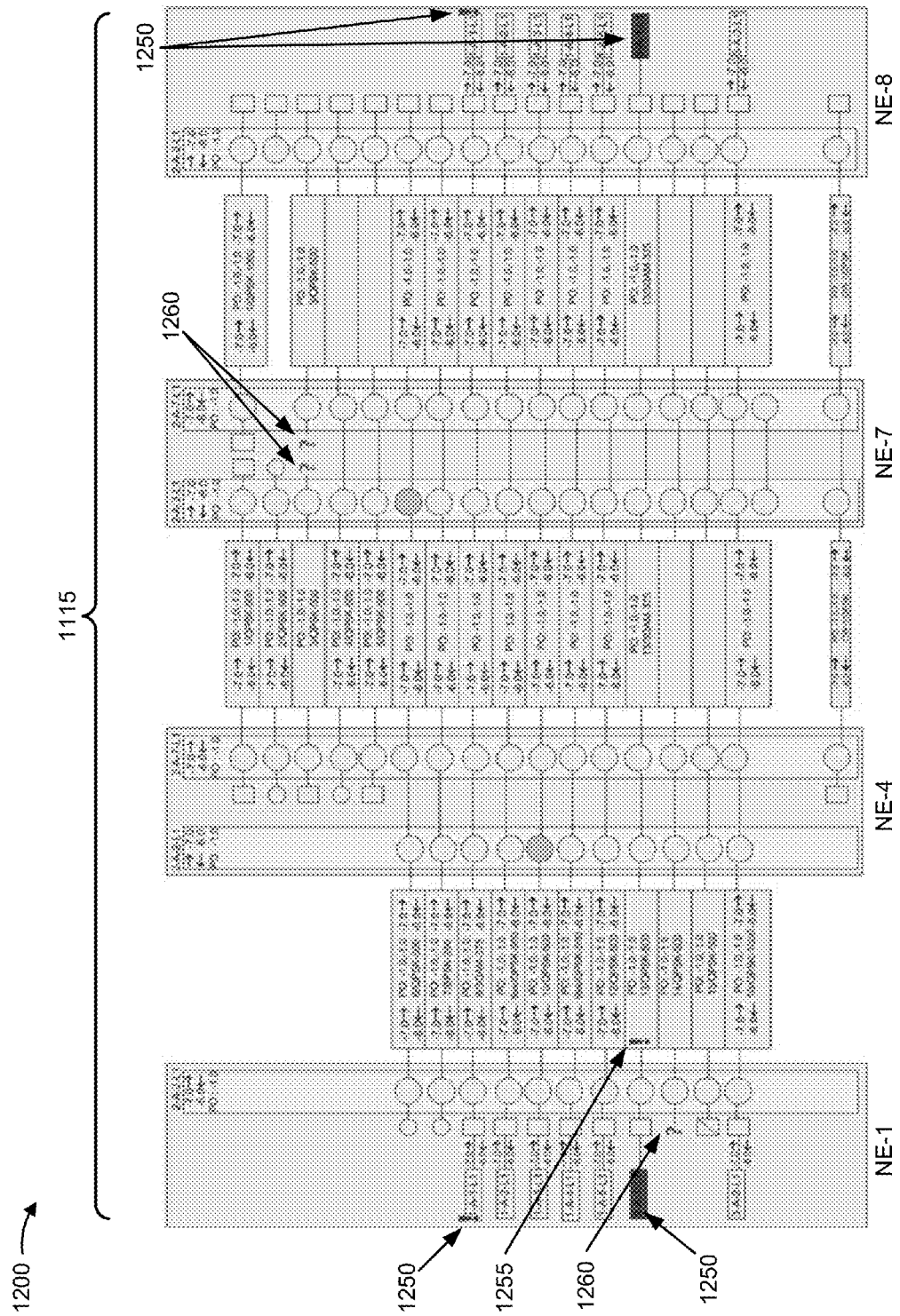

FIG. 12B is a diagram of an example element 1200 of a user interface that displays optical network information. Element 1200 may be displayed by UI 700 (e.g., by optical switching view element 1105). Element 1200 may include route detail view element 1115, as discussed herein in connection with FIG. 11. Additionally, or alternatively, element 1200 may include a component alert element 1250, an optical link alert element 1255, and a cross-connect alert element 1260. Additionally, or alternatively, element 1200 may include fewer elements, additional elements, different elements, or differently arranged elements than those illustrated in FIG. 12B.

Component alert element ("CAE") 1250 may provide an indication of a misconfiguration between a source component on one node and a destination component on another node. A misconfiguration may be a different configuration at a source component and a destination component that prevents and/or degrades an optical transmission between the source component and the destination component. As illustrated, CAE 1250 may display an exclamation point ("!") and/or another notification on source component 1-A-1-L1 of NE-1 and/or on destination component 1-A-1-L1 of NE-8 to indicate a configuration mismatch between these components.

Optical link alert element ("OLAE") 1255 may provide an indication of an alert (e.g., a problem, an issue, a warning, a notification, etc.) associated with an optical link. For example, OLAE 1255 may provide an indication of a service state of an optical link. A service state may include in-service or out-of-service. As illustrated, OLAE 1255 may display an exclamation point ("!") and/or another notification on optical link "13/QPSK-500" between NE-1 and NE-4 to indicate that optical link 13 is out of service between NE-1 and NE-4.

Additionally, or alternatively, OLAE 1255 may provide an indication of a configuration problem associated with an optical link. A configuration problem may indicate that a modulation format configured on a connection point (e.g., a cross-connect) of one node associated with an optical link does not match a modulation format configured on a connection point of another node associated with the optical link. As illustrated, OLAE 1255 may display an exclamation point ("!") and/or another notification on optical link "13/QPSK-500" between NE-1 and NE-4 to indicate that the connection point on NE-1 is configured for one optical link type (e.g., "QPSK-500"), and the connection point on NE-4 is configured for a different optical link type (e.g., "3QAM-375").

Additionally, or alternatively, OLAE 1255 may provide an indication of an optical viability problem associated with an optical link. An optical viability problem may indicate that an optical link cannot transmit a signal across a route without loss of data integrity due to errors, light degradation, etc. As illustrated, OLAE 1255 may display an exclamation point ("!") or another notification on optical link "13/QPSK-500" between NE-1 and NE-4 to indicate that optical link 13 is not optically viable for a particular data transmission between NE-1 and NE-4.

Cross-connect alert element ("CCAE") 1260 may provide an indication of an alert (e.g., a problem, an issue, a warning, a notification, etc.) associated with a cross-connect (e.g., a connection point, an add/drop point, a termination point, etc.). For example, CCAE 1260 may provide an indication that an optical link is not connected to a cross-connect (e.g., is not being added, dropped, or routed by a node). Additionally, or alternatively, CCAE 1260 may indicate that a cross-connect and/or a component has not been installed, properly configured, and/or provisioned. As illustrated, CCAE 1260 may display a question mark ("?") and/or another notification at a cross-connect location on NE-1 to indicate that a transmission associated with optical link 13 is not being routed, added, or dropped by NE-1.

In some implementations, elements 1250-1260 may display a component in a particular manner to indicate a severity of a problem associated with the component. For example, elements 1250-1260 may display a component using a particular color (e.g., red, orange, yellow, green, etc.) based on a severity level associated an alert. Additionally, or alternatively, elements 1250-1260 may provide a mechanism (e.g., a clickable element, a button, a link, etc.) that allows a user to indicate a desire to view alert information associated with an alert, as discussed herein.

Figure 12C:
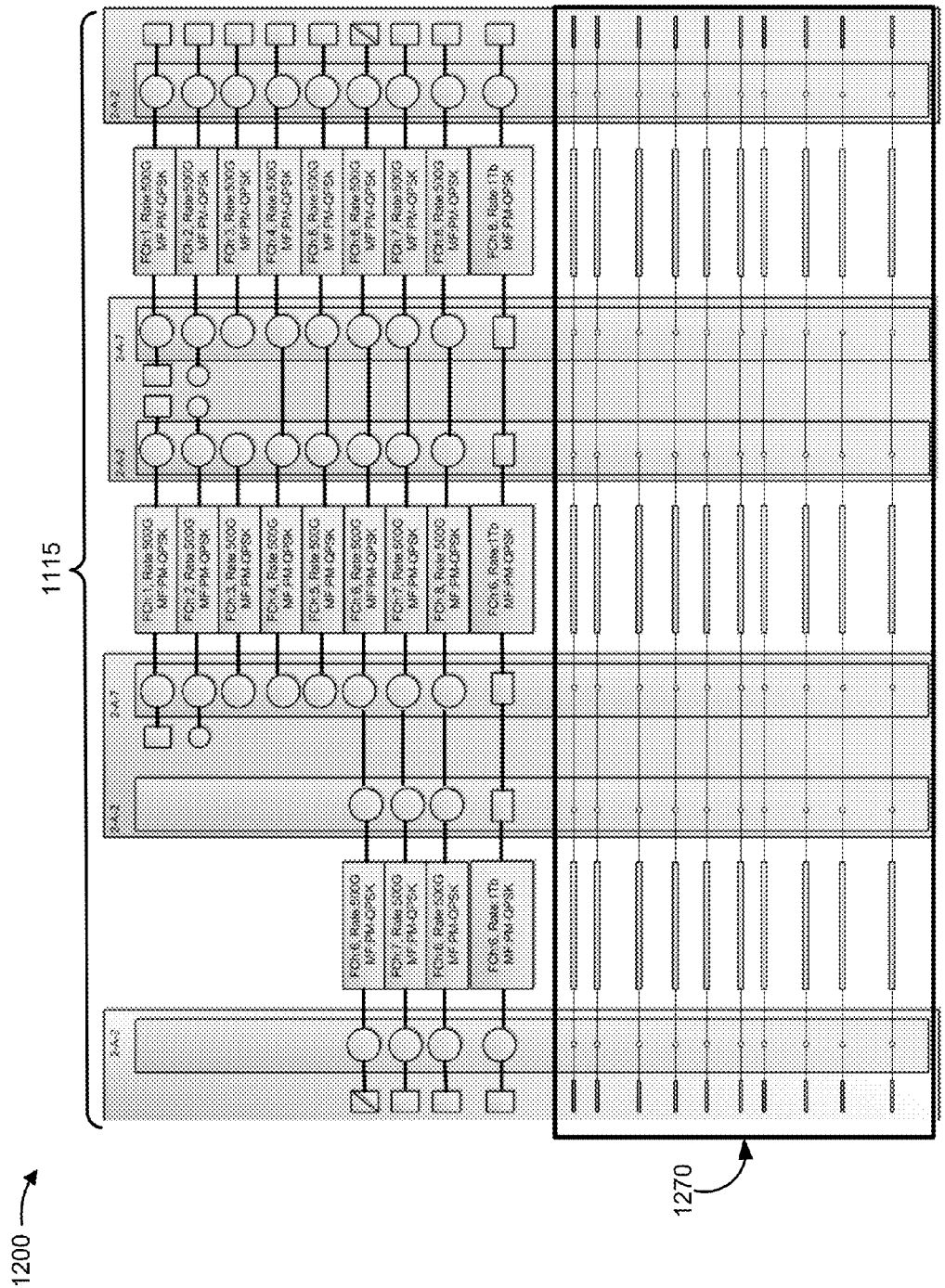

FIG. 12C is a diagram of an example element 1200 of a user interface that displays optical network information. Element 1200 may be displayed by UI 700 (e.g., by optical switching view element 1105). Element 1200 may include route detail view element 1115, as discussed herein in connection with FIG. 11. Additionally, or alternatively, element 1200 may include an optical link physical view 1270. Additionally, or alternatively, element 1200 may include fewer elements, additional elements, different elements, or differently arranged elements than those illustrated in FIG. 12C.

Optical link physical view 1270 may display a physical representation of an optical link. A physical representation may display an optical link with respect to the spectral slices associated with the optical link. For example, an optical link may be an optical carrier group ("OCG"). An OCG may include fixed, non-contiguous, spectral slices (e.g., ten non-contiguous sets of two adjacent spectral slices). Optical link physical view 1270 may display a representation of ten non-contiguous sets of two adjacent spectral slices, as illustrated. In some implementations, the representation of the ten sets of slices may be displayed using a size proportional to the quantity of spectral slices included in each set (e.g., two slices), as illustrated.

Figure 12D:
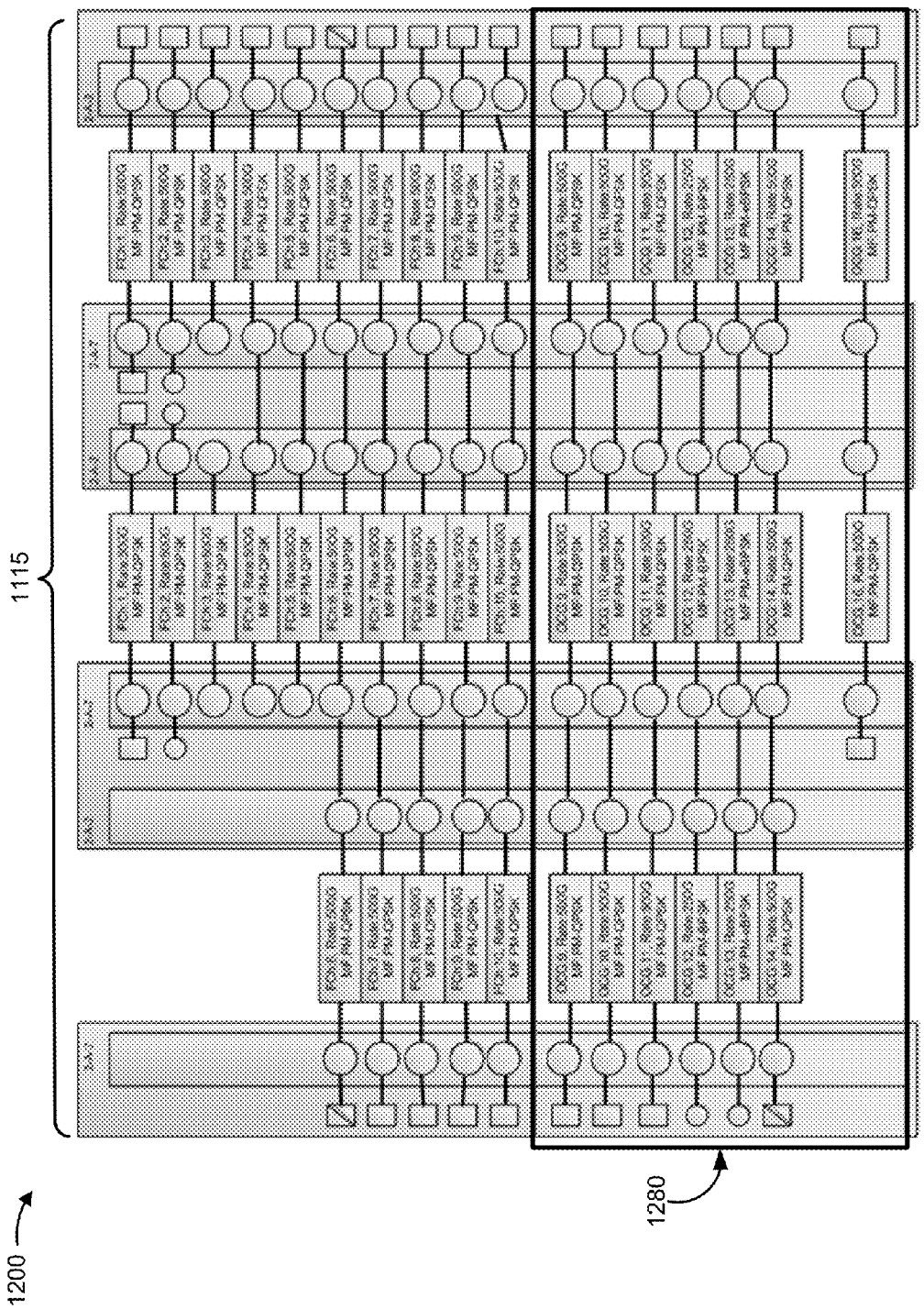

FIG. 12D is a diagram of an example element 1200 of a user interface that displays optical network information. Element 1200 may be displayed by UI 700 (e.g., by optical switching view element 1105). Element 1200 may include route detail view element 1115, as discussed herein in connection with FIG. 11. Additionally, or alternatively, element 1200 may include an optical link logical view 1280. Additionally, or alternatively, element 1200 may include fewer elements, additional elements, different elements, or differently arranged elements than those illustrated in FIG. 12D.

Optical link logical view 1280 may display a logical representation of an optical link. A logical representation may display an optical link as a single end-to-end element, rather than displaying an optical link based on the actual spectral slices included in the optical link. For example, optical link logical view 1280 displays an OCG (e.g., OCGs 9-14 and 16) as an end-to-end element with connections between three nodes, rather than displaying a representation of ten non-contiguous sets of spectral slices.

In some implementations, UI 700 may provide a mechanism (e.g., a check box, a button, a drop-down box, a link, a toggle, etc.) for a user to input an indication of a desire that UI 700 display an optical link using a physical view or a logical view. An element of UI 700 (e.g., route detail view element 1115) may display a physical view of an optical link (e.g., via optical link physical view 1270) or a logical view of an optical link (e.g., via optical link logical view 1280) based on the user input.

Figure 13:
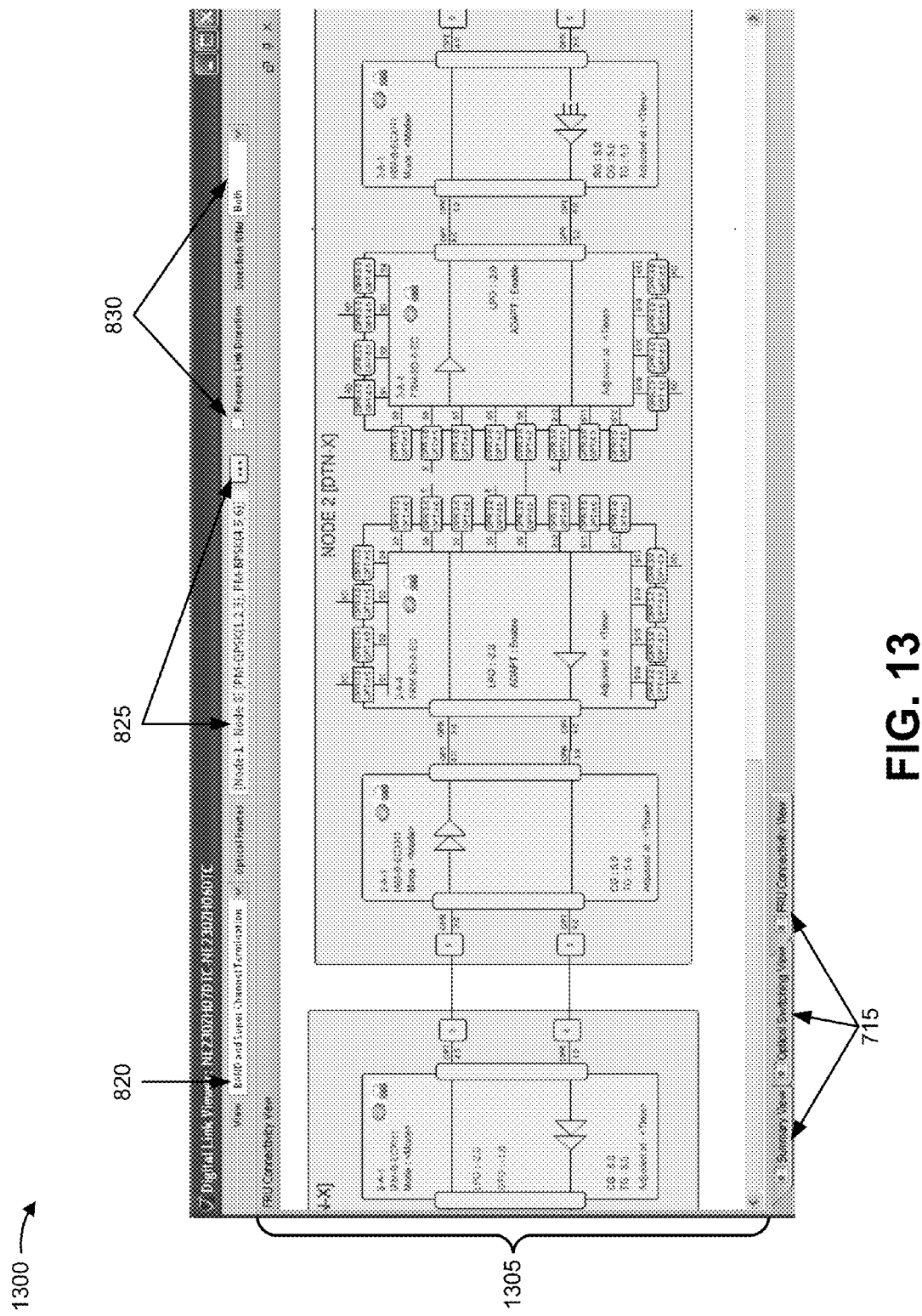

FIG. 13 is a diagram of an example element 1300 of a user interface that displays optical network information. Element 1300 may be displayed by UI 700. Element 1300 may include tab element 715, view selection element 820, route selection element 825, option element 830, and an FRU connectivity view element 1305. Additionally, or alternatively, element 1300 may include fewer elements, additional elements, different elements, or differently arranged elements than those illustrated in FIG. 13.

FRU connectivity view element 1305 may be displayed by graphical element 710. In some implementations, FRU connectivity view element 1305 may be displayed based on user selection of a tab element 715 corresponding to FRU connectivity view element 1305, and/or based on user input via user input element 705 (e.g., view selection element 820, route selection element 825, and/or option element 830).

FRU connectivity view element 1305 may display a representation of NEs 250, a representation of optical links between NEs 250, and/or information associated with the represented NEs 250 and/or the represented optical links. FRU connectivity view element 1305 may display these representations based on user input (e.g., via user input element 705).

View selection element 820 may provide a mechanism (e.g., a drop-down box, a text box, a button, a menu, a link, etc.) for a user to input a view type. User input of a view type may cause UI 700 and/or FRU connectivity view element 1305 to display information based on the user-input view type.

Route selection element 825 may provide a mechanism (e.g., a drop-down box, a text box, a button, a menu, a link, etc.) that allows a user to input an optical route, an optical link, and/or NE 250 to be displayed by FRU connectivity view element 1305. The user may input an optical route identifier, a set of NEs 250, a set of optical links, and/or any other information that identifies an optical route, a set of NEs 250, and/or a set of optical links. In some implementations, FRU connectivity view element 1305 may display the optical route, the set of NEs 250, and/or the set of optical links based on the user input.

For example, in FIG. 13, a user has selected (via route element 825) an optical route that connects node 1 to node 8 (e.g., NE-1 through NE-8). FRU connectivity view element 1305 may display a representation of the selected optical route. For example, FRU connectivity view element 1305 may display a representation of nodes 1 through 8. Additionally, or alternatively, FRU connectivity view element 1305 may display information associated with a displayed node. In some implementations, FRU connectivity view element 1305 may provide a scroll bar that may be used to display a portion of the selected optical route (e.g., node 2 of nodes 1 through 8, as illustrated).

Option element 830 may provide a mechanism (e.g., a button, a check box, a drop-down box, a menu, etc.) that allows a user to input display options, as discussed herein in connection with FIG. 8.

Figure 14A:
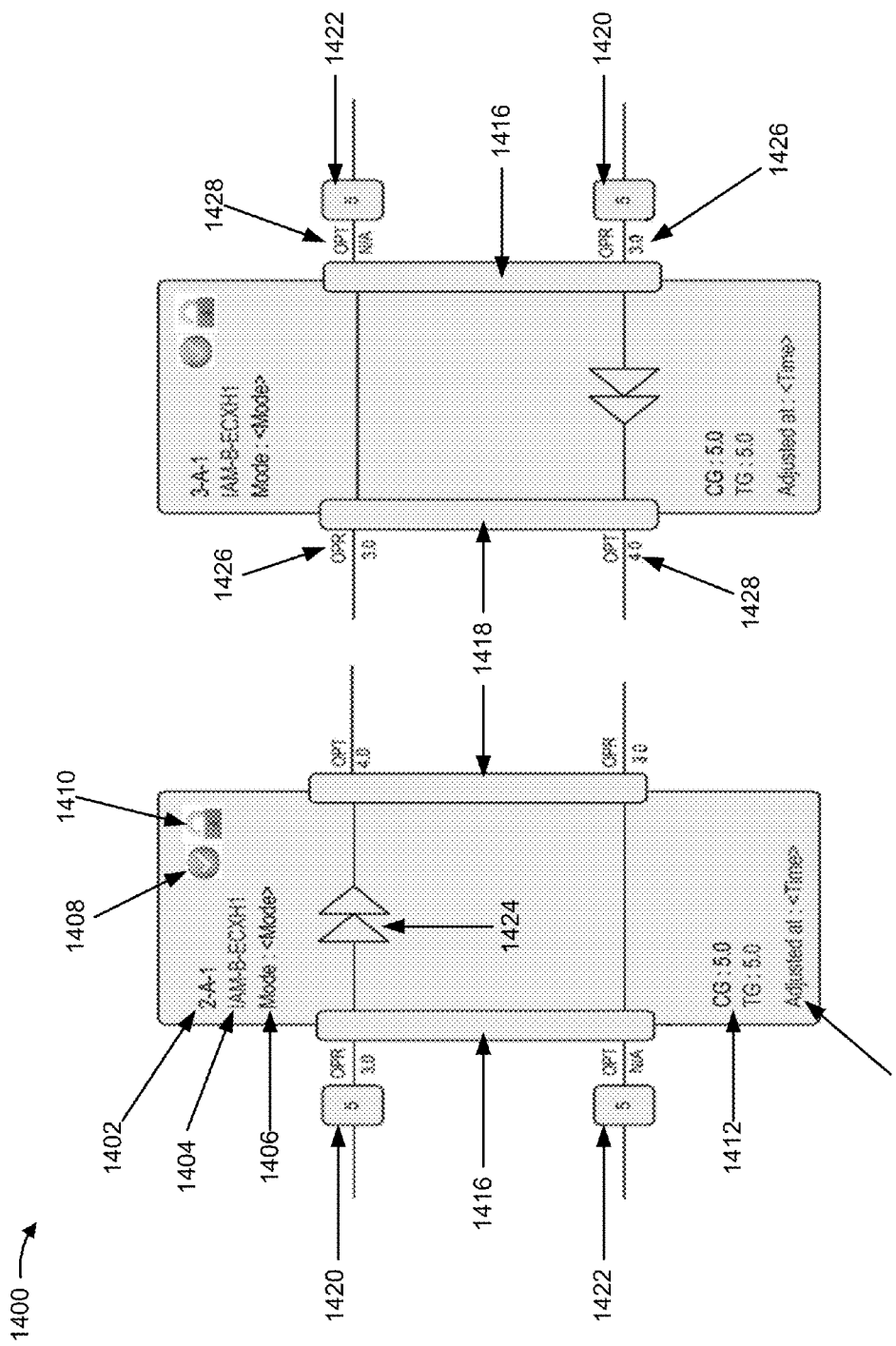

FIG. 14A is a diagram of an example element 1400 of a user interface that displays optical network information. Element 1400 may be displayed by UI 700 (e.g., by FRU connectivity view element 1305). Element 1400 may include component information elements 1402-1428 (hereinafter referred to collectively as "CIEs," and individually as "CIE"). Additionally, or alternatively, element 1400 may include fewer elements, additional elements, different elements, or differently arranged elements than those illustrated in FIG. 14A.

Element 1400 may represent an optical amplifier, such as an erbium doped fiber amplifier ("EDFA"), a Raman amplifier ("RA"), an inline amplifier module ("IAM") and/or an inline Raman module ("IRM"). Element 1400 may be displayed based on user input that identifies an optical component (e.g., a node, an NE 250, and/or a component of a node and/or NE 250) to display (e.g., via user input element 705). For example, FIG. 14A may represent two IAMs.

Element 1400 may be displayed by UI 700 based on user input of a view type (e.g., via user input element 705 and/or view selection element 820). For example, FIG. 14A may represent elements that are displayed when a user has input a data channel view (e.g., BAND), a combined control channel and data channel view (e.g., OTS), and/or a combined data channel and optical link termination view (e.g., BAND/OL).

CIE 1402 may display information that identifies a displayed component (e.g., an IAM) using an identifier (e.g., a number, a label, text, etc.). For example, CIE 1402 may display "2-A-1" to identify a displayed IAM, as illustrated.

CIE 1404 may display information that identifies an equipment type (e.g., a type of IAM) associated with a displayed component. An equipment type may include a type of component (e.g., optical amplifier, IAM, IRM, etc.), a version number, a model number, a vendor and/or provider, etc. For example, CIE 1404 may display "IAM-B-ECXH1" to identify the equipment type of a displayed IAM, as illustrated.

CIE 1406 may display information that identifies an operating mode associated with a displayed component. An operating mode may specify information to be transmitted by a component. For example, an operating mode may specify that only information carried on a data channel should be transmitted by the component, only information carried on a control channel should be transmitted by the component, and/or information carried on both a data channel and a control channel should be transmitted by the component.

CIE 1408 may display information that identifies a service state associated with a displayed component. A service state may include in-service (e.g., a component is working properly) or out-of-service (e.g., a component is not working properly). Additionally, or alternatively, CIE 1408 may display an alert (e.g., a warning, an issue, a problem, a notification, etc.) associated with a displayed component. CIE 1408 may display different identifiers (e.g., symbols, labels, images, text, colors, etc.) to represent different service states. For example, CIE 1408 may display a check mark (e.g., in green) to represent that IAM 2-A-1 is in-service, as illustrated.

CIE 1410 may display information that identifies an administrative state associated with a displayed component. An administrative state may include locked or unlocked. A locked administrative state may take a component out of service, and may allow a user to change a configuration and/or a parameter associated with a component. An unlocked administrative state may prevent a user from changing one or more parameters and/or configurations associated with a component. In some implementations, a component may be in-service only when unlocked. CIE 1410 may display different identifiers (e.g., symbols, labels, text, images, colors, etc.) to represent different administrative states. For example, CIE 1410 may display an unlocked padlock to represent that IAM 2-A-1 is in an unlocked administrative state.

CIE 1412 may display information that identifies a parameter associated with a displayed component. A parameter may include, for example, a gain parameter, a span loss parameter, a power parameter, an address parameter, and/or any other parameter associated with a component. A gain parameter may include CG, TG, and/or RG associated with a component, as discussed herein in connection with FIG. 10A. Additionally, or alternatively, a gain parameter may include a gain tilt offset ("GTO"). A gain tilt offset may correct a gain tilt in a signal due to signal amplification (e.g., a distortion of the gain spectrum in an EDFA caused by an unexpected change in the power of input signals entering the EDFA).

CIE 1414 may display adjustment information associated with a displayed component. Adjustment information may include a date and/or time that one or more parameters (e.g., TG, GTO, etc.) associated with a component were last adjusted. In some implementations, a parameter may be automatically adjusted based on an algorithm, a component characteristic, and/or a signal characteristic. Adjustment information may include a date and/or time of a last automatic update. Additionally, or alternatively, a parameter may be manually adjusted. Adjustment information may include a date and/or time of a last manual update.

CIEs 1416 and 1418 may provide a representation of a component port. A component port may be a data channel port (e.g., a BAND port), a control channel port (e.g., an OSC port), and/or a combined data channel port and control channel port (e.g., an OTS port). For example, CIE 1416 may provide a representation of an OTS port where an optical fiber connects to an IAM or IRM (e.g., IAM 2-A-1 and/or IAM 3-A-1, as illustrated). As another example, CIE 1418 may provide a representation of a BAND port where an IAM or IRM connects to an FRM.

CIE 1420 may provide a representation of an attenuator that attenuates a signal being received from a fiber and being transmitted to a component (e.g., an IAM or an IRM). In some implementations, CIE 1420 may provide an indication of an attenuation level associated with the displayed component.

CIE 1422 may provide a representation of an attenuator that attenuates a signal being received from a component (e.g., an IAM or an IRM), and being transmitted to a fiber. In some implementations, CIE 1422 may provide an indication of an attenuation level associated with the displayed component.

CIE 1424 may provide a representation of an amplification type associated with a component. An amplification type may be DFA, EDFA, Raman (e.g., co-propagating or counter-propagating), and/or any other type of amplification and/or combination of amplification types, as discussed herein in connection with FIG. 9A. Additionally, or alternatively, CIE 1424 may provide a representation of an amplification direction, as discussed herein in connection with FIG. 9A. For example, CIE 1424 may represent a two stage EDFA by displaying two triangles, as illustrated.

CIEs 1426 and 1428 may provide a representation of a power parameters associated with a component. A power parameter may include OPR, OPT, PO, and/or another power parameter, as discussed herein in connection with FIG. 10A. For example, CIE 1426 may indicate an OPR of "3.0," and CIE 1428 may indicate an OPT of "4.0." In some implementations, CIE 1426 and/or CIE 1428 may indicate an OPR and/or OPT of "N/A" when it is not possible to determine the OPR and/or OPT value.

Figure 14B:
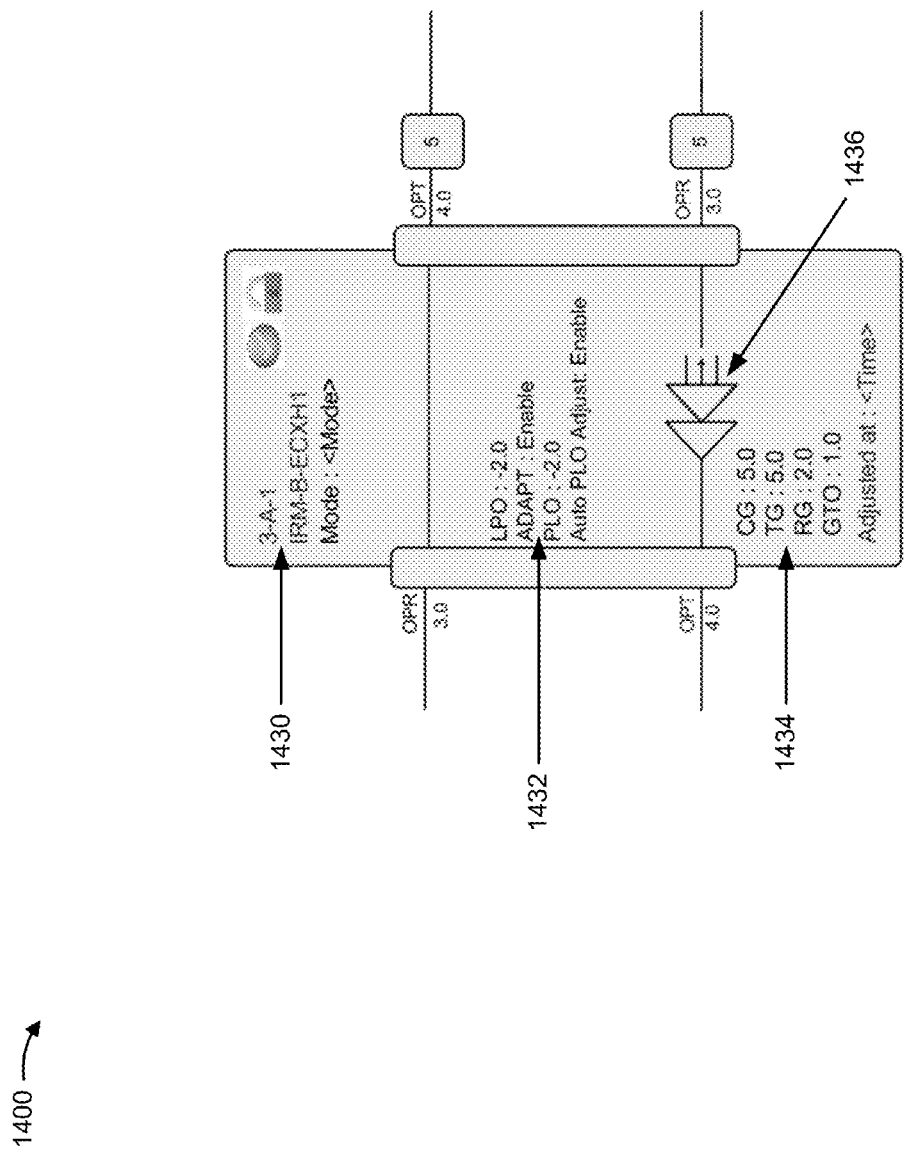

FIG. 14B is a diagram of an example element 1400 of a user interface that displays optical network information. Element 1400 may be displayed by UI 700 (e.g., by FRU connectivity view element 1305). Element 1400 may include CIEs 1402-1428, as discussed herein. Additionally, or alternatively, element 1400 may include CIEs 1430-1436. Additionally, or alternatively, element 1400 may include fewer elements, additional elements, different elements, or differently arranged elements than those illustrated in FIG. 14B.

Element 1400 may be displayed by UI 700 based on user input of a view type (e.g., via user input element 705 and/or view selection element 820). For example, FIG. 14B may represent elements that are displayed when a user has input a data channel view (e.g., BAND), a combined control channel and data channel view (e.g., OTS), and/or a combined data channel and optical link termination view (e.g., BAND/OL).

CIE 1430 may display information that identifies a displayed component (e.g., an IRM), an equipment type (e.g., a type of IRM) of the displayed component, an operating mode associated with the displayed component, a service state associated with the displayed component, and/or an administrative state associated with the displayed component. In some implementations, CIE 1430 may include CIEs 1402-1410. For example, CIE 1430 may identify an IRM as "3-A-1" with an equipment type of "IRM-B-ECXH1," a particular operating mode, a service state of in-service, and an administrative state of unlocked, as illustrated.

CIE 1432 may display information that identifies a power parameter associated with a displayed component. A power parameter may include a launch power offset ("LPO"), a point loss offset ("PLO"), an indication of whether a parameter is being automatically adjusted on a component (e.g., "ADAPT: Enable" and "Auto PLO Adjust: Enable"), and/or other power parameters. LPO and/or PLO may increase or decrease an amount of power associated with an optical transmission. LPO and/or PLO may be displayed in any units of power, such as dBw, dBm, etc.

CIE 1434 may display information that identifies a gain parameter associated with a displayed component. A gain parameter may include a CG, a TG, an RG, a GTO, and/or any other gain parameter associated with a component, as discussed herein.

CIE 1436 may provide a representation of an amplification type associated with a component. An amplification type may be DFA, EDFA, Raman (e.g., co-propagating or counter-propagating), and/or any other type of amplification and/or combination of amplification types, as discussed herein in connection with FIG. 9A. Additionally, or alternatively, CIE 1436 may provide a representation of an amplification direction, as discussed herein in connection with FIG. 9A. For example, CIE 1436 may represent a two stage EDFA and counter-propagating Raman amplification by displaying two triangles alongside an arrow pointing in the opposite direction, as illustrated.

Figure 14C:
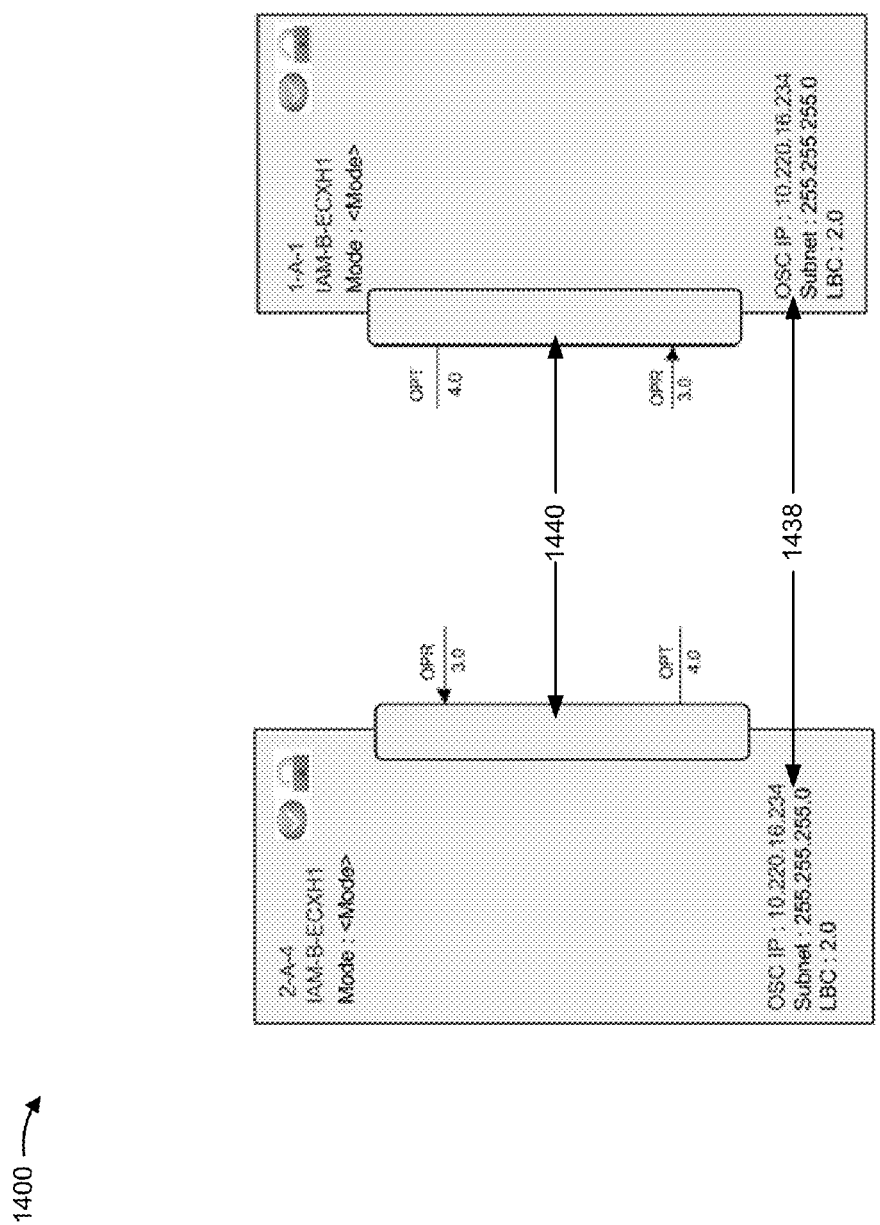

FIG. 14C is a diagram of an example element 1400 of a user interface that displays optical network information. Element 1400 may be displayed by UI 700 (e.g., by FRU connectivity view element 1305). Element 1400 may include CIEs 1402-1436, as discussed herein. Additionally, or alternatively, element 1400 may include CIEs 1438 and 1440. Additionally, or alternatively, element 1400 may include fewer elements, additional elements, different elements, or differently arranged elements than those illustrated in FIG. 14C.

Element 1400 may be displayed by UI 700 based on user input of a view type (e.g., via user input element 705 and/or view selection element 820). FIG. 14C may represent an IAM or IRM where a user has input a control channel view (e.g., OSC).

CIE 1438 may display information that identifies an address parameter of a control channel (e.g., an optical supervisory channel) associated with a displayed component. For example, CIE 1438 may identify an internet protocol ("IP") address and/or a subnet mask address associated with a control channel on the displayed component.

Additionally, or alternatively CIE 1438 may display information that identifies a control parameter associated with a displayed component. For example, CIE 1438 may display information that identifies a laser bias current ("LBC") associated with an optical transmission via the displayed component.

CIE 1440 may provide a representation of a port associated with a component. For example, CIE 1440 may provide a representation of an OSC port where a fiber and/or optical link connects to a control module.

Figure 15:
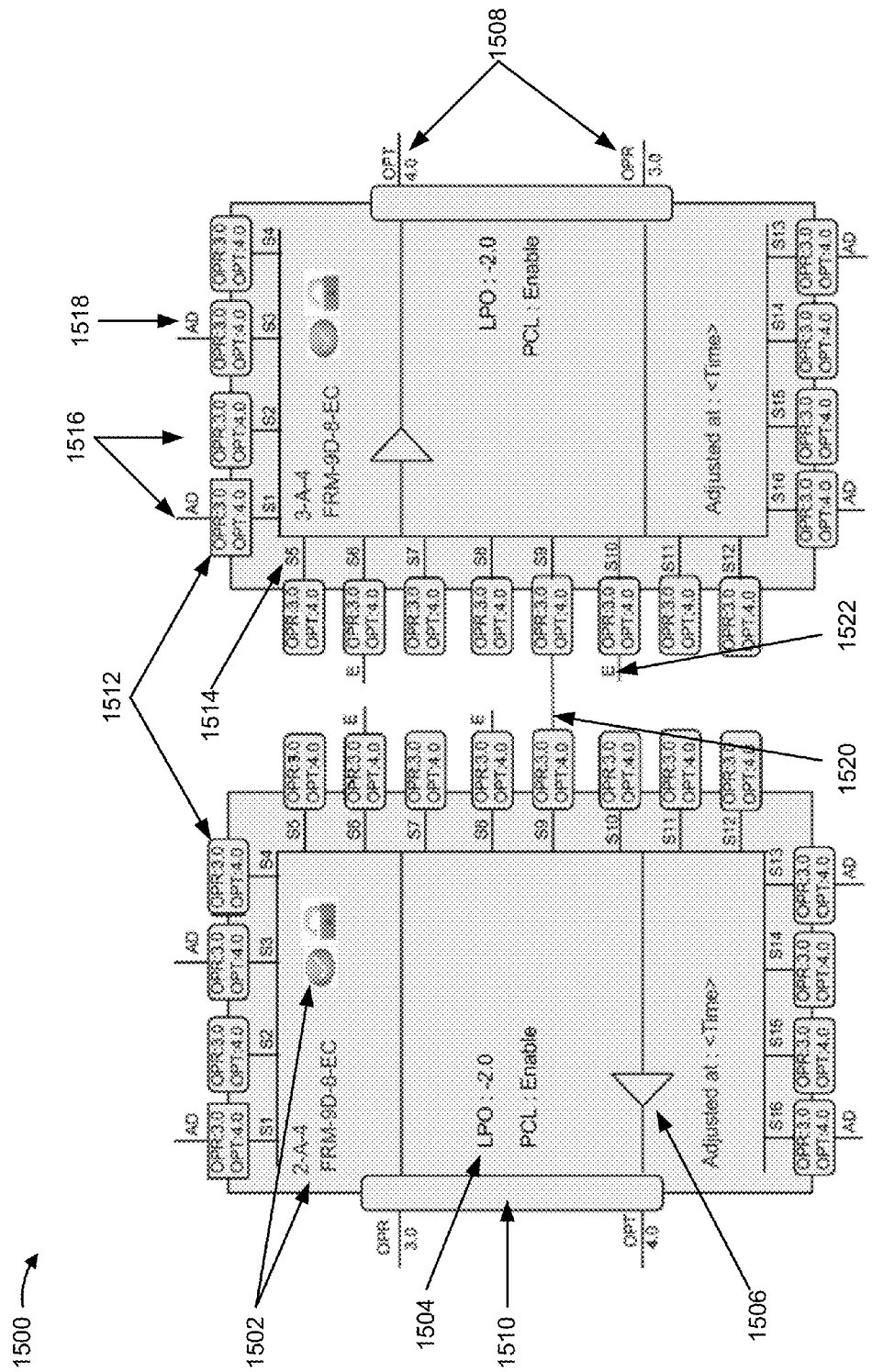

FIG. 15 is a diagram of an example element 1500 of a user interface that displays optical network information. Element 1500 may be displayed by UI 700 (e.g., by FRU connectivity view element 1305). Element 1500 may include CIEs 1402-1436 (not labeled in FIG. 15), as discussed herein. Additionally, or alternatively, element 1500 may include CIEs 1502-1522. Additionally, or alternatively, element 1500 may include fewer elements, additional elements, different elements, or differently arranged elements than those illustrated in FIG. 15.

Element 1500 may represent an FRM capable of receiving an optical signal (e.g., from a fiber and/or an optical network component) and transmitting the optical signal (e.g. to a fiber and/or an optical network component). Element 1500 may be displayed based on user input that identifies an optical component to display (e.g., via user input element 705). For example, FIG. 15 may represent two FRMs on a node.

Element 1500 may be displayed by UI 700 based on user input of a view type (e.g., via user input element 705 and/or view selection element 820). For example, elements 1500 may represent elements that are displayed when a user has input a data channel view (e.g., BAND), a combined control channel and data channel view (e.g., OTS), and/or a combined data channel and optical link termination view (e.g., BAND/OL).

CIE 1502 may display information that identifies a displayed component (e.g., an FRM), an equipment type (e.g., a type of FRM) of the displayed component, an operating mode associated with the displayed component, a service state associated with the displayed component, and/or an administrative state associated with the displayed component. In some implementations, CIE 1502 may include CIEs 1402-1410 and/or 1430. For example, CIE 1502 may identify an FRM as "2-A-4" with an equipment type of "FRM-9D-8-EC," a service state of in-service, and an administrative state of unlocked, as illustrated.

CIE 1504 may display information that identifies a power parameter and/or another parameter associated with a displayed component. In some implementations, CIE 1504 may include CIEs 1412, 1414, 143, and/or 1434. A power parameter may include an LPO, a PLO, an indication of whether parameters are being automatically adjusted on a component (e.g., "ADAPT: Enable," "Auto PLO Adjust: Enable," and/or "PCL: Enable"), and/or other power parameters.

CIE 1506 may provide a representation of an amplification type associated with a component. An amplification type may be DFA, EDFA, Raman (e.g., co-propagating or counter-propagating), and/or any other type of amplification and/or combination of amplification types, as discussed herein in connection with FIG. 9A. Additionally, or alternatively, CIE 1506 may provide a representation of an amplification direction, as discussed herein in connection with FIG. 9A. For example, CIE 1506 may represent single stage EDFA by displaying one triangle, as illustrated.

CIE 1508 may provide a representation of a power parameter associated with a component. A power parameter may include OPR, OPT, PO, and/or other power parameters, as discussed herein in connection with FIG. 10A. For example, CIE 1508 may indicate an OPR of "3.0" received at a displayed FRM, and an OPT of "4.0" transmitted by a displayed FRM. In some implementations, CIE 1508 may indicate an OPR and/or OPT of "N/A" when it is not possible to determine the OPR and/or OPT value.

CIE 1510 may provide a representation of a port associated with a component. In some implementations, CIE 1510 may include CIEs 1416 and/or 1418. Additionally, or alternatively, CIE 1510 may represent an FRM line port (e.g., a connection point on an FRM for a data channel). An FRM may de-multiplex signals received from a data channel and transmit the de-multiplexed signals to different system ports.

CIE 1512 may provide a representation of a port associated with a component. For example, CIE 1512 may represent a system port on an FRM and/or on a node. A system port may be a location where an optical signal is transmitted to and/or received from another component. In some implementations, CIE 1512 may provide a representation of a power parameter associated with a port (e.g., OPR at a port, OPT at a port, etc.).

CIE 1514 may display information that identifies a port (e.g., a system port). For example, a system port may be identified as "S5," as illustrated. Additionally, or alternatively, CIE 1514 may use a different identifier (e.g., text, an image, a symbol, etc.) to identify a port.

CIE 1516 may provide a representation of whether a port is connected another port and/or component. For example, CIE 1516 may display a line to indicate that a port is connected to another component, and may not display a line to indicate that a port is not connected to another component. Additionally, or alternatively, CIE 1516 may use a different identifier (e.g., text, an image, a symbol, etc.) to identify whether a port is connected to another component.

CIE 1518 may provide a representation of an add/drop location for an optical transmission. For example, CIE 1518 may display "AD" to indicate that an optical transmission is added or dropped at port S3, as illustrated. Additionally, or alternatively, CIE 1518 may use a different identifier (e.g., text, an image, a symbol, etc.) to indicate that an optical transmission is added or dropped at a port.

CIE 1520 may provide a representation of an optical transmission between displayed ports. For example, CIE 1520 may display a line connecting two ports when an optical transmission has been allocated and/or is being transmitted between the two ports (e.g., port S9 on FRM 2-A-4 and port S9 on FRM 3-A-4, as illustrated).

CIE 1522 may provide a representation of an optical transmission between a displayed component and a component that is not displayed. For example, CIE 1522 may display a line and/or an "E" to indicate that an optical transmission has been allocated and/or is being transmitted between a displayed port (e.g., port S10 on FRM 3-A-4) and a port that is not displayed (e.g., the optical transmission has been expressed in a direction other than between the displayed FRMs).

Figure 16:
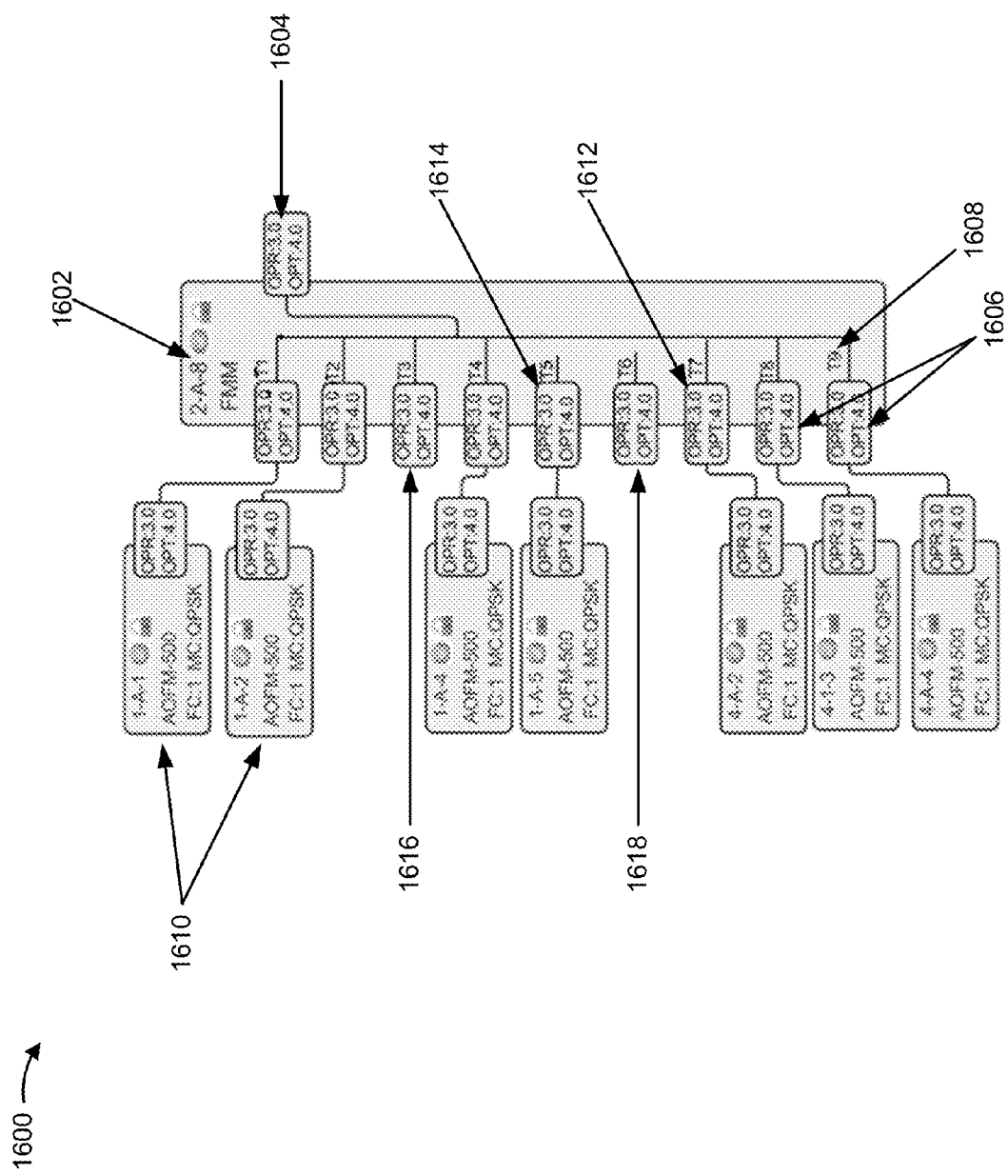

FIG. 16 is a diagram of an example element 1600 of a user interface that displays optical network information. Element 1600 may be displayed by UI 700 (e.g., by FRU connectivity view element 1305). Element 1600 may include CIEs 1602-1618. Additionally, or alternatively, element 1600 may include fewer elements, additional elements, different elements, or differently arranged elements than those illustrated in FIG. 16.

Element 1600 may represent an OADM capable of receiving an optical signal (e.g., from a fiber and/or an optical network component) and transmitting the optical signal (e.g. to a fiber and/or an optical network component). For example, element 1600 may represent an OADM with a single line port (identified in the figures as "FMM"). Element 1600 may be displayed based on user input that identifies an optical component to display (e.g., via user input element 705). For example, FIG. 16 may represent an FMM connected to an FRM and a source/destination component. An FMM may be referred to as a source device or a destination device herein.

Element 1600 may be displayed by UI 700 based on user input of a view type (e.g., via user input element 705 and/or view selection element 820). For example, elements 1600 may be displayed when a user has input an optical link termination view (e.g., OL), and/or a data channel and optical link termination view (e.g., BAND/OL).

CIE 1602 may display information that identifies a displayed component (e.g., an FMM), an equipment type (e.g., a type of FMM) of the displayed component, an operating mode associated with the displayed component, a service state associated with the displayed component, and/or an administrative state associated with the displayed component. For example, CIE 1602 may identify an FMM as "2-A-8" with an equipment type of "FMM," a service state of in-service, and an administrative state of unlocked, as illustrated.

CIE 1604 may provide a representation of a port associated with a component. For example, CIE 1604 may represent a line port on an FMM. A line port on an FMM may be a location where an optical signal is transmitted to and/or received from another component (e.g., an FRM). In some implementations, CIE 1604 may provide a representation of a power parameter associated with a port (e.g., OPR at a port, OPT at a port, etc.).

CIE 1606 may provide a representation of a port associated with a component. For example, CIE 1606 may represent an add/drop port on an FMM. An add/drop port on an FMM may be a location where an optical signal is transmitted to and/or received from another component (e.g., an optical source and/or destination component, a line module, etc.). In some implementations, CIE 1606 may provide a representation of a power parameter associated with a port (e.g., OPR at a port, OPT at a port, etc.).

CIE 1608 may display information that identifies a port (e.g., an add/drop port, a tributary port, etc.). For example, an add/drop port may be identified as "T9," as illustrated. Additionally, or alternatively, CIE 1608 may use a different identifier (e.g., text, an image, a symbol, etc.) to identify a port.

CIE 1610 may provide a representation of a line module (e.g., a source and/or destination component) connected to an FMM. CIE 1610 may provide the representation based on user input. For example, the provided representation may include a line module associated with a user-specified optical route. A line module representation is discussed in more detail herein in connection with FIG. 18.

CIE 1612 may provide a representation of an add/drop port that is connected to a line port (e.g., a line port that connects to an FRM), and is connected to a line module (e.g., a source/destination component). For example, CIE 1612 may display a line connecting an add/drop port to a line port, and may display a line connecting the add/drop port to a line module, as illustrated.

CIE 1614 may provide a representation of an add/drop port that is connected to a line module (e.g., a source/destination component), but is not connected to a line port (e.g., a line port that connects to an FRM). For example, CIE 1614 may display a line connecting an add/drop port to a line module, and may not display a line connecting the add/drop port to a line port, as illustrated.

CIE 1616 may provide a representation of an add/drop port that is connected to a line port (e.g., a line port that connects to an FRM), but is not connected to a line module (e.g., a source/destination component). For example, CIE 1616 may display a line connecting an add/drop port to a line port, and may not display a line connecting the add/drop port to a line module (and/or may not display a line module), as illustrated.

CIE 1618 may provide a representation of an add/drop port that is not connected to a line port (e.g., a line port that connects to an FRM), and is not connected to a line module (e.g., a source/destination component). For example, CIE 1618 may not display a line connecting an add/drop port to a line port, and may not display a line connecting the add/drop port to a line module (and/or may not display a line module), as illustrated.

Figure 17:
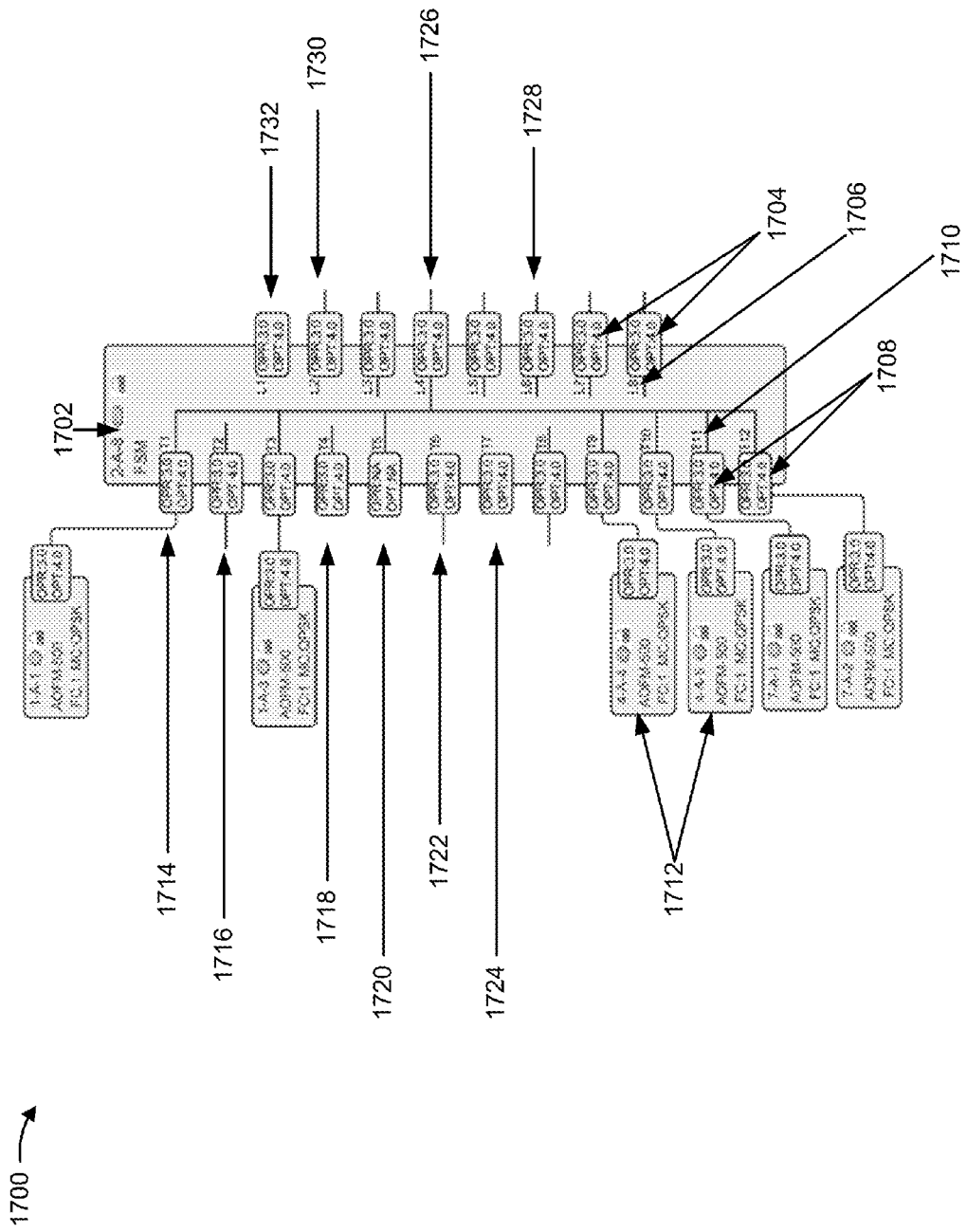

FIG. 17 is a diagram of an example element 1700 of a user interface that displays optical network information. Element 1700 may be displayed by UI 700 (e.g., by FRU connectivity view element 1305). Element 1700 may include CIEs 1702-1732. Additionally, or alternatively, element 1700 may include fewer elements, additional elements, different elements, or differently arranged elements than those illustrated in FIG. 17.

Element 1700 may represent an OADM capable of receiving an optical signal (e.g., from a fiber and/or an optical network component) and transmitting the optical signal (e.g. to a fiber and/or an optical network component). For example, element 1700 may represent an OADM with multiple line ports (identified in the figure as "FSM"). Element 1700 may be displayed based on user input that identifies an optical component to display (e.g., via user input element 705). For example, FIG. 17 may represent an FSM connected to an FRM and a source/destination component. An FSM may be referred to as a source device or a destination device herein.

Element 1700 may be displayed by UI 700 based on user input of a view type (e.g., via user input element 705 and/or view selection element 820). For example, element 1700 may be displayed when a user has input an optical link termination view (e.g., OL), and/or a data channel and optical link termination view (e.g., BAND/OL).

CIE 1702 may display information that identifies a displayed component (e.g., an FSM), an equipment type (e.g., a type of FSM) of the displayed component, an operating mode associated with the displayed component, a service state associated with the displayed component, and/or an administrative state associated with the displayed component. For example, CIE 1702 may identify an FSM as "2-A-8" with an equipment type of "FSM," a service state of in-service, and an administrative state of unlocked, as illustrated.

CIE 1704 may provide a representation of a port associated with a component. For example, CIE 1704 may represent a line port on an FSM. A line port on an FSM may be a location where an optical signal is transmitted to and/or received from another component (e.g., an FRM). In some implementations, CIE 1704 may provide a representation of a power parameter associated with a port (e.g., OPR at a port, OPT at a port, etc.).

CIE 1706 may display information that identifies a port (e.g., a line port). For example, a line port may be identified as "L8," as illustrated. Additionally, or alternatively, CIE 1706 may use a different identifier (e.g., text, an image, a symbol, etc.) to identify a port.

CIE 1708 may provide a representation of a port associated with a component. For example, CIE 1708 may represent an add/drop port on an FSM. An add/drop port on an FSM may be a location where an optical signal is transmitted to and/or received from another component (e.g., an optical source and/or destination component, a line module, etc.). In some implementations, CIE 1708 may provide a representation of a power parameter associated with a port (e.g., OPR at a port, OPT at a port, etc.).

CIE 1710 may display information that identifies a port (e.g., an add/drop port, a tributary port, etc.). For example, an add/drop port may be identified as "T11," as illustrated. Additionally, or alternatively, CIE 1710 may use a different identifier (e.g., text, an image, a symbol, etc.) to identify a port.

CIE 1712 may provide a representation of a line module (e.g., a source and/or destination component) connected to an FSM. CIE 1712 may provide the representation based on user input. For example, the provided representation may include a line module associated with a user-specified optical route. A line module representation is discussed in more detail herein in connection with FIG. 18.

CIE 1714 may provide a representation of an add/drop port that is connected to a line port associated with a user-specified route and/or optical link, and is connected to a line module (e.g., a source/destination component). For example, a user may input an optical route associated with line port L4. CIE 1714 may display a line connecting add/drop port T1 to line port L4, and may display a line connecting add/drop port T1 to a line module, as illustrated.

CIE 1716 may provide a representation of an add/drop port that is connected to a line port associated with a route other than a user-specified route, and is connected to a line module (e.g., a source/destination component). For example, a user may input an optical route associated with line port L4. CIE 1716 may display a line from add/drop port T2 that does not connect to line port L4 to indicate that add/drop port T2 is connected to a line port other than line port L4. CIE 1716 may also display a line from add/drop port T2 to indicate that add/drop port T2 is connected to a line module (e.g., a line extending to the left of add/drop port T2, as illustrated).

CIE 1718 may provide a representation of an add/drop port that is connected to a line port associated with a route other than a user-specified route, and is not connected to a line module (e.g., a source/destination component). For example, a user may input an optical route associated with line port L4. CIE 1718 may display a line from add/drop port T4 that does not connect to line port L4 to indicate that add/drop port T4 is connected to a line port other than line port L4. CIE 1718 may not display a line from add/drop port T4 (e.g. may not display a line extending to the left of add/drop port T4, as illustrated) to indicate that add/drop port T4 is not connected to a line module.

CIE 1720 may provide a representation of an add/drop port that is connected to a line port associated with a user-specified route, but is not connected to a line module (e.g., a source/destination component). For example, a user may input an optical route associated with line port L4. CIE 1720 may display a line connecting add/drop port T5 to line port L4 to indicate that add/drop port T5 is connected to line port L4. CIE 1720 may not display a line from add/drop port T5 (e.g. may not display a line extending to the left of add/drop port T5, as illustrated) to indicate that add/drop port T5 is not connected to a line module.

CIE 1722 may provide a representation of an add/drop port that is not connected to a line port, but is connected to a line module (e.g., a source/destination component). For example, CIE 1722 may not display a line from add/drop port T6 (e.g. may not display a line extending to the right of add/drop port T6, as illustrated) to indicate that add/drop port T6 is not connected to a line port. CIE 1722 may display a line from add/drop port T6 to indicate that add/drop port T6 is connected to a line module (e.g., a line extending to the left of add/drop port T6, as illustrated).

CIE 1724 may provide a representation of an add/drop port that is not connected to a line port, and is not connected to a line module (e.g., a source/destination component). For example, CIE 1724 may not display a line from add/drop port T7 (e.g. may not display a line extending to the right of add/drop port T7, as illustrated) to indicate that add/drop port T7 is not connected to a line port. CIE 1724 may not display a line from add/drop port T7 (e.g. may not display a line extending to the left of add/drop port T7, as illustrated) to indicate that add/drop port T7 is not connected to a line module.

CIE 1726 may provide a representation of a line port, associated with a user-specified route, that is connected to an add/drop port on an FSM (e.g., one or more of add/drop ports T1-T12), and is connected to a port on another component (e.g., a port on an FRM). For example, a user may input an optical route associated with line port L4. CIE 1726 may display a line (e.g., extending to the right, as illustrated) to indicate that line port L4 is connected to a port on an FRM. CIE 1726 may also display a line connecting line port L4 to an add/drop port on the displayed component (e.g., ports T1, T5, and T9-T12 on FSM 2-A-8, as illustrated), to indicate that line port L4 is connected to the add/drop ports on the FSM.

CIE 1728 may provide a representation of a line port, not associated with a user-specified route, that is connected to an add/drop port on the displayed component (e.g., ports T1-T12 on FSM 2-A-8), and is connected to a port on another component (e.g., a port on an FRM). For example, a user may input an optical route associated with line port L4. CIE 1728 may display a line (e.g., extending to the right, as illustrated) to indicate that line port L6 (not specified by the user) is connected to a port on an FRM. CIE 1728 may also display a line (e.g., extending to the left, as illustrated) to indicate that line port L6 (not specified by the user) is connected to an add/drop port on the FSM (e.g., add/drop port T2, T4, and/or T8).

CIE 1730 may provide a representation of a line port, not associated with a user-specified route, that is connected to a port on another component (e.g., a port on an FRM), but is not connected to an add/drop port on the displayed component (e.g., ports T1-T12 on FSM 2-A-8). For example, a user may input an optical route associated with line port L4. CIE 1730 may display a line (e.g., extending to the right, as illustrated) to indicate that line port L2 (not specified by the user) is connected to a port on an FRM. CIE 1730 may not display a line (e.g., may not display a line extending to the left of line port L2, as illustrated) to indicate that line port L2 (not specified by the user) is not connected to an add/drop port on the FSM.

CIE 1732 may provide a representation of a line port, not associated with a user-specified route, that is not connected to a port on another component (e.g., a port on an FRM), and is not connected to an add/drop port on the displayed component (e.g., ports T1-T12 on FSM 2-A-8). For example, a user may input an optical route associated with line port L4. CIE 1732 may not display a line (e.g., may not display a line extending to the right of line port L1, as illustrated) to indicate that line port L1 (not specified by the user) is not connected to a port on an FRM. CIE 1732 may also not display a line (e.g., may not display a line extending to the left of line port L1, as illustrated) to indicate that line port L1 (not specified by the user) is not connected to an add/drop port on the FSM.

Figure 18:
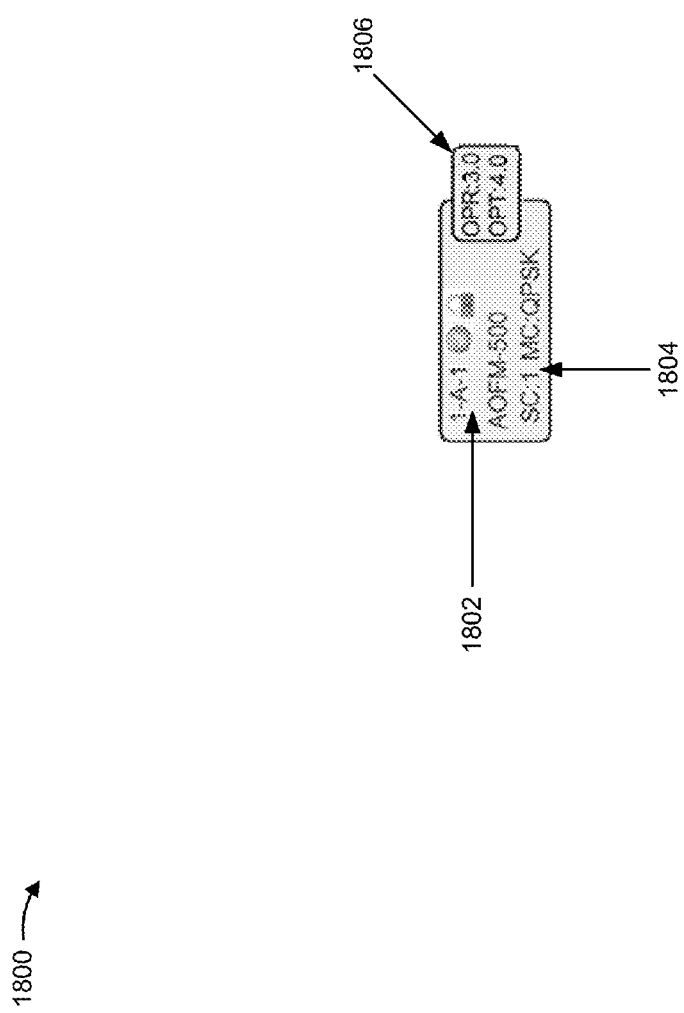

FIG. 18 is a diagram of an example element 1800 of a user interface that displays optical network information. Element 1800 may be displayed by UI 700 (e.g., by FRU connectivity view element 1305). Element 1800 may include CIEs 1802-1806. Additionally, or alternatively, element 1800 may include fewer elements, additional elements, different elements, or differently arranged elements than those illustrated in FIG. 18.

Element 1800 may represent a source/destination component capable of receiving an optical signal (e.g., from a fiber and/or an optical network component) and transmitting an optical signal (e.g. to a fiber and/or an optical network component). Element 1800 may be displayed based on user input that identifies an optical component to display (e.g., via user input element 705).

Elements 1800 may be displayed by UI 700 based on user input of a view type (e.g., via user input element 705 and/or view selection element 820). For example, elements 1800 may be displayed when a user has input an optical link termination view (e.g., OL), and/or a data channel and optical link termination view (e.g., BAND/OL).

CIE 1802 may display information that identifies a displayed component (e.g., a source/destination component), an equipment type (e.g., a type of source/destination component) of the displayed component, an operating mode associated with the displayed component, a service state associated with the displayed component, and/or an administrative state associated with the displayed component. For example, CIE 1802 may identify a source/destination component as "1-A-1" with an equipment type of "AOFM-500," a service state of in-service, and an administrative state of unlocked, as illustrated.

CIE 1804 may display information that identifies an optical link type, an optical link identifier, and/or an optical link modulation format associated with a source/destination component (e.g., an optical link capable of being transmitted and/or received by the source/destination component). For example, CIE 1804 may identify an optical link associated with source/destination component 1-A-1 as super-channel 1 ("SC: 1," as illustrated), with a modulation format of "QPSK," as illustrated.

CIE 1806 may identify a port on a source/destination component. For example, CIE 1806 may identify a port on a source/destination component that may communicate with a port on another component (e.g., an FSM and/or an FMM). In some implementations, CIE 1806 may provide a representation of a power parameter associated with the port (e.g., OPR at the port, OPT at the port, etc.).

Figure 19A:
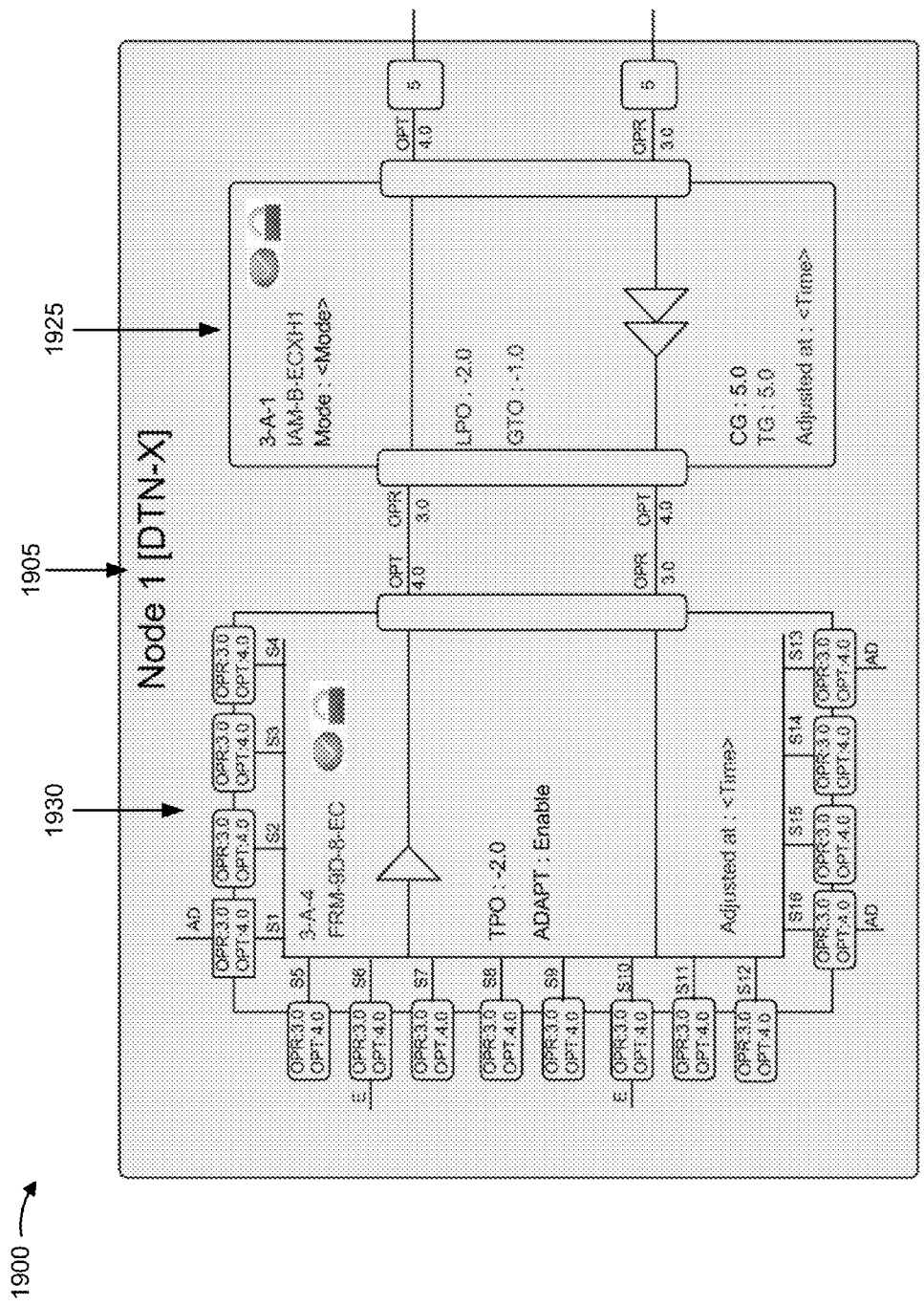

FIG. 19A is a diagram of an example element 1900 of a user interface that displays optical network information. Element 1900 may be displayed by UI 700 (e.g., by FRU connectivity view element 1305). Element 1900 may include CIEs 1905, 1925, and 1930. Additionally, or alternatively, element 1900 may include fewer elements, additional elements, different elements, or differently arranged elements than those illustrated in FIG. 19A.

CIEs 1905, 1925, and/or 1930 may be displayed by UI 700 based on user input of a view type (e.g., via user input element 705 and/or view selection element 820). For example, CIEs 1905, 1925, and/or 1930 may represent elements that are displayed when a user has input a data channel view (e.g., BAND), a combined control channel and data channel view (e.g., OTS), and/or a combined data channel and optical link termination view (e.g., BAND/OL).

CIE 1905 may display a representation of an add/drop terminal site at a node (e.g., Node 1). CIE 1905 may display an equipment type associated with the add/drop terminal site (e.g., DTN-X). The add/drop terminal site may include an IAM or an IRM, connected to an FRM, as illustrated. The displayed components (e.g., IAM, IRM and/or FRM) may be associated with a user-specified optical route. CIE 1905 may provide an indication of ports on the displayed components (e.g., IAM, IRM, and/or FRM) that are connected (e.g., by displaying a line connecting the ports).

CIE 1925 may correspond to an IAM or an IRM in a view that includes a data channel (e.g., BAND, OTS, and/or BAND/OL), as discussed herein in connection with FIGS. 14A and 14B.

CIE 1930 may correspond to an FRM, as discussed herein in connection with FIG. 15.

Figure 19B:
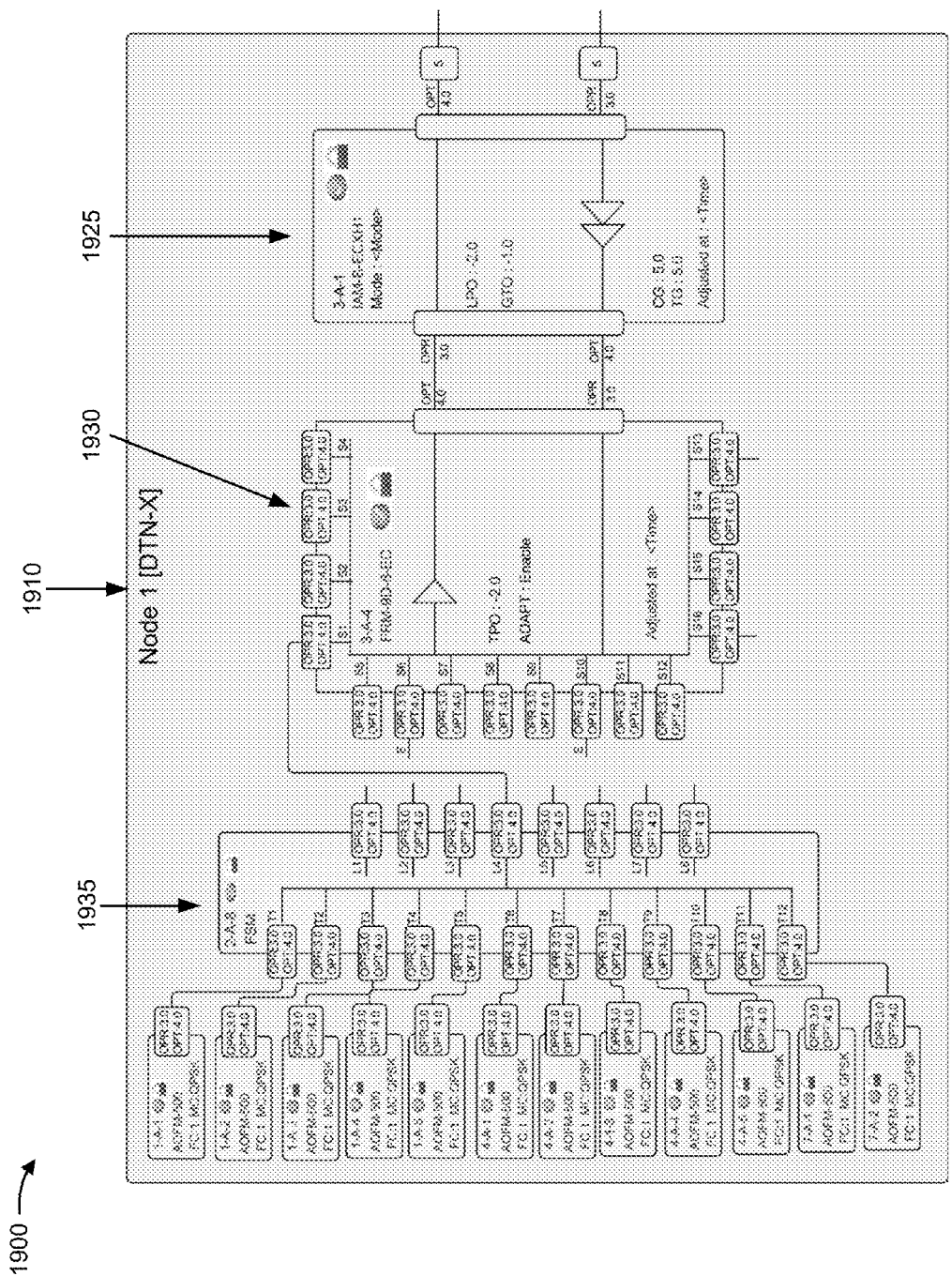

FIG. 19B is a diagram of an example element 1900 of a user interface that displays optical network information. Element 1900 may be displayed by UI 700 (e.g., by FRU connectivity view element 1305). Element 1900 may include CIEs 1910 and 1925-1935. Additionally, or alternatively, element 1900 may include fewer elements, additional elements, different elements, or differently arranged elements than those illustrated in FIG. 19B.

CIEs 1910 and 1925-1935 may be displayed by UI 700 based on user input of a view type (e.g., via user input element 705 and/or view selection element 820). For example, CIEs 1910 and 1925-1935 may be displayed when a user has input an optical link termination view (e.g., OL), and/or a data channel and optical link termination view (e.g., BAND/OL).

CIE 1910 may display a representation of an add/drop terminal site at a node (e.g., Node 1). CIE 1910 may display an equipment type associated with the add/drop terminal site (e.g., DTN-X). The add/drop terminal site may include an IAM or an IRM, connected to an FRM, which is connected to an FSM, as illustrated. The displayed components (e.g., IAM, IRM, FRM, and/or FSM) may be associated with a user-specified optical route. CIE 1910 may provide an indication of ports on the displayed components (e.g., IAM, IRM, FRM, and/or FSM) that are connected (e.g., by displaying a line connecting the ports).

CIE 1925 may correspond to an IAM or an IRM in a view that includes a data channel (e.g., BAND, OTS, and/or BAND/OL), as discussed herein in connection with FIGS. 14A and 14B.

CIE 1930 may correspond to an FRM, as discussed herein in connection with FIG. 15.

CIE 1935 may correspond to an FSM, as discussed herein in connection with FIG. 17.

Figure 19C:
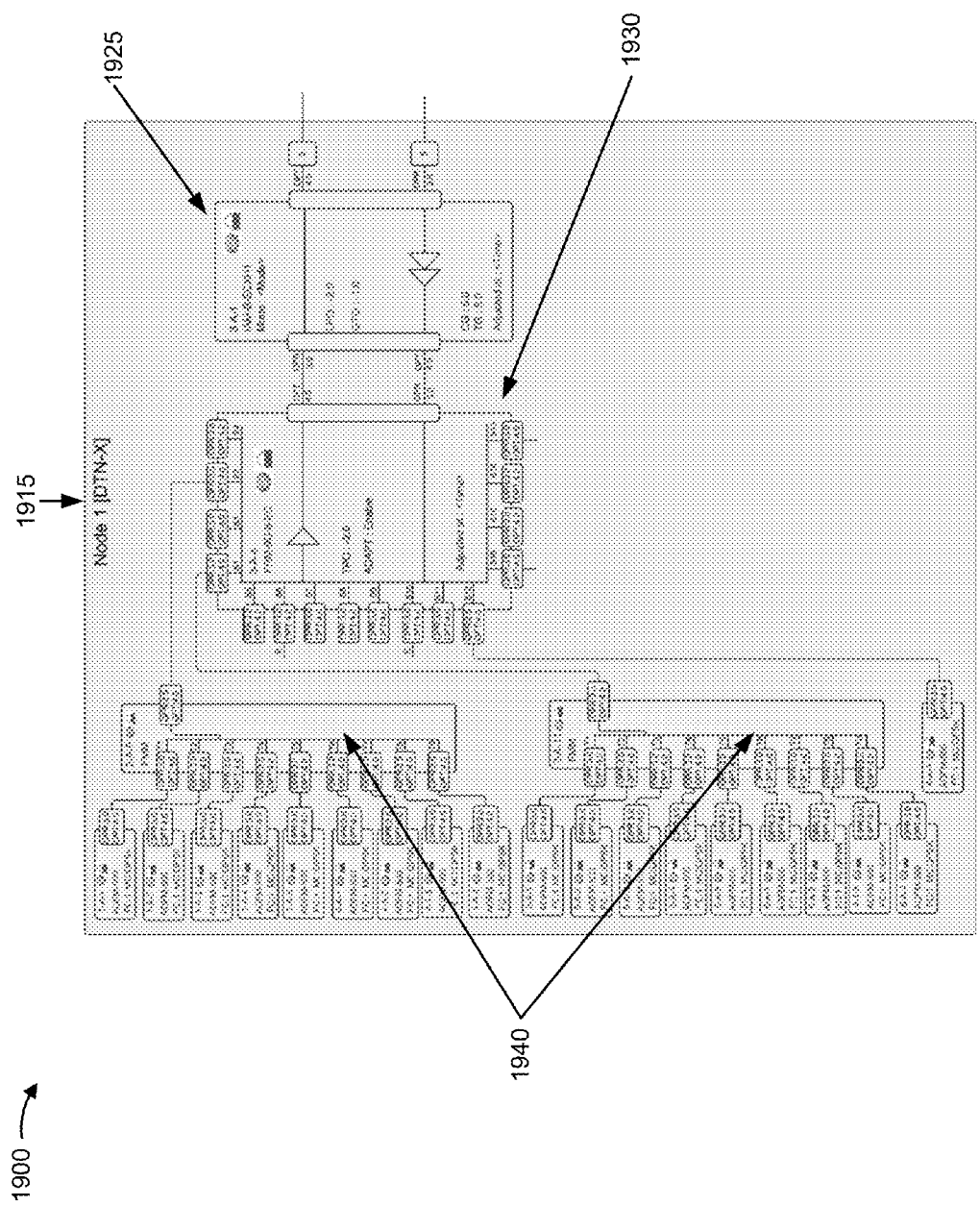

FIG. 19C is a diagram of an example element 1900 of a user interface that displays optical network information. Element 1900 may be displayed by UI 700 (e.g., by FRU connectivity view element 1305). Element 1900 may include CIEs 1915, 1925, 1930, and 1940. Additionally, or alternatively, element 1900 may include fewer elements, additional elements, different elements, or differently arranged elements than those illustrated in FIG. 19C.

CIEs 1915, 1925, 1930, and 1940 may be displayed by UI 700 based on user input of a view type (e.g., via user input element 705 and/or view selection element 820). For example, CIEs 1915, 1925, 1930, and 1940 may be displayed when a user has input an optical link termination view (e.g., OL), and/or a data channel and optical link termination view (e.g., BAND/OL).

CIE 1915 may display a representation of an add/drop terminal site at a node (e.g., Node 1). CIE 1915 may display an equipment type associated with the add/drop terminal site (e.g., DTN-X). The add/drop terminal site may include an IAM or an IRM, connected to an FRM, which is connected to two FMMs, as illustrated. The displayed components (e.g., IAM, IRM, FRM, and/or FMM) may be associated with a user-specified optical route. CIE 1915 may provide an indication of ports on the displayed components (e.g., IAM, IRM, FRM, and/or FMM) that are connected (e.g., by displaying a line connecting the ports).

CIE 1925 may correspond to an IAM or an IRM in a view that includes a data channel (e.g., BAND, OTS, and/or BAND/OL), as discussed herein in connection with FIGS. 14A and 14B.

CIE 1930 may correspond to an FRM, as discussed herein in connection with FIG. 15.

CIE 1940 may correspond to an FMM, as discussed herein in connection with FIG. 16.

Figure 19D:
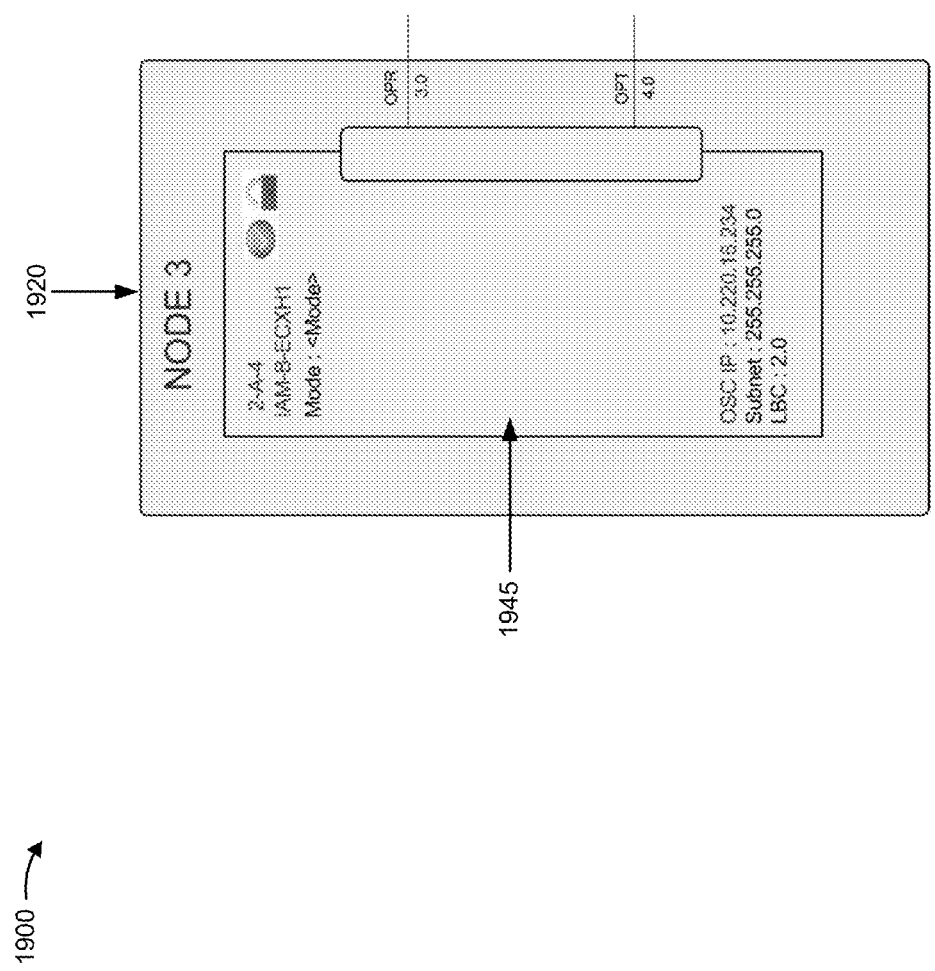

FIG. 19D is a diagram of an example element 1900 of a user interface that displays optical network information. Element 1900 may be displayed by UI 700 (e.g., by FRU connectivity view element 1305). Element 1900 may include CIEs 1920 and 1945. Additionally, or alternatively, element 1900 may include fewer elements, additional elements, different elements, or differently arranged elements than those illustrated in FIG. 19D.

CIEs 1920 and 1945 may be displayed by UI 700 based on user input of a view type (e.g., via user input element 705 and/or view selection element 820). For example, CIEs 1920 and 1945 may be displayed when a user has input a control channel view (e.g., OSC).

CIE 1920 may display a representation of an add/drop terminal site at a node (e.g., Node 3). CIE 1920 may display an equipment type associated with the add/drop terminal site. The add/drop terminal site may include an IAM or an IRM, as illustrated. The displayed components (e.g., IAM, IRM) may be associated with a user-specified optical route. CIE 1920 may provide an indication of ports on the displayed components (e.g., IAM and/or IRM) that are connected (e.g., by displaying a line connecting the ports).

CIE 1945 may correspond to an IAM or an IRM in a control channel view (e.g., OSC), as discussed herein in connection with FIG. 14C.

Figure 20A:
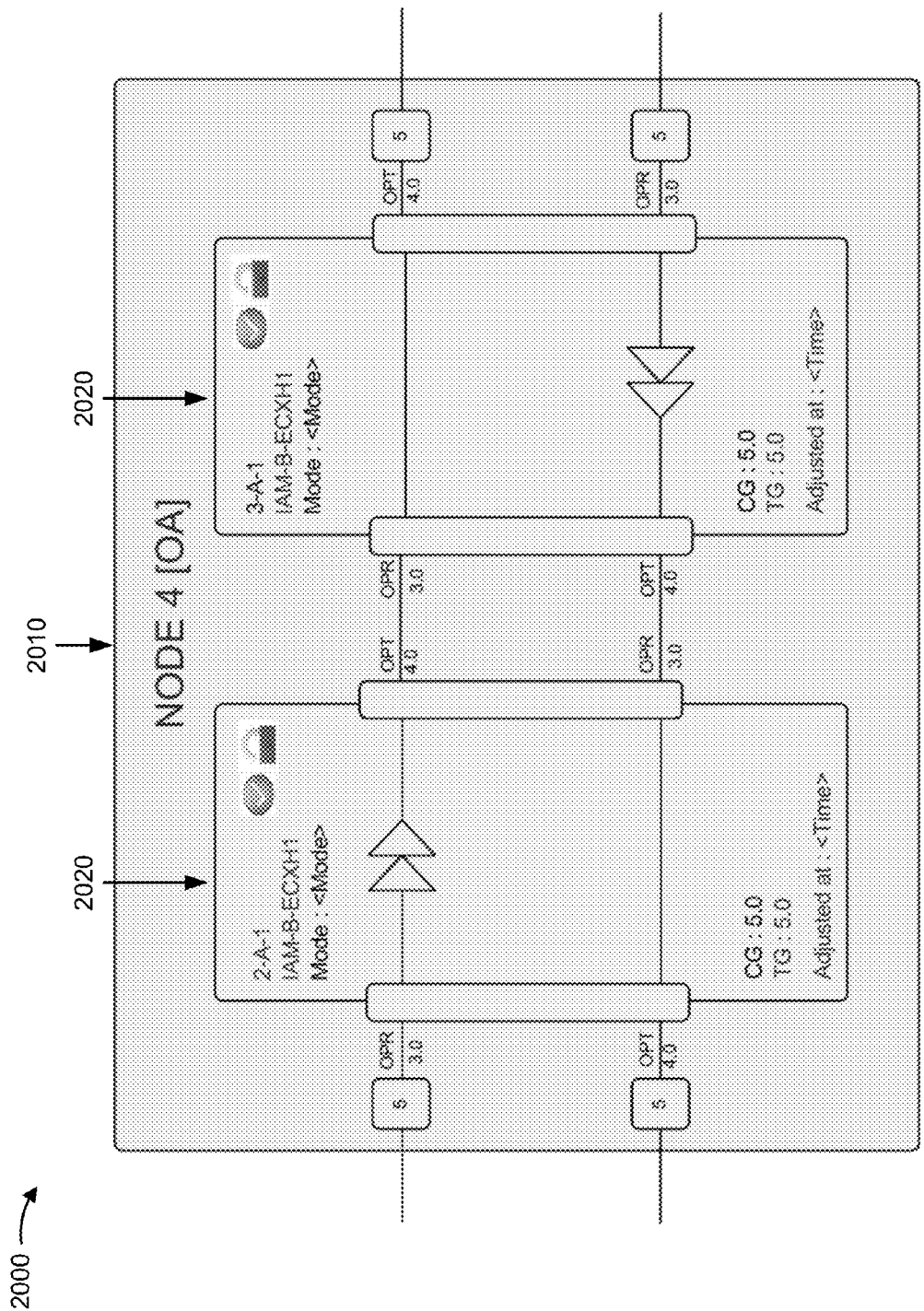

FIG. 20A is a diagram of an example element 2000 of a user interface that displays optical network information. Element 2000 may be displayed by UI 700 (e.g., by FRU connectivity view element 1305). Element 2000 may include CIEs 2010 and 2020. Additionally, or alternatively, element 2000 may include fewer elements, additional elements, different elements, or differently arranged elements than those illustrated in FIG. 20A.

CIEs 2010 and 2020 may be displayed by UI 700 based on user input of a view type (e.g., via user input element 705 and/or view selection element 820). For example, CIEs 2010 and 2020 may be displayed when a user has input a data channel view (e.g., OTS and/or BAND) and/or a data channel and optical link termination view (e.g., BAND/OL).

CIE 2010 may display a representation of an optical amplifier site at a node (e.g., Node 4). CIE 2010 may display an equipment type associated with the optical amplifier site (e.g., OA). The optical amplifier site may include an IAM or an IRM. The displayed components (e.g., IAM, IRM) may be associated with a user-specified optical route. CIE 2010 may provide an indication of ports on the displayed components (e.g., IAM and/or IRM) that are connected (e.g., by displaying a line connecting the ports).

CIE 2020 may correspond to an IAM or an IRM in a view that includes a data channel (e.g., BAND, OTS, and/or BAND/OL), as discussed herein in connection with FIGS. 14A and 14B.

Figure 20B:
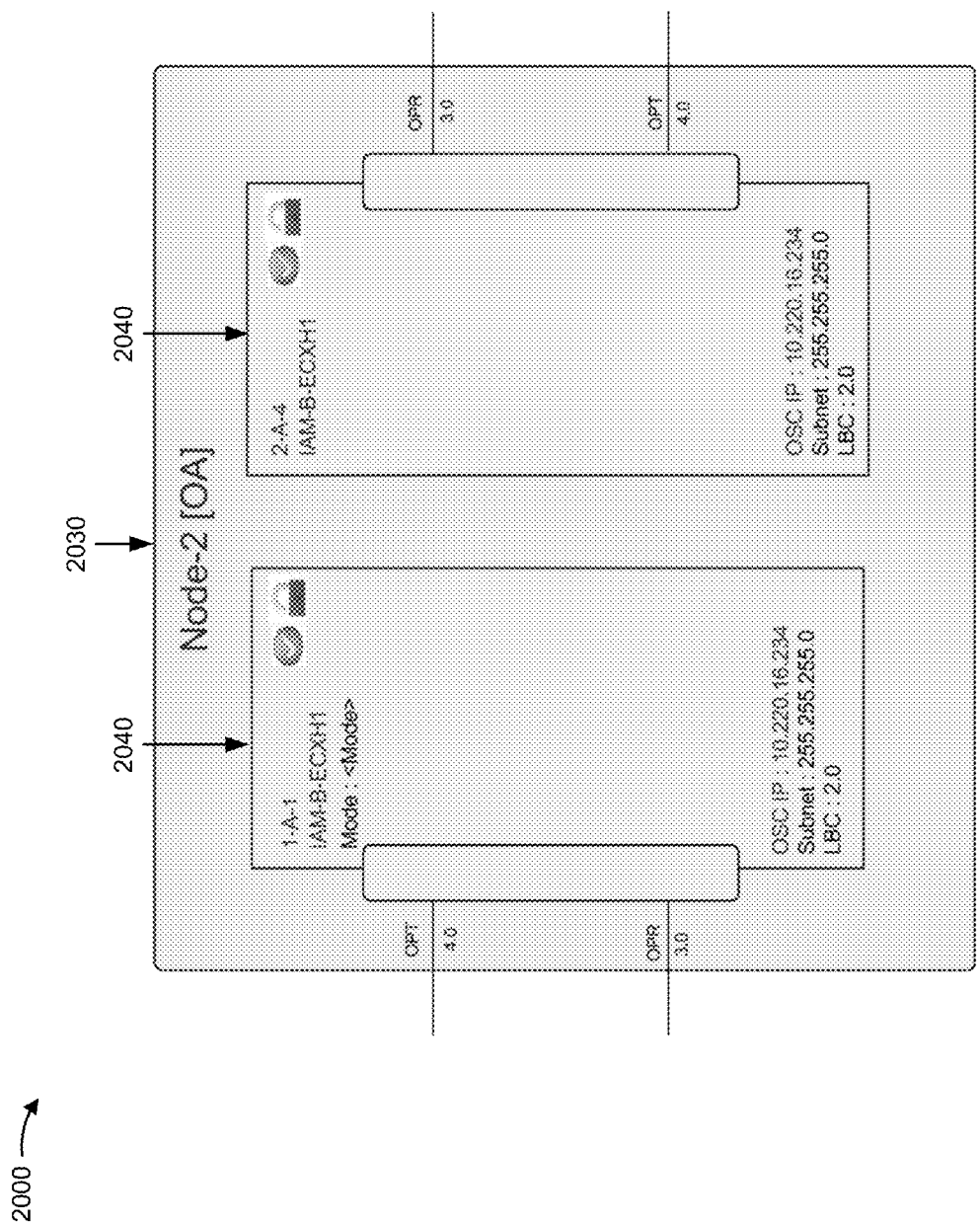

FIG. 20B is a diagram of an example element 2000 of a user interface that displays optical network information. Element 2000 may be displayed by UI 700 (e.g., by FRU connectivity view element 1305). Element 2000 may include CIEs 2030 and 2040. Additionally, or alternatively, element 2000 may include fewer elements, additional elements, different elements, or differently arranged elements than those illustrated in FIG. 20B.

CIEs 2030 and 2040 may be displayed by UI 700 based on user input of a view type (e.g., via user input element 705 and/or view selection element 820). For example, CIEs 2030 and 2040 may be displayed when a user has input a control channel view (e.g., OSC).

CIE 2030 may display a representation of an optical amplifier site at a node (e.g., Node 2). CIE 2030 may display an equipment type associated with the optical amplifier site (e.g., OA). The optical amplifier site may include an IAM or an IRM. The displayed components (e.g., IAM, IRM) may be associated with a user-specified optical route. CIE 2030 may provide an indication of ports on the displayed components (e.g., IAM and/or IRM) that are connected (e.g., by displaying a line connecting the ports).

CIE 2040 may correspond to an IAM or an IRM in a control channel view, as discussed herein in connection with FIG. 14C.

Figure 21A:
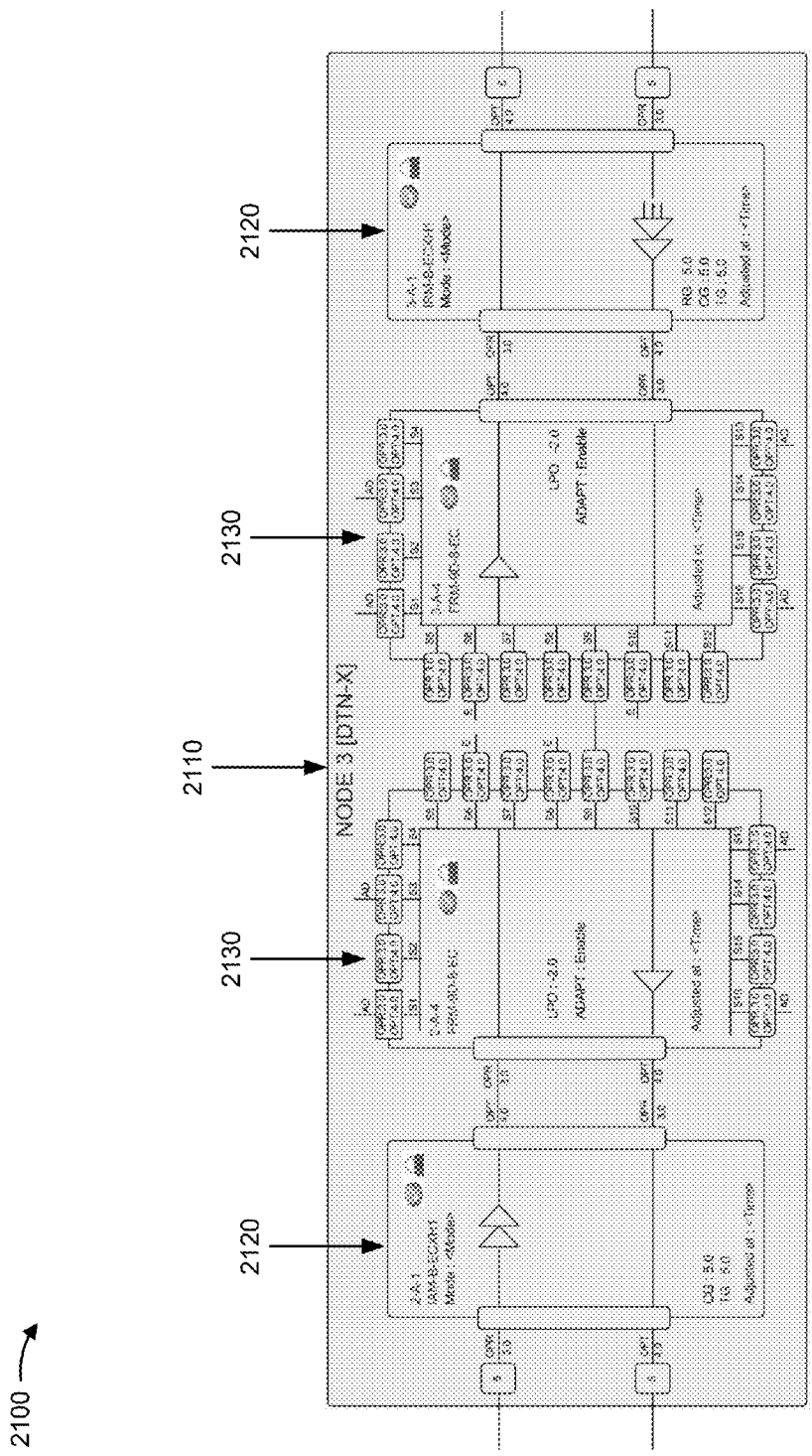

FIG. 21A is a diagram of an example element 2100 of a user interface that displays optical network information. Element 2100 may be displayed by UI 700 (e.g., by FRU connectivity view element 1305). Element 2100 may include CIEs 2110-2130. Additionally, or alternatively, element 2100 may include fewer elements, additional elements, different elements, or differently arranged elements than those illustrated in FIG. 21A.

CIEs 2110-2130 may be displayed by UI 700 based on user input of a view type (e.g., via user input element 705 and/or view selection element 820). For example, CIEs 2110-2130 may be displayed when a user has input a data channel view (e.g., OTS and/or BAND) and/or a data channel and optical link termination view (e.g., BAND/OL).

CIE 2110 may display a representation of a ROADM site at a node (e.g., Node 3). CIE 2110 may display an equipment type associated with the ROADM site (e.g., DTN-X). The ROADM site may include an IAM or an IRM, and an FRM. The displayed components (e.g., IAM, IRM, and/or FRM) may be associated with a user-specified optical route. CIE 2110 may provide an indication of ports on the displayed components (e.g., IAM, IRM, and/or FRM) that are connected (e.g., by displaying a line connecting the ports).

CIE 2120 may correspond to an IAM or an IRM in a view that includes a data channel (e.g., BAND, OTS, and/or BAND/OL), as discussed herein in connection with FIGS. 14A and 14B.

CIE 2130 may correspond to an FRM in a view that includes a data channel (e.g., BAND, OTS, and/or BAND/OL), as discussed herein in connection with FIG. 15.

Figure 21B:
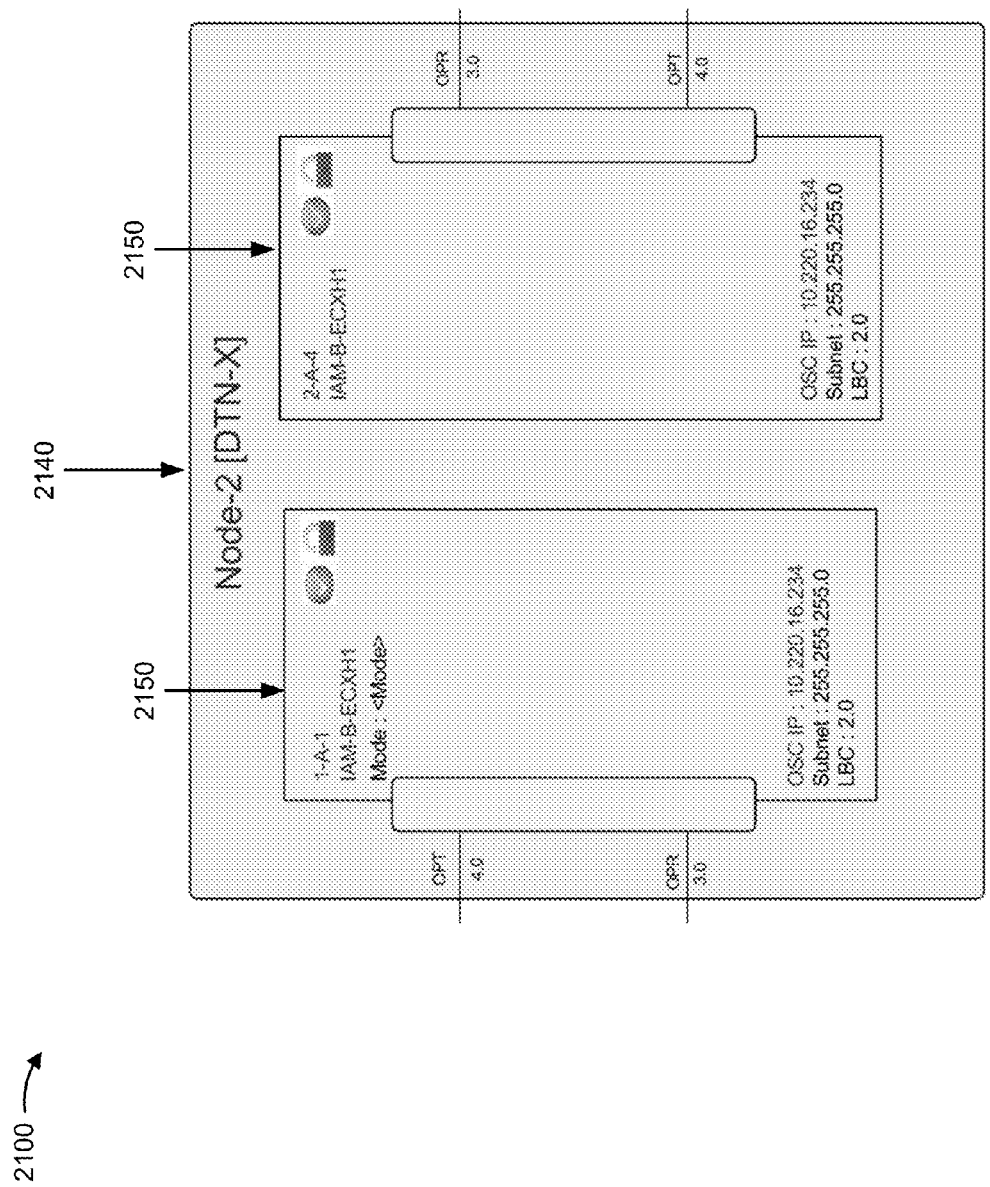

FIG. 21B is a diagram of an example element 2100 of a user interface that displays optical network information. Element 2100 may be displayed by UI 700 (e.g., by FRU connectivity view element 1305). Element 2100 may include CIEs 2140 and 2150. Additionally, or alternatively, element 2100 may include fewer elements, additional elements, different elements, or differently arranged elements than those illustrated in FIG. 21B.

CIEs 2140 and 2150 may be displayed by UI 700 based on user input of a view type (e.g., via user input element 705 and/or view selection element 820). For example, CIEs 2140 and 2150 may be displayed when a user has input a control channel view (e.g., OSC).

CIE 2140 may display a representation of a ROADM site at a node (e.g., Node 2). CIE 2140 may display an equipment type associated with the ROADM site (e.g., DTN-X). The ROADM site may include an IAM or an IRM. The displayed components (e.g., IAM, IRM) may be associated with a user-specified optical route. CIE 2140 may provide an indication of ports on the displayed components (e.g., IAM and/or IRM) that are connected (e.g., by displaying a line connecting the ports).

CIE 2150 may correspond to an IAM or an IRM in a control channel view, as discussed herein in connection with FIG. 14C.

Figure 22A:
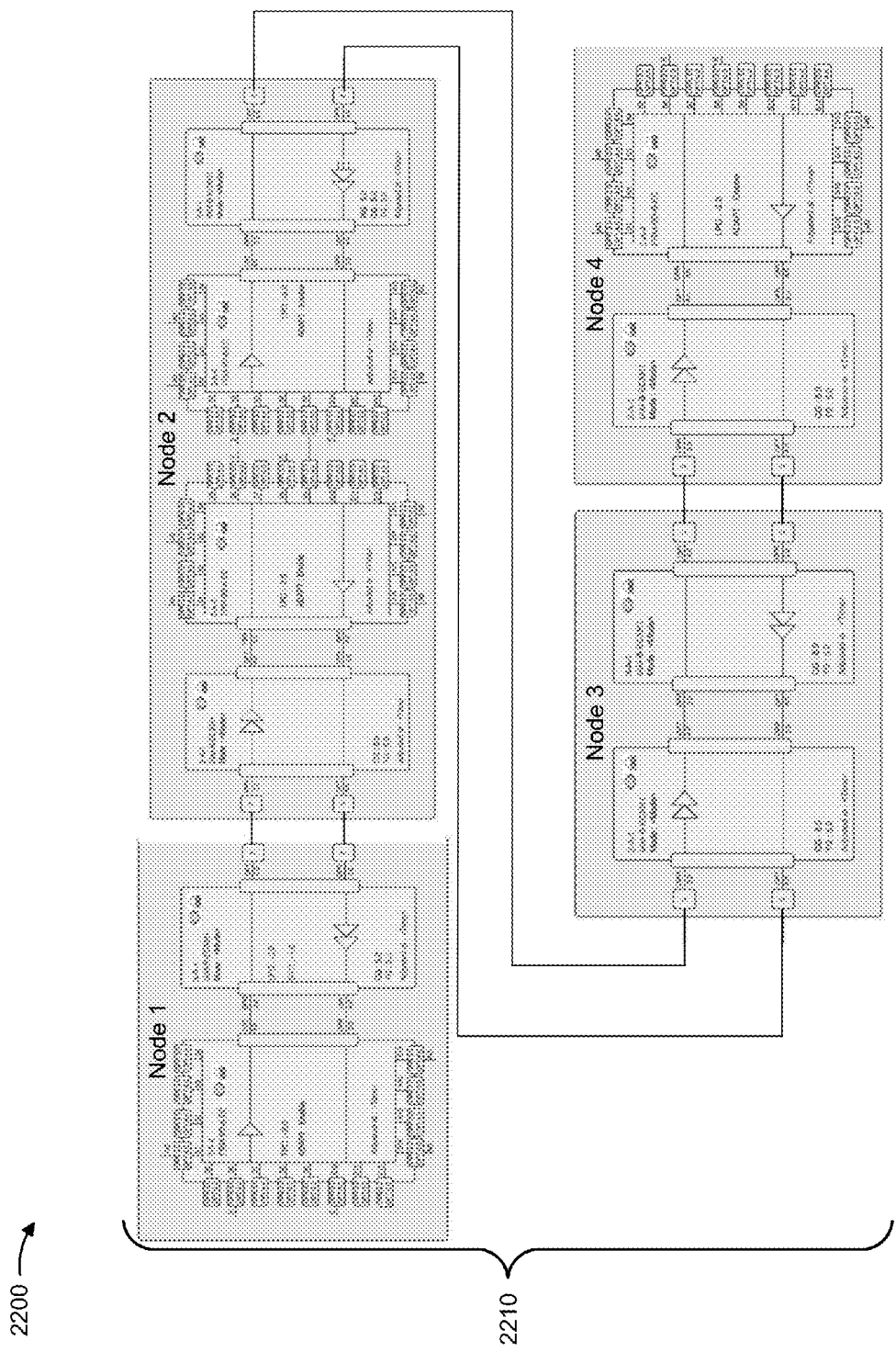

FIG. 22A is a diagram of an example element 2200 of a user interface that displays optical network information. Element 2200 may be displayed by UI 700 (e.g., by FRU connectivity view element 1305). Element 2200 may include CIE 2210. Additionally, or alternatively, element 2200 may include fewer elements, additional elements, different elements, or differently arranged elements than those illustrated in FIG. 22A.

CIE 2210 may be displayed by UI 700 based on user input of a view type (e.g., via user input element 705 and/or view selection element 820). For example, CIE 2210 may be displayed when a user has input a data channel view (e.g., OTS and/or BAND).

CIE 2210 may display an end-to-end view of components associated with of a user-specified route. For example, CIE 2210 may display an add/drop terminal site (e.g., Node 1, discussed herein in connection with FIG. 19A), connected to a ROADM site (e.g., Node 2, discussed herein in connection with FIG. 21A), connected to an optical amplifier site (e.g., Node 3, discussed herein in connection with FIG. 20A), and connected to another add/drop terminal site (e.g., Node 4, discussed herein in connection with FIG. 19A). The end-to-end view may display different components and/or may display components differently based on a user-specified view and/or a user-specified route. CIE 2210 may provide an indication of ports on the displayed components (e.g., IAM, IRM, FRM, FMM, and/or FSM) that are connected (e.g., by displaying a line connecting the ports).

Figure 22B:
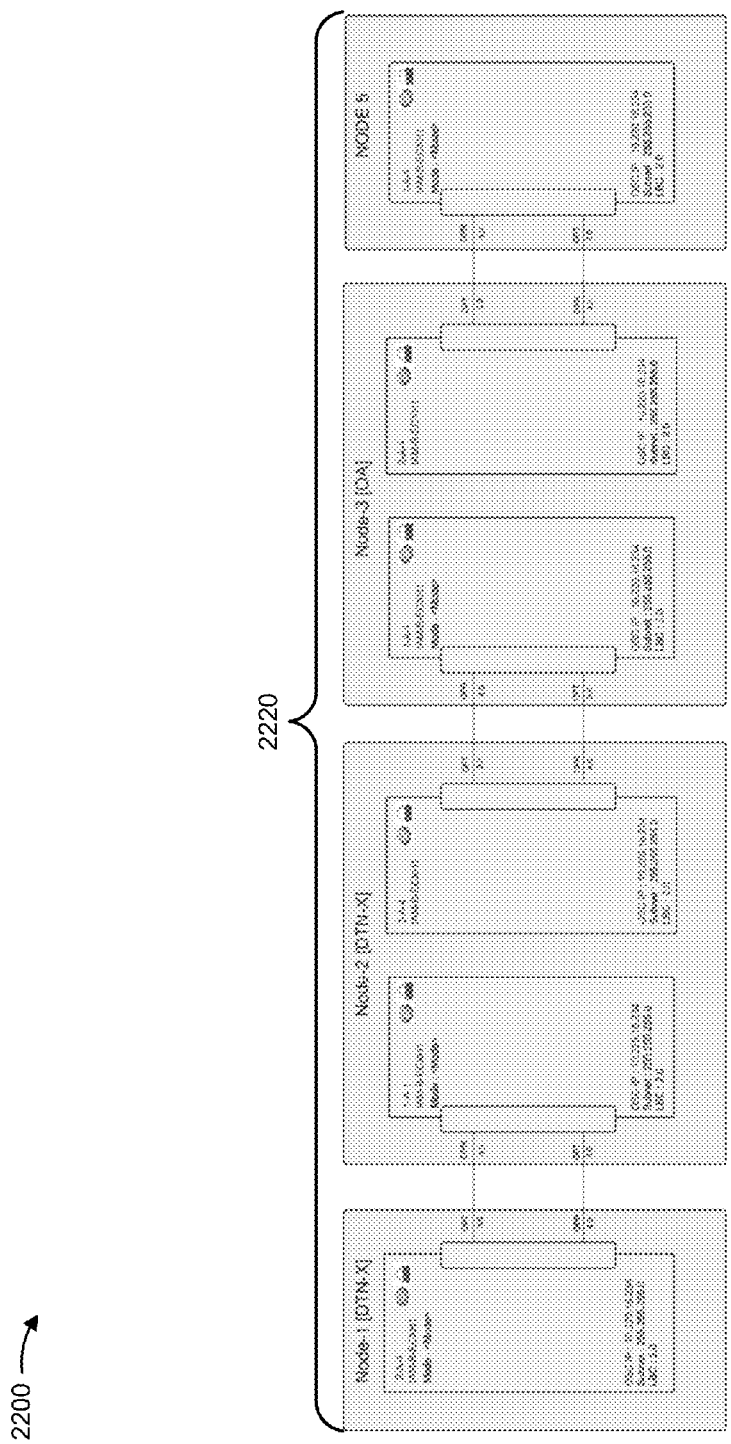

FIG. 22B is a diagram of an example element 2200 of a user interface that displays optical network information. Element 2200 may be displayed by UI 700 (e.g., by FRU connectivity view element 1305). Element 2200 may include CIE 2220. Additionally, or alternatively, element 2200 may include fewer elements, additional elements, different elements, or differently arranged elements than those illustrated in FIG. 22A.

CIE 2220 may be displayed by UI 700 based on user input of a view type (e.g., via user input element 705 and/or view selection element 820). For example, CIE 2220 may be displayed when a user has input a control channel view (e.g., OSC).

CIE 2220 may display an end-to-end view of components associated with a user-specified route. For example, CIE 2220 may display an add/drop terminal site (e.g., Node 1, discussed herein in connection with FIG. 19D), connected to a ROADM site (e.g., Node 2, discussed herein in connection with FIG. 21B), connected to an optical amplifier site (e.g., Node 3, discussed herein in connection with FIG. 20B), and connected to another add/drop terminal site (e.g., Node 4, discussed herein in connection with FIG. 19D). The end-to-end view may display different components and/or may display components differently based on a user-specified view and/or a user-specified route. CIE 2220 may provide an indication of ports on the displayed components (e.g., IAM and/or IRM) that are connected (e.g., by displaying a line connecting the ports).

Figure 23:
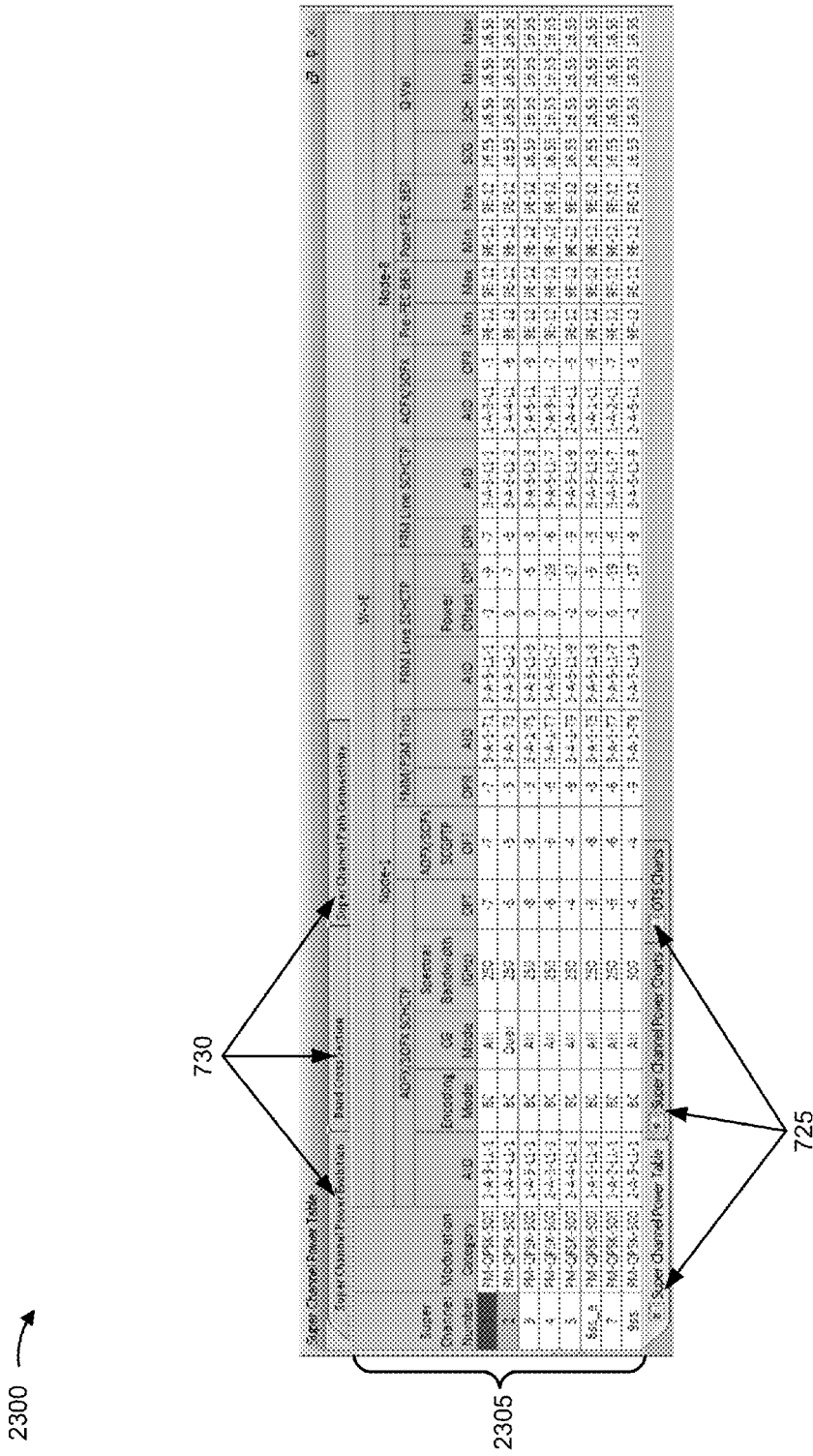

FIG. 23 is a diagram of an example element 2300 of a user interface that displays optical network information. Element 2300 may be displayed by UI 700. Element 2300 may include tab element 725, tab element 730, and a power evolution table element 2305. Additionally, or alternatively, element 2300 may include fewer elements, additional elements, different elements, or differently arranged elements than those illustrated in FIG. 23.

Power evolution table element ("PETE") 2305 may be displayed based on user selection of a tab element 725 and/or a tab element 730 corresponding to PETE 2305, and/or based on user input via user input element 705. In some implementations, user selection of a tab element 725 may cause different tabs to be displayed by tab element 730.

PETE 2305 may display information associated with an optical route, information associated with NEs 250, and/or information associated with optical links. The displayed information may be based on user input (e.g., user input of an optical route). In some implementations, PETE 2305 may display information (e.g., a power parameter) associated with a set of nodes on an optical route that is associated with a user-specified optical link. For example, the displayed information may be based on user selection of an element displayed by graphical element 710.

In some implementations, PETE 2305 may display power characteristics (e.g., OPT, OPR, PO) for optical links from a source node to a destination node on a user-specified route, which may include one or more intermediate nodes that connect the source node to the destination node. PETE 2305 may show or hide one or more power characteristics based on user input. Additionally, or alternatively, PETE 2305 may show or hide information (e.g., power characteristics) associated with one or more nodes and/or NEs 250 based on user input (e.g., user input of a set of optical links associated with the nodes).

For example, PETE 2305 may display OPT and/or OPR for an optical link (identified in the figure as "SCHCTP") and/or an optical link group (identified in the figure as "SCGPTP") on a source/destination component (e.g., an "AOFX/SOFX," an "FMM," and/or an "FSM") at a source node and/or a destination node. Additionally, or alternatively, PETE 2305 may display OPT, OPR, and/or PO for an optical link on an FRM and/or an FRM port at a source node and/or a destination node. Additionally, or alternatively, PETE 2305 may display OPT, OPR and/or PO for an optical link on an FRM and/or an FRM port at an intermediate node (e.g., in one or both transmission directions).

Figure 24:
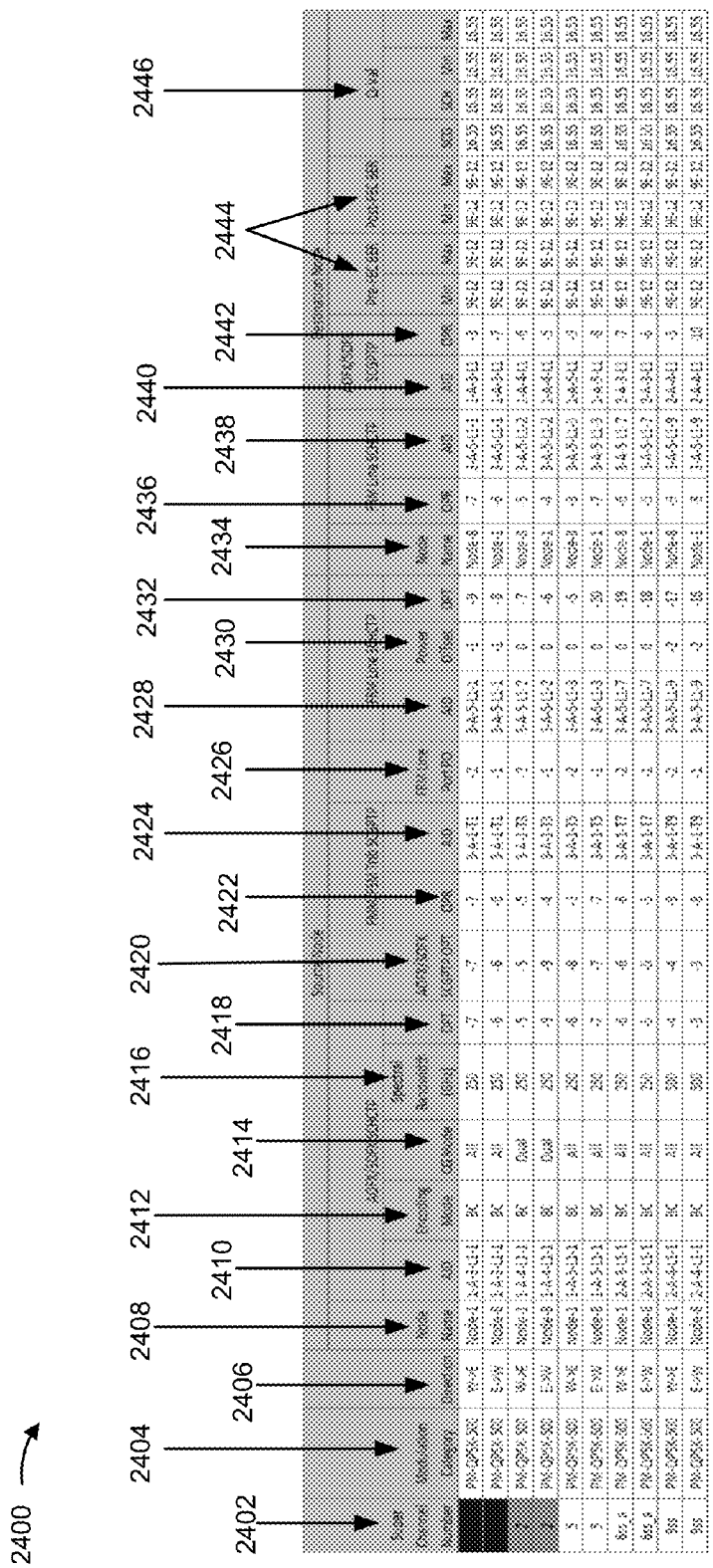

FIG. 24 is a diagram of an example data structure 2400 that stores information associated with an optical network. Data structure 2400 may be stored in a memory device (e.g., RAM, hard disk, etc.) associated with one or more devices and/or components shown in FIGS. 2-4. For example, data structure 2400 may be stored by NA 220 and/or user device 230. In some implementations, information stored by data structure 2400 may be displayed by UI 700 (e.g., by PETE 2305). For example, data structure 2400 may be represented as a table on UI 700 (e.g., by chart element 720).

Data structure 2400 may include a collection of fields 2402-2446. Data structure 2400 includes fields 2402-2446 for explanatory purposes. In practice, data structure 2400 may include additional fields, fewer fields, different fields, or differently arranged fields than are described with respect to data structure 2400.

Field 2402 may store information that identifies an optical link (e.g., a super-channel). For example, field 2402 may identify an optical link using a number and/or another identifier (e.g., "1," "SCH 1," "6a," etc.). Information associated with a set of optical links stored by data structure 2400 may be displayed by UI 700 based on user input (e.g., user input of an optical route that includes the set of optical links).

Field 2404 may store information that identifies an optical link type associated with the optical link identified by field 2402. For example, field 2404 may identify an optical link type using a modulation format and/or a bandwidth associated with an optical link.

Field 2406 may store information that identifies a route direction associated with the optical link identified by field 2402. In the figures, a route direction may be identified by "W" or "West" for one direction, or "E" or "East" for another direction. In some implementations, nodes displayed on the left of UI 700 may be labeled with a "West" direction, and nodes displayed on the right of UI 700 may be labeled with an "East" direction. Fields 2408-2446 may be displayed in a different order depending on the route direction associated with the optical link identified by field 2402. For example, fields 2408-2432 may be associated with a west node, and fields 2434-2446 may be associated with an east node.

Field 2408 may store information that identifies a node, on one end of an optical route, associated with the optical link identified by field 2402. For example, the node identified by field 2408 may be a source node. A source node may include a node that transmits an optical signal. For example, field 2408 may identify a source node using a node identifier (e.g., "Node-1").

Field 2410 may store information that identifies a source component and/or a source component port associated with the optical link identified by field 2402. For example, a source node and/or port may be associated with the node identified by field 2408. A source component may include a component that transmits an optical signal. For example, field 2410 may identify a source component using a component and/or port identifier (e.g., "1-A-3-L1-1").

Field 2412 may store information that identifies an encoding mode associated with the optical link identified by field

2402. An encoding mode may identify how a signal is encoded for transmission to another component.

Field 2414 may store information that identifies a carrier group mode associated with the optical link identified by field 2402. A carrier group mode may identify a quantity of optical links (e.g., a channel, or a super-channel) that are multiplexed together to form another optical link (e.g., a super-channel, or a super-channel group). For example, a carrier group mode may include "single" (e.g., one channel per super-channel), "dual" (e.g., two channels per super-channel), or "all" (e.g., ten channels per super-channel). Additionally, or alternatively, a carrier group mode may identify any quantity of channels multiplexed together to form super-channels, and/or any quantity of super-channels multiplexed together to form super-channel groups.

Field 2416 may store information that identifies a bandwidth associated with the optical link identified by field 2402. For example, a bandwidth may be represented in gigahertz (GHz), which may represent an amount of bandwidth allocated to an optical link for transmission of an optical signal.

Fields 2418 and 2420 may store information that identifies an OPT associated with the optical link identified by field 2402 when the optical link is transmitted from the source component identified by field 2410. In some implementations, field 2418 may identify an OPT at which the source component transmits the optical link identified by field 2402 when the optical link is not multiplexed together with other optical links (e.g., when the optical link is a single channel, or a single super-channel). Additionally, or alternatively, field 2420 may identify an OPT at which the source component transmits the optical link identified by field 2402 when the optical link is multiplexed together with another optical link (e.g., to form a super-channel of multiple channels, or to form a super-channel group of multiple super-channels).

Field 2422 may store information that identifies an OPR associated with the optical link identified by field 2402 when the optical link is received by a source FMM or FSM (e.g., identified by field 2424). In some implementations, the optical link may be part of an optical link group (e.g., a super-channel group) when received by a source FMM or FSM.

Field 2424 may store information that identifies a source FMM, FSM, FMM port, and/or FSM port associated with the optical link identified by field 2402. For example, a source FMM, FSM, FMM port, and/or FSM port may be associated with the node identified by field 2408. For example, field 2424 may identify a source FMM or FSM using a component and/or port identifier (e.g., "3-A-1-T1").

Field 2426 may store information that identifies a PO associated with a source FRM line port associated with the optical link identified by field 2402. For example, a PO may be applied to a super-channel and/or super-channel group received at a port (e.g., the port identified by field 2424).

Field 2428 may store information that identifies a source FRM and/or FRM port associated with the optical link identified by field 2402. For example, a source FRM and/or FRM port may be associated with the node identified by field 2408. For example, field 2428 may identify a source FRM using a component and/or port identifier (e.g., "3-A-5-L1-1").

Field 2430 may store information that identifies a PO associated with the optical link identified by field 2402 when the optical link is processed by a source FRM. For example, a PO may be applied to a channel and/or super-channel that has been de-multiplexed for transmission (e.g., via the port identified by field 2428).

Field 2432 may store information that identifies an OPT associated with the optical link identified by field 2402 when the optical link is transmitted from the source FRM associated with the optical link (e.g., identified by field 2428).

Field 2434 may store information that identifies a node, on one end of an optical route, associated with the optical link identified by field 2402. For example, the node identified by field 2434 may be a destination node. A destination node may include a node that receives an optical signal. For example, field 2434 may identify a destination node using a node identifier (e.g., "Node-8").

Field 2436 may store information that identifies an OPR associated with the optical link identified by field 2402 when the optical link is received by the destination FRM associated with the optical link (e.g., identified by field 2440).

Field 2438 may store information that identifies a destination FRM and/or FRM port associated with the optical link identified by field 2402. For example, field 2438 may identify a destination FRM using a component and/or port identifier (e.g., "3-A-5-L1-1").

Field 2440 may store information that identifies a destination component and/or a destination component port associated with the optical link identified by field 2402. A destination component may include a component that receives an optical signal. For example, field 2440 may identify a destination component using a component and/or port identifier (e.g., "1-A-3-L1").

Field 2442 may store information that identifies an OPR associated with the optical link identified by field 2402 when the optical link is received by the destination component associated with the optical link.

Field 2444 may store information that identifies a pre-forward-error-correction bit error rate ("Pre-FEC BER") and/or a post-forward-error correction bit error rate ("Post-FEC BER") associated with the optical link identified by field 2402. In some implementations, multiple optical links may be multiplexed together to form an optical link group. Field 2444 may identify a minimum and/or maximum pre-FEC BER associated with one of the optical links in the optical link group. Similarly, field 2444 may identify a minimum and/or maximum post-FEC BER associated with one of the optical links in the optical link group.

Field 2446 may store information that identifies a signal quality (e.g., "Q-Val") associated with the optical link identified by field 2402. A signal quality may include a signal-to-noise ratio, a signal interference to noise ratio (SINR), and/or another quality parameter. In some implementations, field 2446 may identify a signal quality associated with a single optical link and/or an optical link group. Additionally, or alternatively, field 2446 may identify a minimum and/or maximum signal quality associated with one of the optical links in the optical link group.

Information for a single optical link may be conceptually represented as a row in data structure 2400. For example, the first row in data structure 2400 may correspond to a super-channel identified as "1," with a super-channel type of "PM-QPSK-500," (e.g., a modulation format of QPSK and a bandwidth of 500 GHz), and a direction of West to East (e.g., Node-1 may be displayed on the left of UI 700). A source node associated with super-channel 1 may have a node name of "Node-1," and may be associated with a source component and/or port identified as "1-A-3-L1-1." Super-channel 1 may have an encoding mode of "BC," a carrier group mode of "All," and a spectral bandwidth of "250 GHz" (e.g., two super-channels are multiplexed together to give a super-channel group a bandwidth of 500 GHz). Super-channel 1 may be transmitted from source component 1-A-3-L1-1 with a power level (OPT) of "−7." Super-channel 1 may be included in a super-channel group, which may be transmitted from source component 1-A-3-L1-1 with a power level (OPT) of "−7." Super-channel 1 may be received by FMM/FSM "3-A-1-T1" with an OPR of "−7." FMM/FSM "3-A-1-T1" may apply a PO of −2, to super-channel 1, which may be transmitted to FRM "3-A-5-L1-1." FRM "3-A-5-L1-1" may transmit super-channel 1 with a power offset of "−1" and an OPT of "−9." Super-channel 1 may be received at a destination node identified as "Node-8," and an FRM identified as "3-A-5-L1-1" with an OPR of "−7." Super-channel 1 may then be received by destination component "1-A-3-L1" with an OPR of "−3." Super-channel 1 may have a pre-FEC BER and post-FEC BER of "9E-12," and a signal quality of "16.55."

Figure 25:
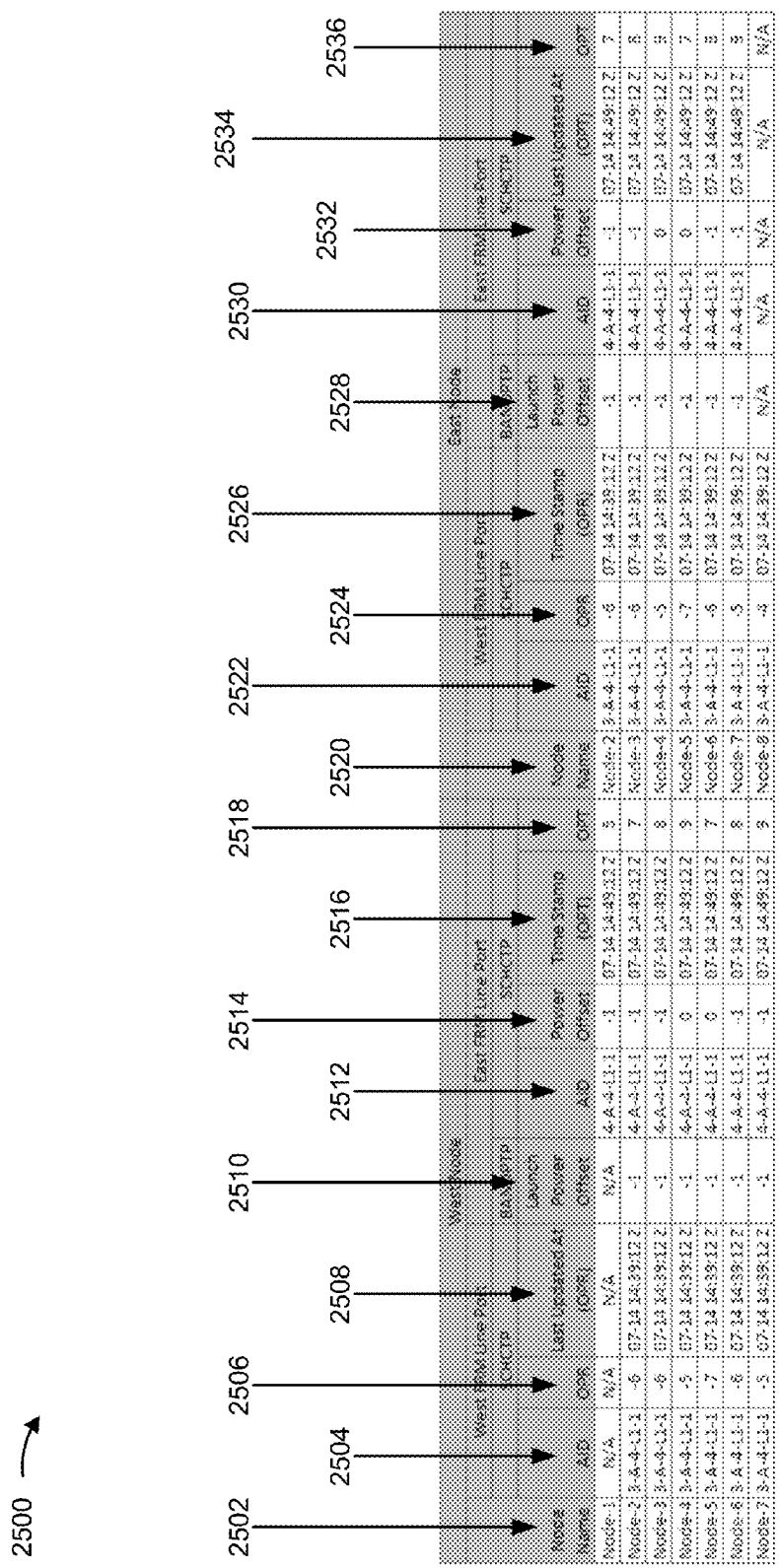

FIG. 25 is a diagram of an example data structure 2500 that stores information associated with an optical network. Data structure 2500 may be stored in a memory device (e.g., RAM, hard disk, etc.) associated with one or more devices and/or components shown in FIGS. 2-4. For example, data structure 2500 may be stored by NA 220 and/or user device 230. In some implementations, information stored by data structure 2500 may be displayed by UI 700 (e.g., by PETE 2305). For example, data structure 2500 may be represented as a table on UI 700 (e.g., by chart element 720).

Data structure 2500 may include a collection of fields 2502-2536. Data structure 2500 includes fields 2502-2536 for explanatory purposes. In practice, data structure 2500 may include additional fields, fewer fields, different fields, or differently arranged fields than are described with respect to data structure 2500.

Field 2502 may store information that identifies a first node in a set of nodes associated with a user-specified optical route. For example, field 2502 may identify a first node using a number and/or another identifier (e.g., "Node-1"). Information associated with a set of first nodes stored by data structure 2500 may be displayed by UI 700 based on user input (e.g., user input of an optical link associated with the set of first nodes).

Field 2504 may store information that identifies a first FRM and/or a first FRM port associated with the first node identified by field 2502. For example, field 2504 may identify a first FRM using a component and/or port identifier (e.g., "3-A-4-L1-1").

Field 2506 may store information that identifies an OPR associated with the first FRM identified by field 2504. For example, field 2506 may store information that identifies an OPR with which the FRM identified by field 2504 receives a user-specified optical link.

Field 2508 may store information that identifies an update date and/or time associated with the OPR identified by field 2506. For example, field 2508 may identify the last time the OPR identified by field 2506 was measured, or the last time a power adjustment associated with the OPR identified by field 2506 was made.

Field 2510 may store information that identifies an LPO associated with the FRM identified by field 2504 or field 2512. For example, field 2510 may store information that identifies an LPO that the FRM identified by field 2504 and/or 2512 applies to a user-specified optical link.

Field 2512 may store information that identifies a second FRM and/or a second FRM port associated with the first node identified by field 2502. For example, field 2512 may identify a second FRM using a component and/or port identifier (e.g., "4-A-4-L1-1"). In some implementations, the first FRM may be an FRM that receives an optical link signal at the first node, and the second FRM may be an FRM that transmits the optical link signal from the first node.

Field 2514 may store information that identifies a PO associated with the second FRM identified by field 2512. For example, field 2514 may store information that identifies a PO the FRM identified by field 2512 applies to a user-specified optical link.

Field 2516 may store information that identifies an update date and/or time associated with the OPT identified by field 2518. For example, field 2516 may identify the last time the OPT identified by field 2518 was measured, or the last time a power adjustment associated with the OPT identified by field 2518 was made.

Field 2518 may store information that identifies an OPT associated with the second FRM identified by field 2512. For example, field 2518 may store information that identifies an OPT with which the FRM identified by field 2512 transmits a user-specified optical link.

Field 2520 may store information that identifies a second node in a set of nodes associated with a user-specified optical route. For example, field 2520 may identify a second node using a number and/or another identifier (e.g., "Node-1"). In some implementations, the first node (e.g., Node-1) may transmit a signal to the second node (e.g., Node-2). Data structure 2500 may display the entire user-specified optical route. A particular node may be displayed in both field 2502 and field 2520 (although not in the same row).

Field 2522 may store information that identifies a first FRM and/or a first FRM port associated with the second node identified by field 2520. For example, field 2522 may identify a first FRM using a component and/or port identifier (e.g., "3-A-4-L1-1").

Field 2524 may store information that identifies an OPR associated with the first FRM identified by field 2522. For example, field 2524 may store information that identifies an OPR with which the FRM identified by field 2522 receives a user-specified optical link.

Field 2526 may store information that identifies an update date and/or time associated with the OPR identified by field 2524. For example, field 2526 may identify the last time the OPR identified by field 2524 was measured, or the last time a power adjustment associated with the OPR identified by field 2524 was made.

Field 2528 may store information that identifies an LPO associated with the FRM identified by field 2522 or field 2530. For example, field 2528 may store information that identifies an LPO that the FRM identified by field 2522 and/or field 2530 applies to a user-specified optical link.

Field 2530 may store information that identifies a second FRM and/or a second FRM port associated with the second node identified by field 2520. For example, field 2530 may identify a second FRM using a component and/or port identifier (e.g., "4-A-4-L1-1"). In some implementations, the first FRM may be an FRM that receives an optical link signal at the second node, and the second FRM may be an FRM that transmits the optical link signal from the second node.

Field 2532 may store information that identifies a PO associated with the second FRM identified by field 2530. For example, field 2532 may store information that identifies a PO that the FRM identified by field 2530 applies to a user-specified optical link.

Field 2534 may store information that identifies an update date and/or time associated with the OPT identified by field 2536. For example, field 2534 may identify the last time the OPT identified by field 2536 was measured, or the last time a power adjustment associated with the OPT identified by field 2536 was made.

Field 2536 may store information that identifies an OPT associated with the second FRM identified by field 2530. For example, field 2536 may store information that identifies an OPT with which the FRM identified by field 2530 transmits a user-specified optical link.

Figure 26:
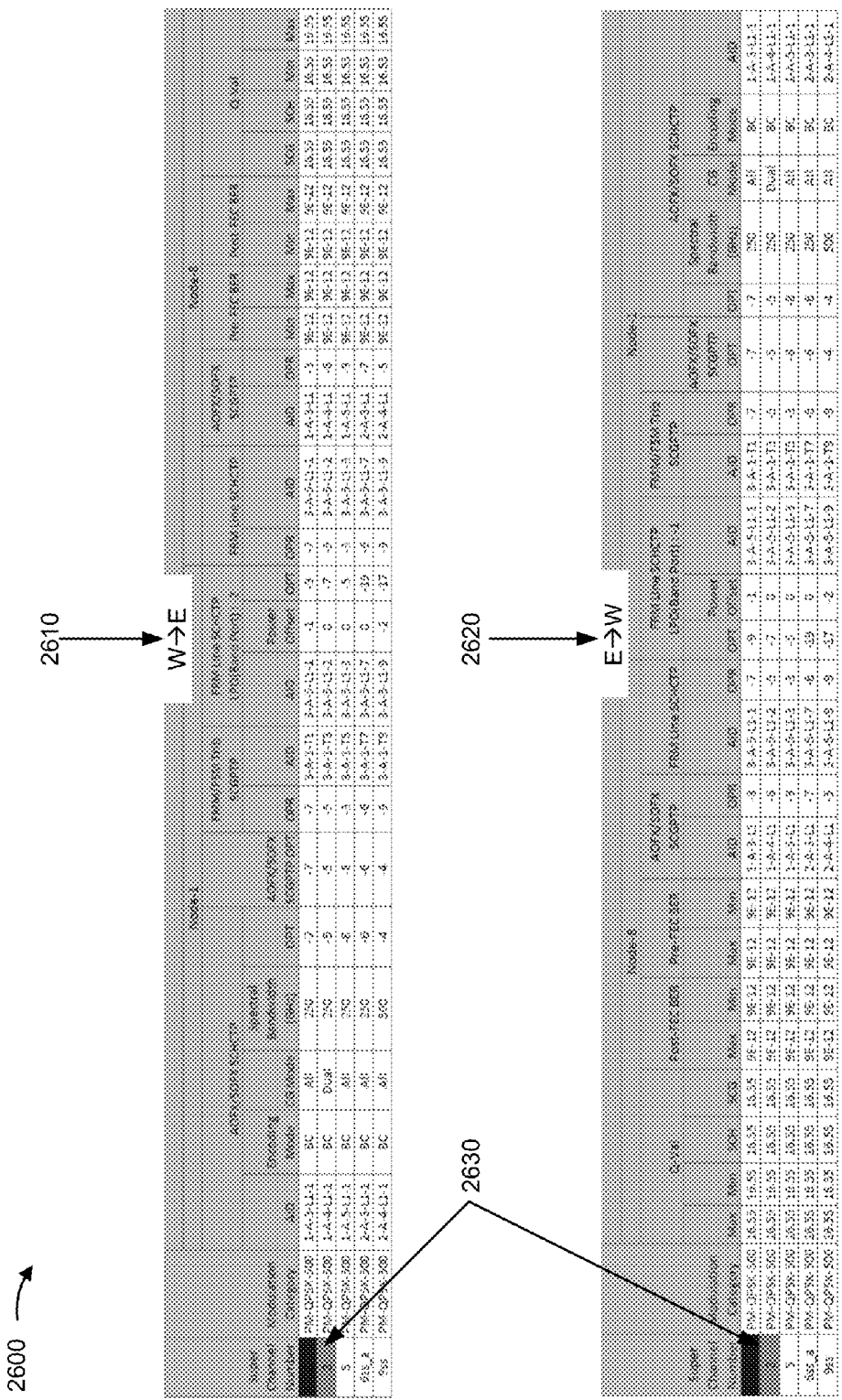

FIG. 26 is a diagram of an example element 2600 of a user interface that displays optical network information. Element 2600 may be displayed by UI 700 (e.g., by FRU connectivity view element 1305). Element 2600 may include a directional view 2610, a directional view 2620, and an alert element 2630. Additionally, or alternatively, element 2600 may include fewer elements, additional elements, different elements, or differently arranged elements than those illustrated in FIG. 26.

UI 700 may display information stored by data structure 2400 and/or 2500 using different directional views. For example, directional view 2610 may display data structure fields in one direction (e.g., west to east, or W→E, as illustrated), and directional view 2620 may display data structure fields in another direction (e.g., east to west, or E→W, as illustrated). UI 700 may display information stored by data structure 2400 and/or 2500 using different directional views based on user input (e.g., via user input element 705 and/or option element 830).

Alert element 2630 may provide an indication of a problem associated with an optical route, an optical link, an NE 250, etc., associated with a field of data structure 2400 and/or 2500. Alert element 2630 may display an alert based on a severity level associated with the alert, as described elsewhere herein. Additionally, or alternatively, alert element 2630 may provide a mechanism (e.g., a clickable element, a button, a link, etc.) that allows a user to indicate a desire to view alert information associated with an alert, as discussed herein.

Figure 27:
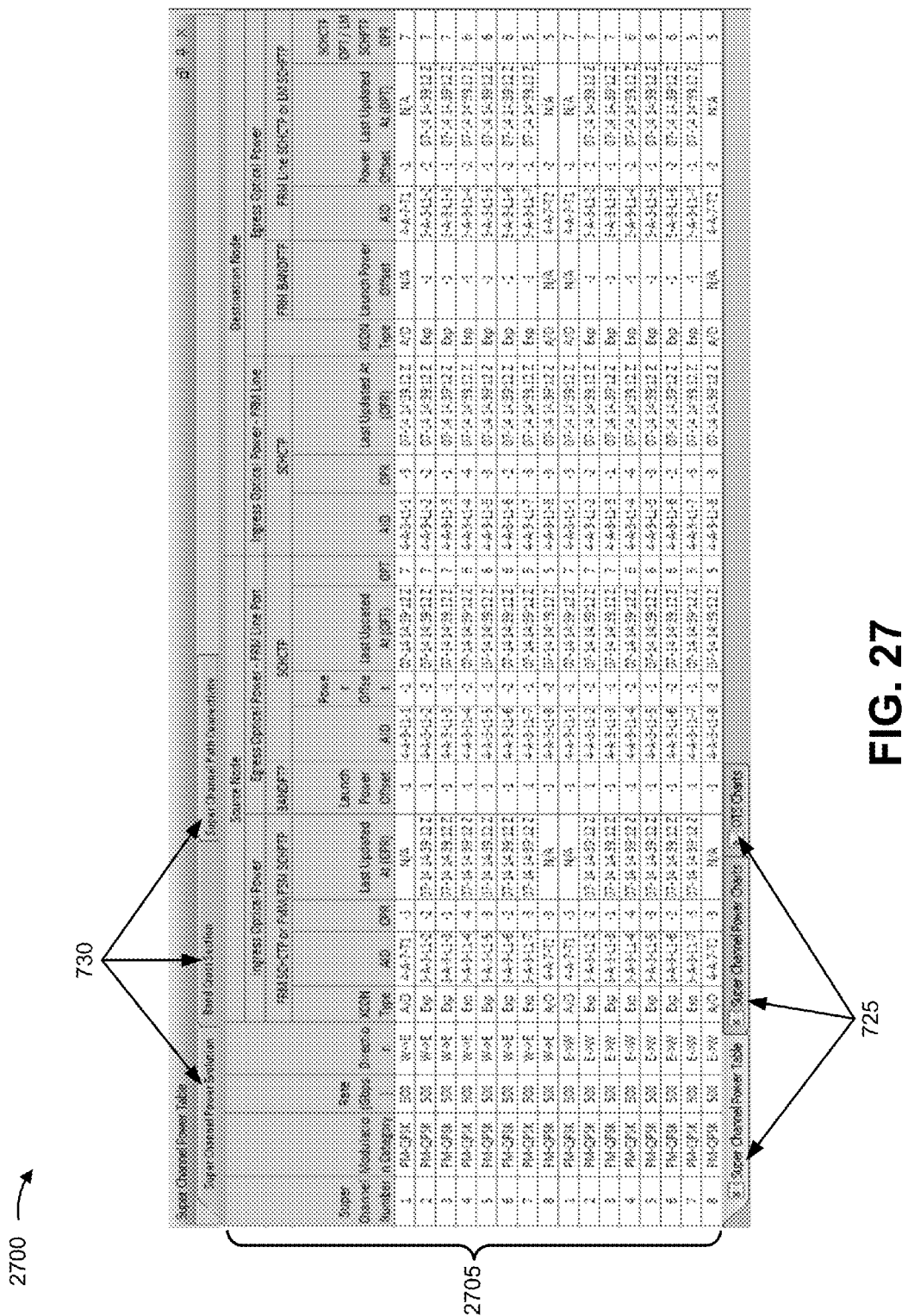

FIG. 27 is a diagram of an example element 2700 of a user interface that displays optical network information. Element 2700 may be displayed by UI 700. Element 2700 may include tab element 725, tab element 730, and a band cross-section element 2705. Additionally, or alternatively, element 2700 may include fewer elements, additional elements, different elements, or differently arranged elements than those illustrated in FIG. 27.

Band cross-section element ("BCSE") 2705 may be displayed based on user selection of a tab element 725 and/or a tab element 730 corresponding to BCSE 2705, and/or based on user input via user input element 705. In some implementations, user selection of a tab element 725 may cause different tabs to be displayed by tab element 730.

BCSE 2705 may display information associated with an optical route, information associated with NEs 250, and/or information associated with optical links. The displayed information may be based on user input (e.g., user input of an optical route). In some implementations, BCSE 2705 may display information (e.g., a power parameter) associated with a set of optical links on a set of user-specified nodes. For example, the displayed information may be based on user selection of an element displayed by graphical element 710.

In some implementations, BCSE 2705 may display power characteristics (e.g., OPT, OPR) associated with an optical link, on a user-specified route, before and after a component (e.g., an FRM) has adjusted the power of the optical link (e.g., via dynamic spectral equalization, PO, LPO). BCSE 2705 may display the power characteristics for a source node, a destination node, and/or one or more intermediate nodes that connect the source node to the destination node. BCSE 2705 may show or hide one or more power characteristics based on user input. Additionally, or alternatively, BCSE 2705 may show or hide information (e.g., power characteristics) associated with one or more nodes and/or NEs 250 based on user input (e.g., user input of a set of optical links associated with the nodes).

For example, BCSE 2705 may display OPT and/or OPR for an optical link on a source/destination component (e.g., an "AOFX/SOFX," an "FMM," and/or an "FSM") at a node where the optical link is added or dropped. Additionally, or alternatively, BCSE 2705 may display OPT, OPR, LPO, and/or PO for an optical link on an FRM and/or an FRM port at a node where the optical link is not added or dropped (e.g., where the optical link is transmitted or expressed). In some implementations, BCSE 2705 may display power characteristics at component ingress and egress points for one or more optical links (e.g., every optical link) on a set of user-specified nodes.

Figure 28:
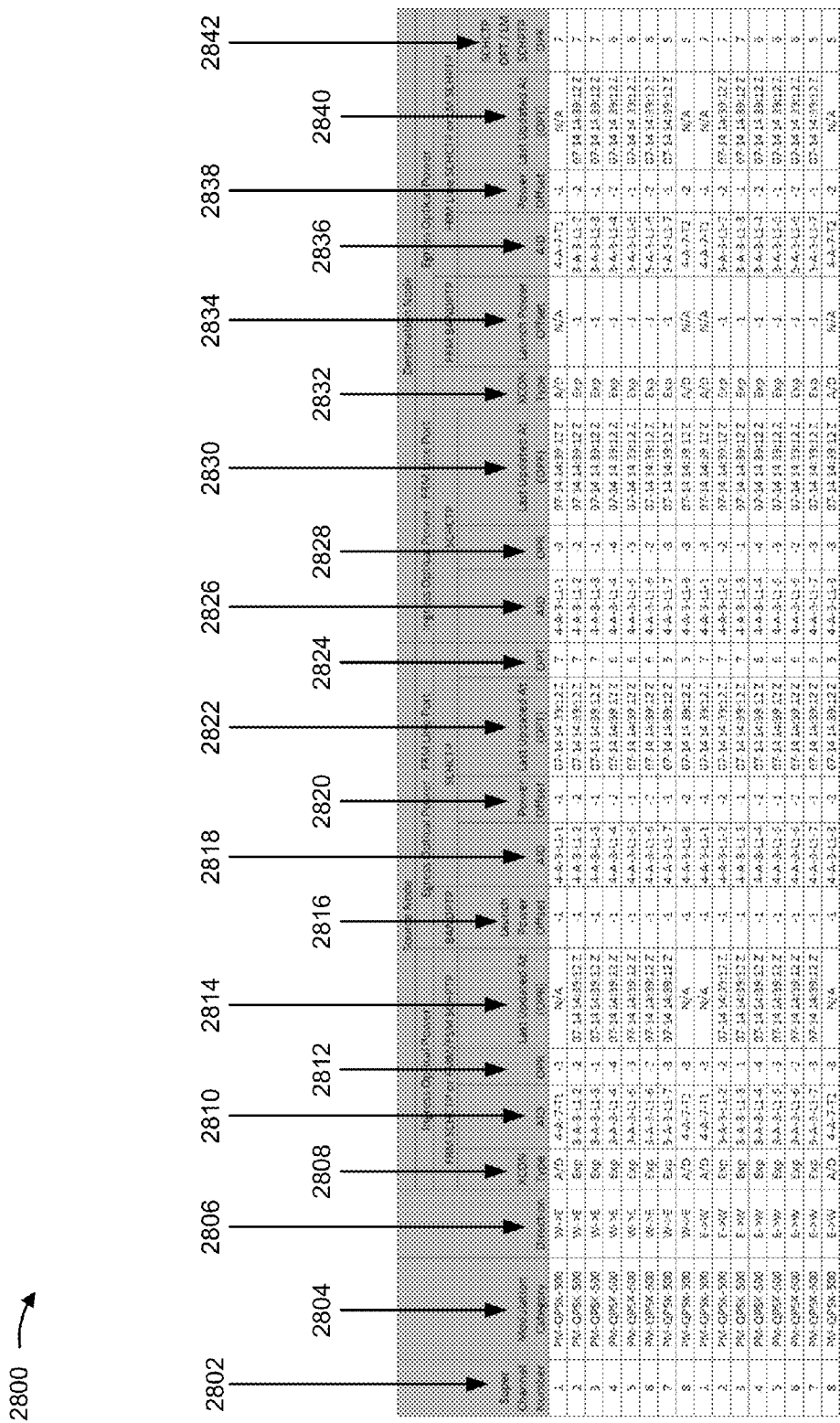

FIG. 28 is a diagram of an example data structure 2800 that stores information associated with an optical network. Data structure 2800 may be stored in a memory device (e.g., RAM, hard disk, etc.) associated with one or more devices and/or components shown in FIGS. 2-4. For example, data structure 2800 may be stored by NA 220 and/or user device 230. In some implementations, information stored by data structure 2800 may be displayed by UI 700 (e.g., by BSCE 2705). For example, data structure 2800 may be represented as a table on UI 700 (e.g., by chart element 720).

Data structure 2800 may include a collection of fields 2802-2842. Data structure 2800 includes fields 2802-2842 for explanatory purposes. In practice, data structure 2800 may include additional fields, fewer fields, different fields, or differently arranged fields than are described with respect to data structure 2800.

Field 2802 may store information that identifies an optical link (e.g., a super-channel). For example, field 2802 may identify an optical link using a number and/or another identifier (e.g., "1," "SCH 1," "6a," etc.). Information associated with a set of optical links stored by data structure 2800 may be displayed by UI 700 based on user input (e.g., user input of an optical route that includes the set of optical links).

Field 2804 may store information that identifies an optical link type associated with the optical link identified by field 2802. For example, field 2804 may identify an optical link type using a modulation format (e.g., QPSK) and/or a bandwidth (e.g., 500 GHz) associated with an optical link.

Field 2806 may store information that identifies a route direction associated with the optical link identified by field 2802. In the figures, a route direction may be identified by "W" or "West" for one direction, or "E" or "East" for another direction. Fields 2808-2842 may be displayed in a different order depending on the route direction associated with the optical link identified by field 2802.

Field 2808 may store information that identifies a cross-connect type associated with the optical link identified by field 2802 at a source node component (e.g., an FRM, an FMM, an FSM, etc.). A cross-connect type may be an add/drop cross-connect ("A/D"), which may indicate that the optical link is added or dropped at the component. In some implementations, a cross-connect type may be express ("Exp"), which may indicate that the optical link is received and/or transmitted at the component, and is not added or dropped.

Field 2810 may store information that identifies a source node component and/or port that receives, from the source node, the optical link identified by field 2802. For example, field 2810 may identify a source node component using a component and/or port identifier (e.g., "4-A-7-T1").

Field 2812 may store information that identifies an OPR associated with the optical link identified by field 2802 when the optical link is received by the component identified by field 2810.

Field 2814 may store information that identifies an update date and/or time associated with the OPR identified by field 2812. For example, field 2814 may identify the last time the OPR identified by field 2812 was measured, or the last time a power adjustment associated with the OPR identified by field 2812 was made.

Field 2816 may store information that identifies an LPO associated with the optical link identified by field 2802 when the optical link is processed by the component identified by field 2810 and/or field 2818.

Field 2818 may store information that identifies a source node component and/or port that transmits, from the source node, the optical link identified by field 2802. For example, field 2818 may identify a source node component using a component and/or port identifier (e.g., "4-A-3-L1-1").

Field 2820 may store information that identifies a PO associated with the component identified by field 2818.

Field 2822 may store information that identifies an update date and/or time associated with the OPT identified by field 2824. For example, field 2822 may identify the last time the OPT identified by field 2824 was measured, or the last time a power adjustment associated with the OPT identified by field 2824 was made.

Field 2824 may store information that identifies an OPT associated with the optical link identified by field 2802 when the optical link is transmitted by the component identified by field 2818.

Field 2826 may store information that identifies a destination node component and/or port that receives, to the destination node, the optical link identified by field 2802. For example, field 2826 may identify a destination node component using a component and/or port identifier (e.g., "4-A-3-L1-1").

Field 2828 may store information that identifies an OPR associated with the optical link identified by field 2802 when the optical link is received by the component identified by field 2826.

Field 2830 may store information that identifies an update date and/or time associated with the OPR identified by field 2828. For example, field 2830 may identify the last time the OPR identified by field 2828 was measured, or the last time a power adjustment associated with the OPR identified by field 2830 was made.

Field 2832 may store information that identifies a cross-connect type associated with the outgoing optical link identified by field 2802 at a destination node component (e.g., an FRM, an FMM, an FSM, etc.).

Field 2834 may store information that identifies an LPO associated with the optical link identified by field 2802 when the optical link is processed by the component identified by field 2826 and/or field 2836.

Field 2836 may store information that identifies a destination node component and/or port that transmits, from the destination node, the optical link identified by field 2802. For example, field 2836 may identify a destination node component using a component and/or port identifier (e.g., "4-A-7-T1").

Field 2838 may store information that identifies a PO associated with the optical link identified by field 2802 when the optical link is processed by the component identified by field 2836.

Field 2840 may store information that identifies an update date and/or time associated with the OPT identified by field 2842. For example, field 2840 may identify the last time the OPT identified by field 2842 was measured, or the last time a power adjustment associated with the OPT identified by field 2842 was made.

Field 2842 may store information that identifies an OPT associated with the optical link identified by field 2802 when the optical link is transmitted by the component identified by field 2836.

Figure 29:
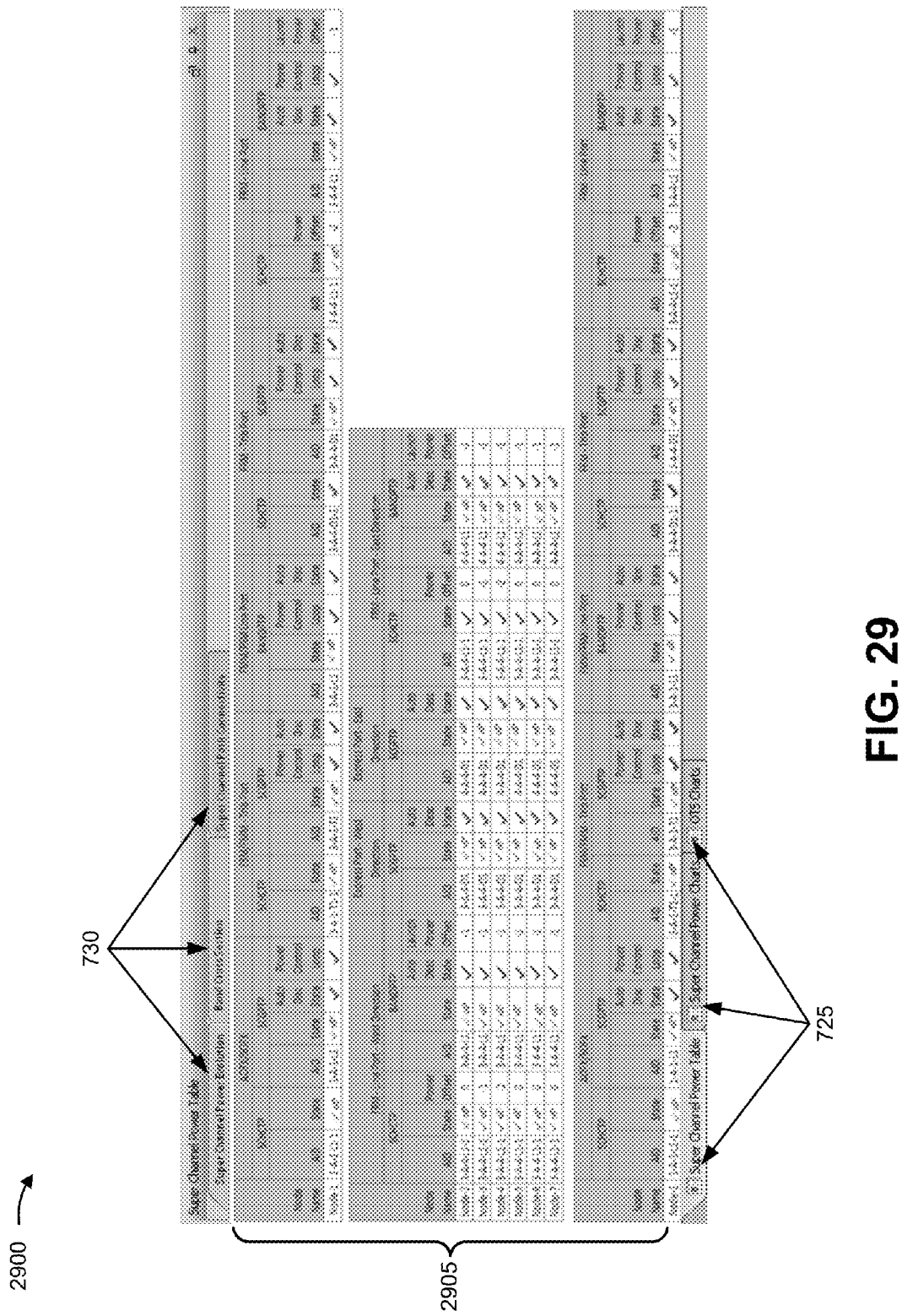

FIG. 29 is a diagram of an example element 2900 of a user interface that displays optical network information. Element 2900 may be displayed by UI 700. Element 2700 may include tab element 725, tab element 730, and a path connectivity element 2905. Additionally, or alternatively, element 2900 may include fewer elements, additional elements, different elements, or differently arranged elements than those illustrated in FIG. 29. Path connectivity element 2905 may be displayed based on user selection of a tab element 725 and/or a tab element 730 corresponding to path connectivity element 2905, and/or based on user input via user input element 705. In some implementations, user selection of a tab element 725 may cause different tabs to be displayed by tab element 730.

Path connectivity element 2905 may display information associated with an optical route, information associated with NEs 250, and/or information associated with optical links. The displayed information may be based on user input (e.g., user input of an optical route). In some implementations, path connectivity element 2905 may display a set of component ports on an optical route associated with a set of user-specified optical links.

In some implementations, path connectivity element 2905 may display a path (e.g., physical and/or logical connection or termination points) that an optical link takes along a user-specified route from a source node to a destination node, which may include one or more intermediate nodes that connect the source node and the destination node.

Figure 30:
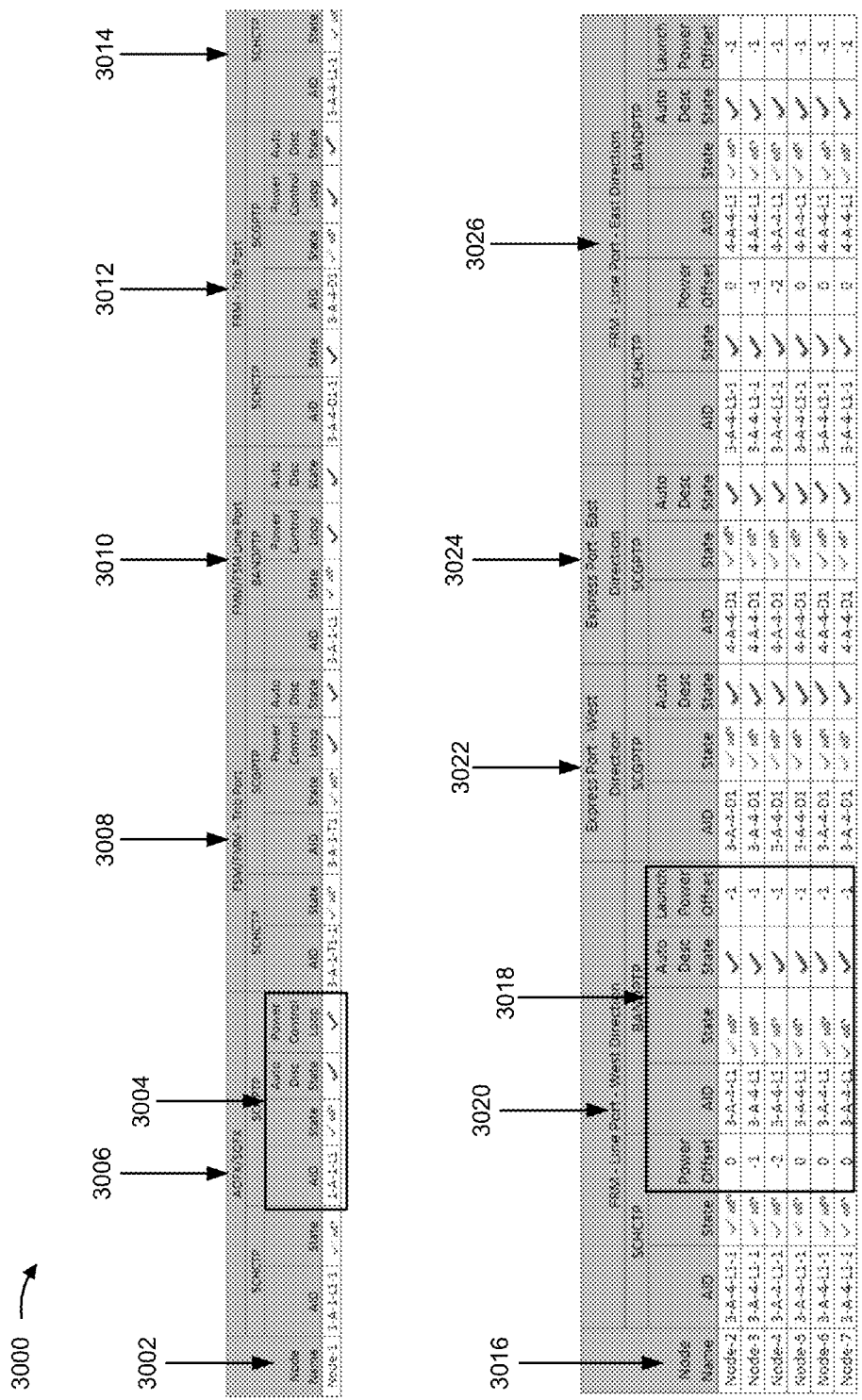

FIG. 30 is a diagram of an example data structure 3000 that stores information associated with an optical network. Data structure 3000 may be stored in a memory device (e.g., RAM, hard disk, etc.) associated with one or more devices and/or components shown in FIGS. 2-4. For example, data structure 3000 may be stored by NA 220 and/or user device 230. In some implementations, information stored by data structure 3000 may be displayed by UI 700 (e.g., by path connectivity element 2905). For example, data structure 3000 may be represented as a table on UI 700 (e.g., by chart element 720).

Data structure 3000 may include a collection of elements 3002-3026. Data structure 3000 includes elements 3002-3026 for explanatory purposes. In practice, data structure 3000 may include additional elements, fewer elements, different elements, or differently arranged elements than are described with respect to data structure 3000. Each element 3002-3026 may contain one or more fields.

Element 3002 may include a field that stores information that identifies a source and/or destination node (e.g., a location where a user-specified optical link is added or dropped). For example, element 3002 may identify a node using a number and/or another identifier (e.g., "Node-1"). Information associated with a set of nodes stored by data structure 3000 may be displayed by UI 700 based on user input (e.g., user input of an optical link associated with the set of transmitting nodes).

Element 3004 may include a field that stores information that identifies a component and/or port associated with the node identified by element 3002. In some implementations, element 3004 may include one or more fields that store information that identifies a service state and/or an administrative state associated with the component and/or port identified by element 3004. Additionally, or alternatively, element 3004 may include one or more fields that store information that identifies a parameter (e.g., PO, LPO, OPT, OPR, etc.) associated with the component and/or port identified by element 3004. Additionally, or alternatively, element 3004 may include one or more fields that store information that indicates whether a parameter associated with the component and/or port identified by element 3004 is automatically being updated. Additionally, or alternatively, element 3004 may include one or more fields that store information that indicates whether the component and/or port identified by element 3004 is able to communicate with another component.

Elements 3006-3014 may identify a component and/or port associated with the node identified by element 3002. For example, element 3006 may identify a source/destination component and/or port. Element 3008 may identify an FSM/FMM and/or an add/drop port on an FSM/FMM. Element 3010 may identify an FSM/FMM and/or a line port on an FSM/FMM. Element 3012 may identify an FRM and/or an add/drop port associated with an FRM. Element 3014 may identify an FRM and/or a system port associated with an FRM.

Elements 3006-3014 may include element 3004. For example, elements 3006-3014 may include one or more fields that store information that identifies a service state, an administrative state, a parameter, whether a parameter is being automatically updated, and/or a communication capability, associated with the components identified by elements 3006-3014.

Element 3016 may include a field that stores information that identifies an express node (e.g., a location where a user-specified optical link is received and/or transmitted, but is not added or dropped). For example, element 3016 may identify a node using a number and/or another identifier (e.g., "Node-2"). A set of nodes stored by data structure 3000 may be displayed by UI 700 based on user input (e.g., user input of an optical link associated with the set of transmitting nodes).

Element 3018 may include a field that stores information that identifies a component and/or port associated with the node identified by element 3016. In some implementations, element 3018 may include one or more fields that store information that identifies a service state and/or an administrative state associated with the component and/or port identified by element 3018. Additionally, or alternatively, element 3018 may include one or more fields that store information that identifies a parameter (e.g., PO, LPO, OPT, OPR, etc.) associated with the component and/or port identified by element 3018. Additionally, or alternatively, element 3018 may include one or more fields that store information that indicates whether a parameter associated with the component and/or port identified by element 3018 is automatically being updated. Additionally, or alternatively, element 3018 may include one or more fields that store information that indicates whether the component and/or port identified by element 3018 is able to communicate with another component.

Elements 3020-3026 may identify a component and/or port associated with the node identified by element 3016. For example, element 3020 may identify an FRM and/or an FRM port that receives an optical signal at the node (e.g., from another node). Element 3022 may identify an FRM and/or an FRM port that transmits the signal at the node (e.g., to another FRM on the node). Element 3024 may identify an FRM and/or an FRM port that receives the signal at the node (e.g., from another FRM on the node). Element 3026 may identify an FRM and/or an FRM port that transmits the signal from the node (e.g., to another node).

Elements 3020-3026 may include element 3018. For example, elements 3020-3026 may include one or more fields that store information that identifies a service state, an administrative state, a parameter, whether a parameter is being automatically updated, and/or a communication capability, associated with the components identified by elements 3020-3026.

Figure 31:
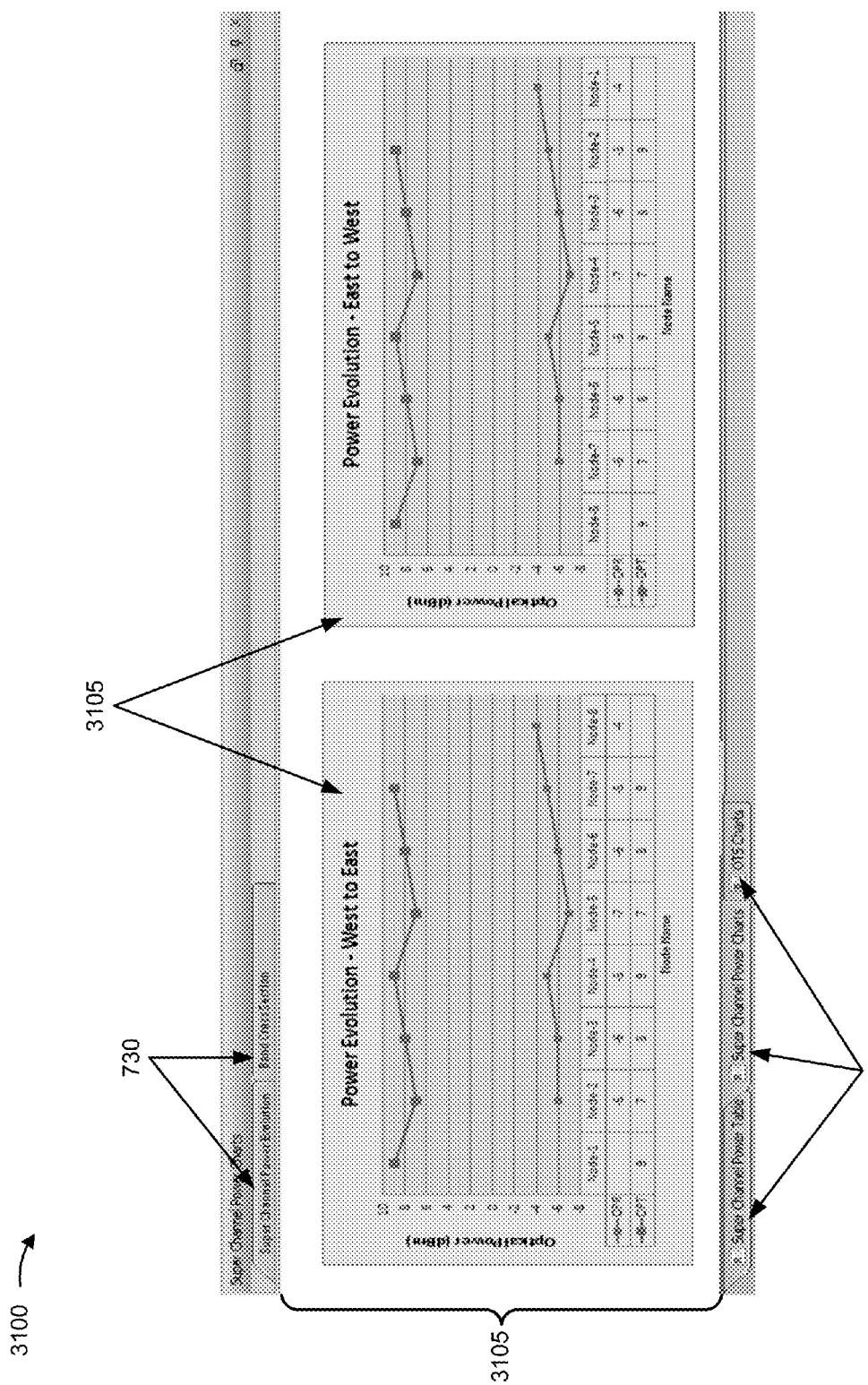

FIG. 31 is a diagram of an example element 3100 of a user interface that displays optical network information. Element 3100 may be displayed by UI 700. Element 3100 may include tab element 725, tab element 730, and an optical link power chart element 3105. Additionally, or alternatively, element 3100 may include fewer elements, additional elements, different elements, or differently arranged elements than those illustrated in FIG. 31.

Optical link power chart element ("OLPCE") 3105 may be displayed based on user selection of a tab element 725 and/or a tab element 730 corresponding to OLPCE 3105, and/or based on user input via user input element 705. In some implementations, user selection of a tab element 725 may cause different tabs to be displayed by tab element 730.

OLPCE 3105 may display information associated with an optical route, information associated with NEs 250, and/or information associated with optical links. The displayed information may be based on user input (e.g., user input of an optical route). In some implementations, OLPCE 3105 may display information (e.g., a power parameter) associated with a set of nodes that are associated with a user-specified optical link. The displayed information may be associated with a data channel (e.g., BAND).

For example, OLPCE 3105 may display a graph of information associated with one or more nodes. The one or more nodes represented on the graph may be based on user input (e.g., user input of an optical route associated with the nodes via user input element 705). The information displayed on the graph may include a node parameter (e.g., a power parameter, a gain parameter, OPR, OPT, PO, LPO, PLO, etc.). The order in which nodes are displayed on the graph may be based on user input (e.g., via option element 830). In some implementations, OLPCE 3105 may display a line graph of OPT and/or OPR for multiple nodes associated with a user-specified route, as illustrated.

Figure 32:
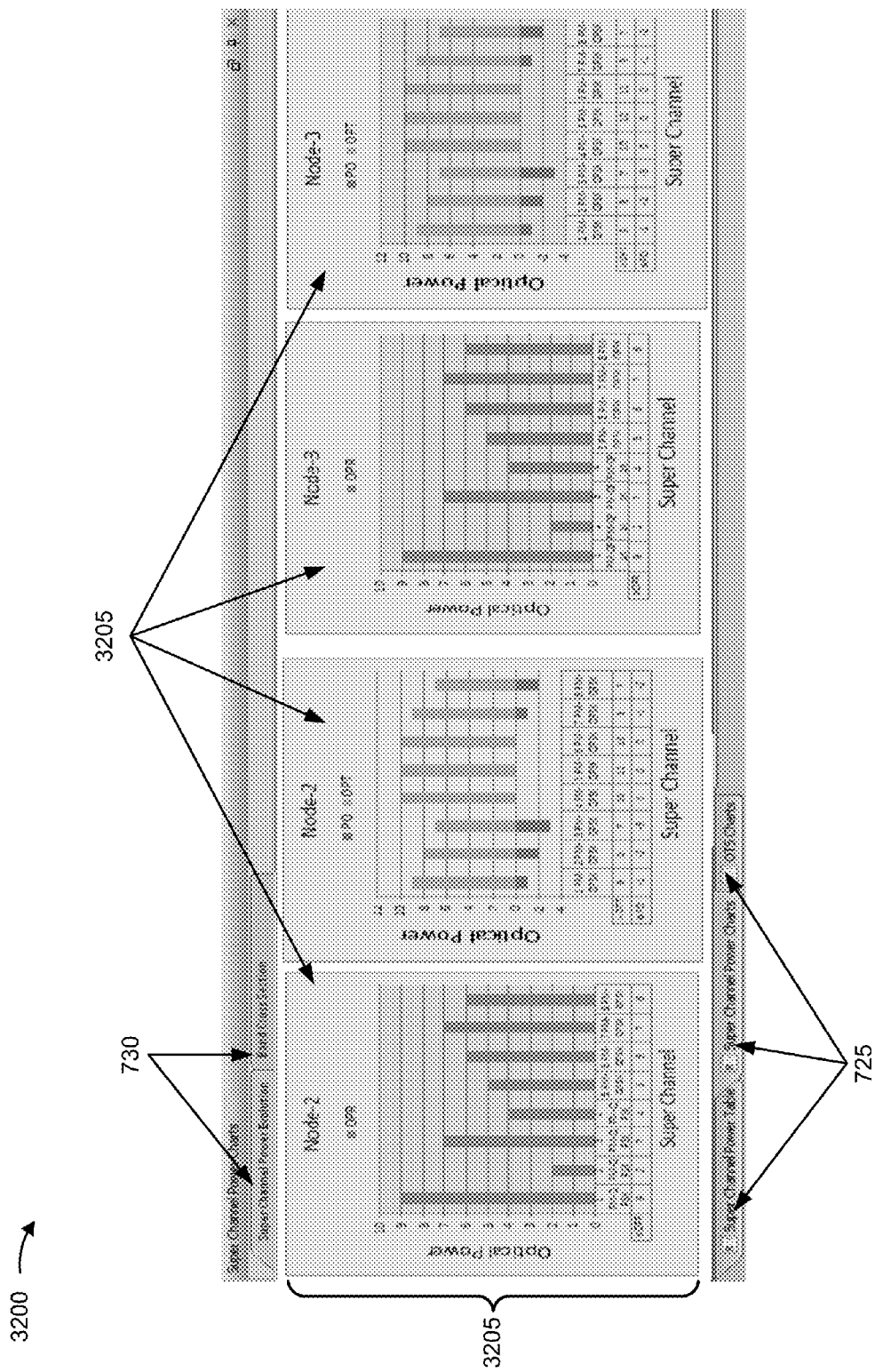

FIG. 32 is a diagram of an example element 3200 of a user interface that displays optical network information. Element 3200 may be displayed by UI 700. Element 3200 may include tab element 725, tab element 730, and a band cross-section chart element 3205. Additionally, or alternatively, element 3200 may include fewer elements, additional elements, different elements, or differently arranged elements than those illustrated in FIG. 32.

Band cross-section chart element ("BCSCE") 3205 may be displayed based on user selection of a tab element 725 and/or a tab element 730 corresponding to BCSCE 3205, and/or based on user input via user input element 705. In some implementations, user selection of a tab element 725 may cause different tabs to be displayed by tab element 730.

BCSCE 3205 may display information associated with an optical route, information associated with NEs 250, and/or information associated with optical links. The displayed information may be based on user input (e.g., user input of an optical route). In some implementations, BCSCE 3205 may display information (e.g., a power parameter) associated with a set of optical links that are associated with a set of user-specified nodes.

For example, BCSCE 3205 may display a graph of information associated with a node. The node represented on the graph may be based on user input (e.g., user input, via user input element 705, of an optical route associated with the node). The information displayed on the graph may include a node parameter (e.g., a power parameter, a gain parameter, OPR, OPT, PO, LPO, PLO, etc.). The order in which nodes are displayed on the graph may be based on user input (e.g., via option element 830). In some implementations, BCSCE 3205 may display a bar graph of OPR, OPT and/or PO values for multiple optical links on a node associated with a user-specified route, as illustrated.

Figure 33:
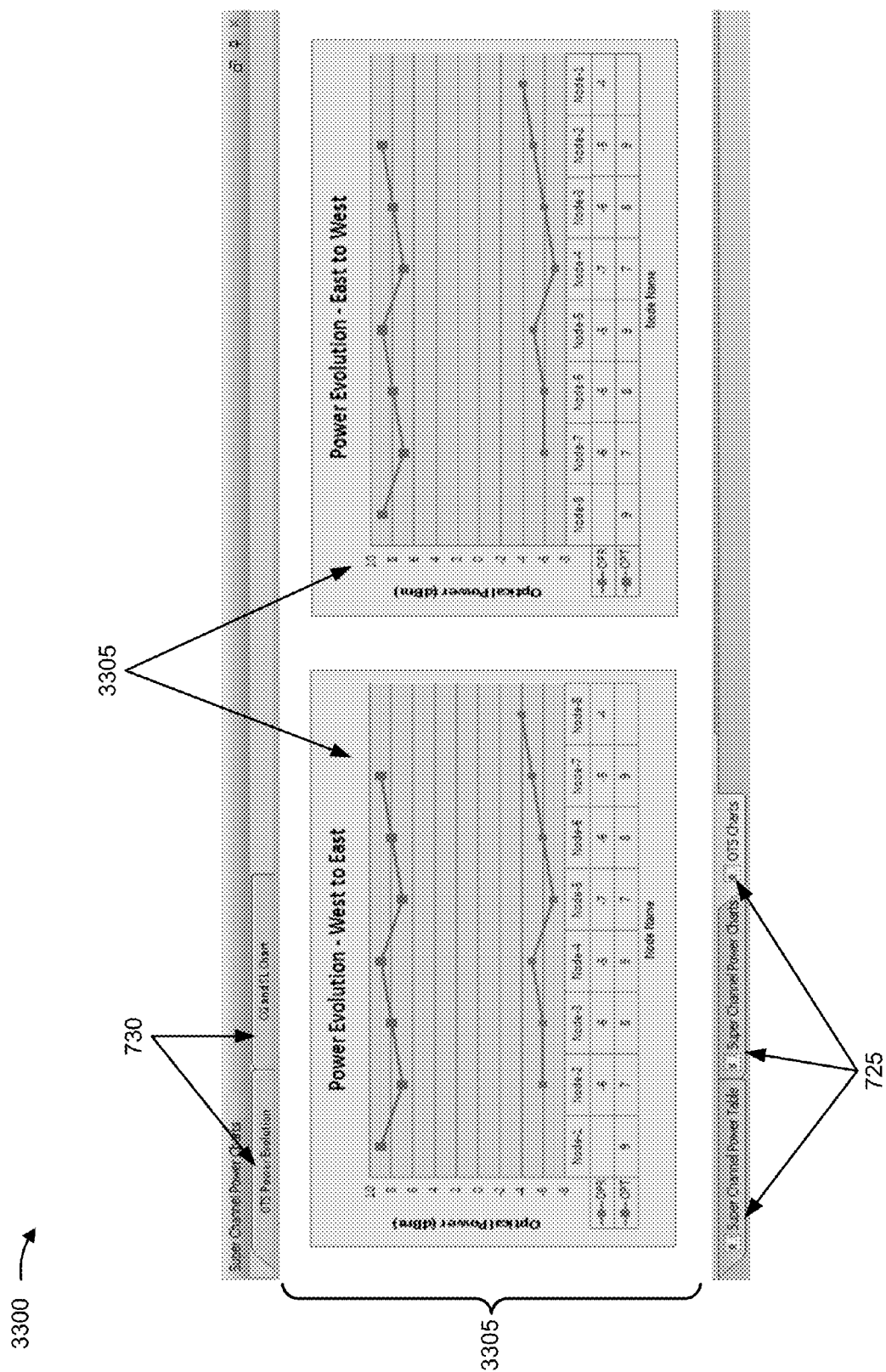

FIG. 33 is a diagram of an example element 3300 of a user interface that displays optical network information. Element 3300 may be displayed by UI 700. Element 3300 may include tab element 725, tab element 730, and an OTS power chart element 3305. Additionally, or alternatively, element 3300 may include fewer elements, additional elements, different elements, or differently arranged elements than those illustrated in FIG. 33.

OTS power chart element 3305 may be displayed based on user selection of a tab element 725 and/or a tab element 730 corresponding to OTS power chart element 3305, and/or based on user input via user input element 705. In some implementations, user selection of a tab element 725 may cause different tabs to be displayed by tab element 730.

OTS power chart element 3305 may display information associated with an optical route, information associated with NEs 250, and/or information associated with optical links. The displayed information may be based on user input (e.g., user input of an optical route). In some implementations, OTS power chart element 3305 may display information (e.g., a power parameter) associated with a set of nodes that are associated with a user-specified optical link. The displayed information may be associated with a combined data channel and control channel (e.g., OTS).

For example, OTS power chart element 3305 may display a graph of information associated with one or more nodes. The one or more nodes represented on the graph may be based on user input (e.g., user input of an optical route associated with the nodes via user input element 705). The information displayed on the graph may include a node parameter (e.g., a power parameter, a gain parameter, OPR, OPT, PO, LPO, PLO, etc.). The order in which nodes are displayed on the graph may be based on user input (e.g., via option element 830). In some implementations, OTS power chart element 3305 may display a line graph of OPT and/or OPR for multiple nodes associated with a user-specified route, as illustrated.

Figure 34:
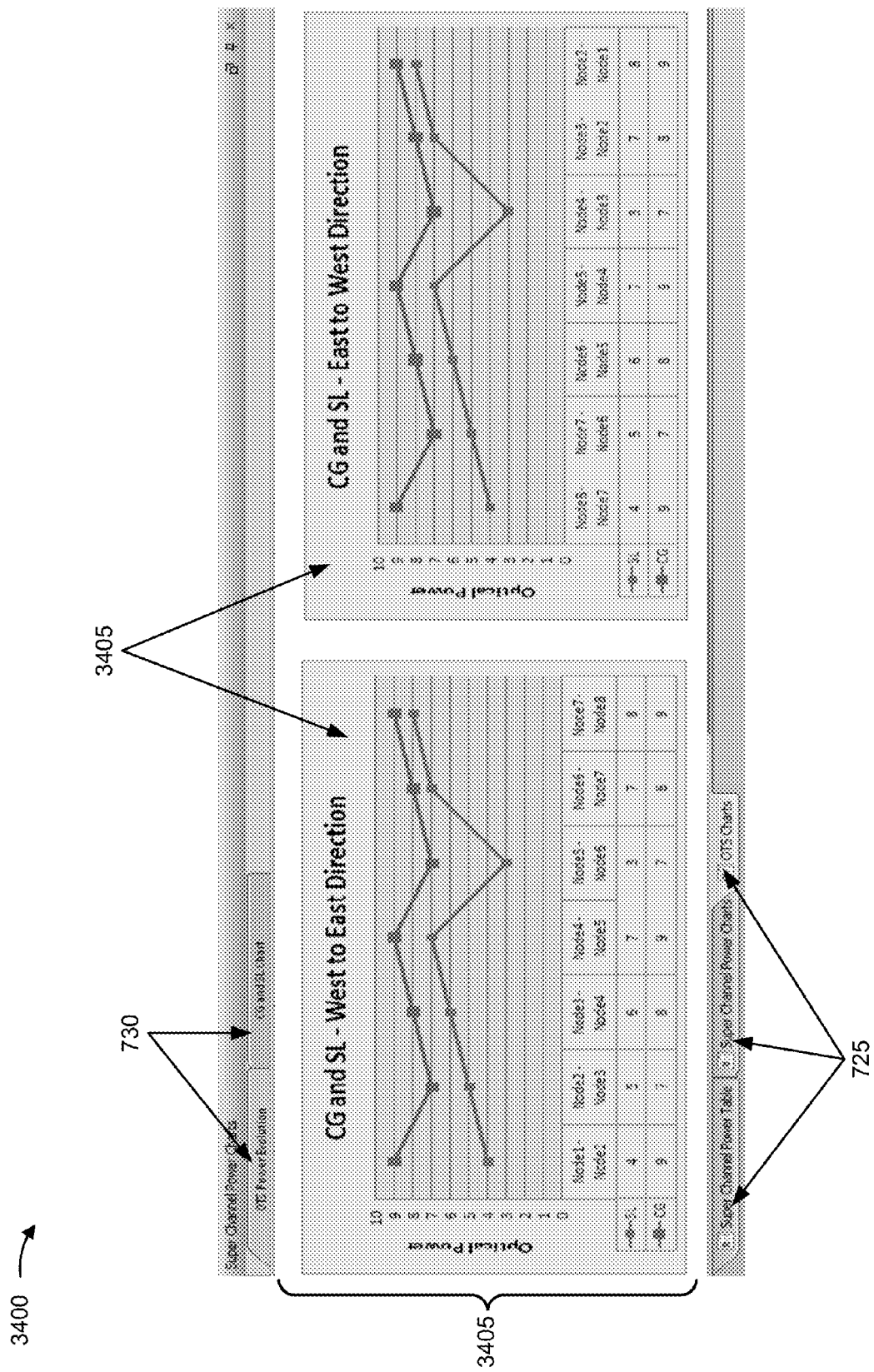

FIG. 34 is a diagram of an example element 3400 of a user interface that displays optical network information. Element 3400 may be displayed by UI 700. Element 3400 may include tab element 725, tab element 730, and a gain/loss chart element 3405. Additionally, or alternatively, element 3400 may include fewer elements, additional elements, different elements, or differently arranged elements than those illustrated in FIG. 34.

Gain/loss chart element ("GLCE") 3405 may be displayed based on user selection of a tab element 725 and/or a tab element 730 corresponding to GLCE 3405, and/or based on user input via user input element 705. In some implementations, user selection of a tab element 725 may cause different tabs to be displayed by tab element 730.

GLCE 3405 may display information associated with an optical route, information associated with NEs 250, and/or information associated with optical links. The displayed information may be based on user input (e.g., user input of an optical route). In some implementations, GLCE 3405 may display information (e.g., a gain parameter, a span loss parameter, etc.) associated with a set of nodes that are associated with a user-specified optical link.

For example, GLCE 3405 may display a graph of information associated with one or more nodes. The one or more nodes represented on the graph may be based on user input (e.g., user input of an optical route associated with the nodes via user input element 705). The information displayed on the graph may include a node parameter (e.g., a power parameter, a gain parameter, OPR, OPT, PO, LPO, PLO, CG, SL, etc.). The order in which nodes are displayed on the graph may be based on user input (e.g., via option element 830). In some implementations, GLCE 3105 may display a line graph of CG and/or SL values for multiple nodes associated with a user-specified route, as illustrated.

Figure 35:
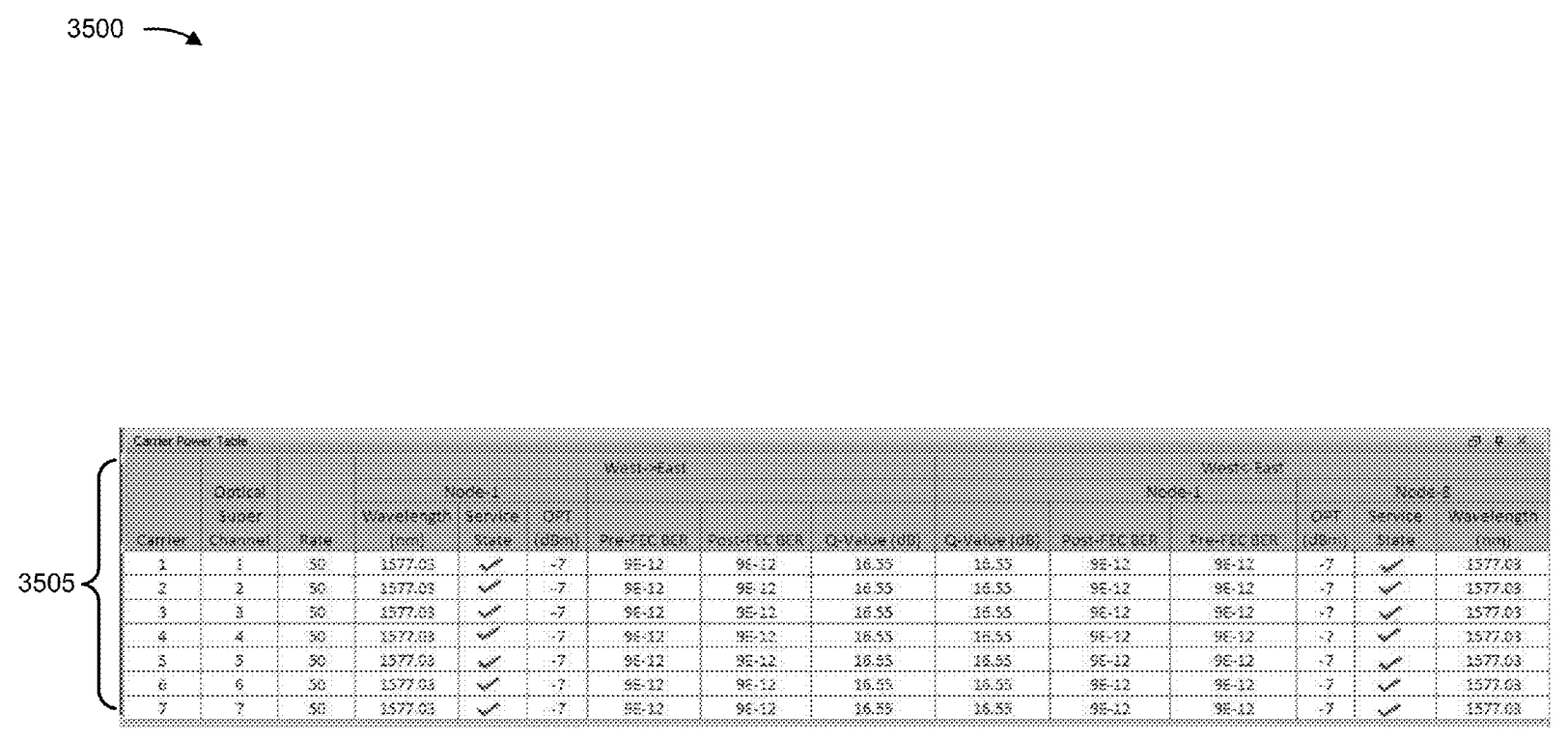

FIG. 35 is a diagram of an example element 3500 of a user interface that displays optical network information. Element 3500 may be displayed by UI 700. Element 3500 may include a carrier power table element 3505. Additionally, or alternatively, element 3500 may include fewer elements, additional elements, different elements, or differently arranged elements than those illustrated in FIG. 35.

Carrier power table element ("CPTE") 3505 may be displayed based on user selection of user input via user input element 705 and/or user selection (e.g., a mouse click) of an element displayed by graphical element 710 and/or chart element 720. In some implementations, CPTE 3505 may display information associated with an optical route, information associated with NEs 250, and/or information associated with optical links. The displayed information may be based on user input (e.g., user input of an optical route).

CPTE 3505 may display information associated with an optical route, information associated with NEs 250, and/or information associated with optical links. The displayed information may be based on user input (e.g., user input of an optical link). In some implementations, CPTE 3505 may display information (e.g., carriers or channels) associated with a an optical link on a user-specified route. For example, the displayed information may be based on user selection of an element displayed by graphical element 710 and/or table element 740.

In some implementations, CPTE 3505 may display power characteristics (e.g., OPT, OPR, PO) for one or more optical links included in a user-specified optical link group. The power characteristics may be displayed for a user-specified route, which may include a source node, a destination node, and/or one or more intermediate nodes that connect the source node to the destination node. CPTE 3505 may show or hide one or more power characteristics based on user input. Additionally, or alternatively, CPTE 3505 may show or hide information (e.g., power characteristics) associated with one or more nodes and/or optical links based on user input (e.g., user input of a set of optical links associated with the nodes).

For example, CPTE 3505 may display OPT and/or OPR for an optical and/or an optical link group on a source node, a destination node, and/or an intermediate node (e.g., in one or both transmission directions).

Figure 36A:
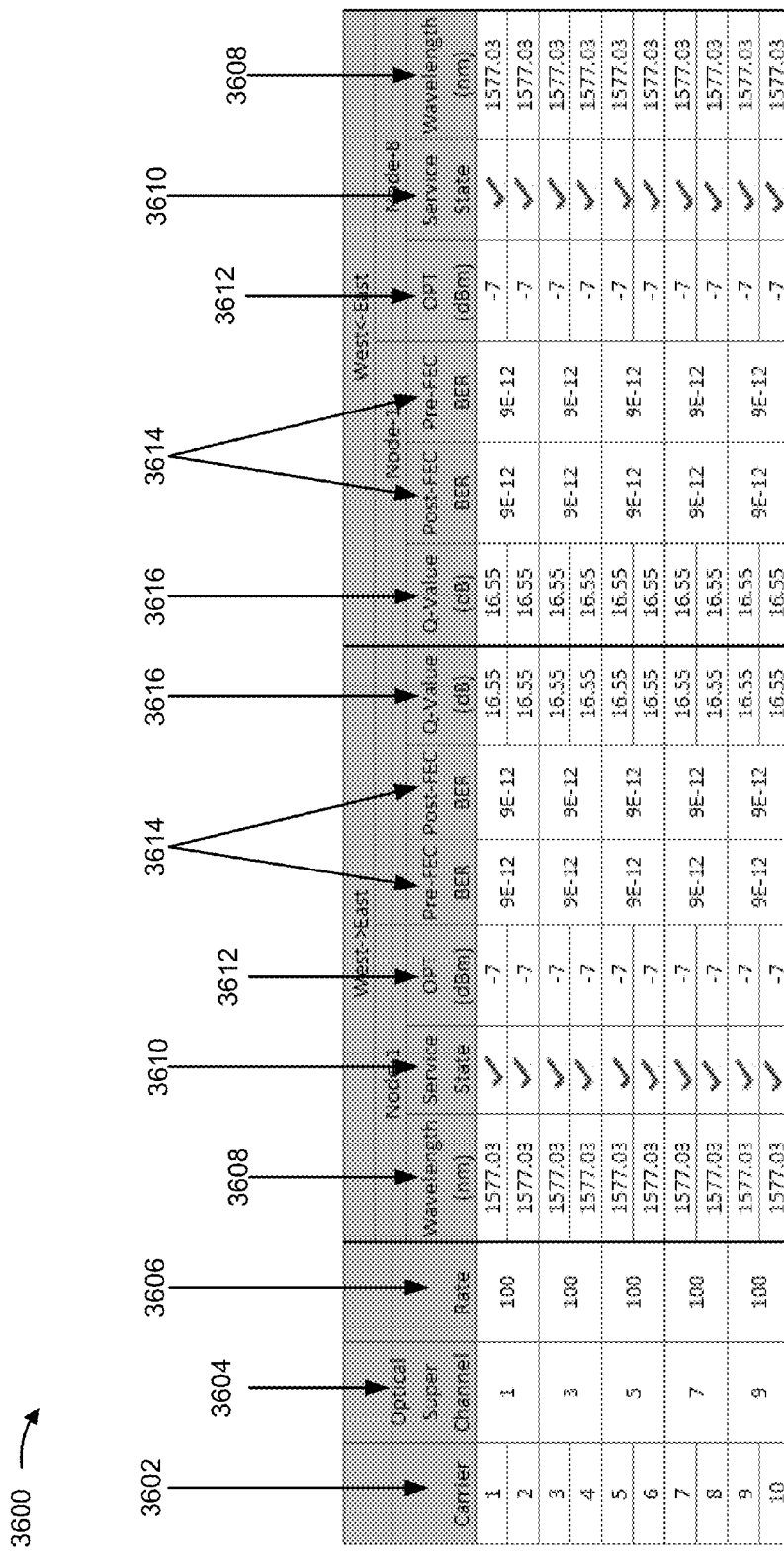

FIG. 36A is a diagram of an example data structure 3600 that stores information associated with an optical network. Data structure 3600 may be stored in a memory device (e.g., RAM, hard disk, etc.) associated with one or more devices and/or components shown in FIGS. 2-4. For example, data structure 3600 may be stored by NA 220 and/or user device 230. In some implementations, information stored by data structure 3600 may be displayed by UI 700 (e.g., by CPTE 3505). For example, data structure 3600 may be represented as a table on UI 700 (e.g., by chart element 720).

Data structure 3600 may include a collection of fields 3602-3616. Data structure 3600 includes fields 3602-3616 for explanatory purposes. In practice, data structure 3600 may include additional fields, fewer fields, different fields, or differently arranged fields than are described with respect to data structure 3600.

Field 3602 may store information that identifies an optical link (e.g., a channel). For example, field 3602 may identify an optical link using a number and/or another identifier (e.g., "1," "CH 1," "6a," etc.). Information associated with a set of optical links stored by data structure 3600 may be displayed by UI 700 based on user input (e.g., user input of an optical route associated with the set of optical links).

Field 3604 may store information that identifies an optical link group (e.g., a super-channel, a super-channel group, etc.) consisting of one or more optical links identified by field 3602. For example, field 3604 may identify an optical link group using a number and/or another identifier (e.g., "1," "SCH 1," "6a," etc.). In FIG. 36A, data structure 3600 may represent a carrier group mode of "dual," where two channels are grouped together to form a super-channel. Thus, the optical link groups identified by field 3604 consist of two optical links identified by field 3602.

Field 3606 may store information that identifies a bandwidth associated with the optical link group identified by field 3604. For example, a bandwidth may be represented in gigahertz (GHz), which may represent an amount of bandwidth allocated to an optical link group for transmission of an optical signal.

Field 3608 may store information that identifies a wavelength associated with the optical link identified by field 3602. For example, each optical link (e.g., channel) may be associated with a different wavelength of light. A wavelength may be represented in nanometers ("nm").

Field 3610 may store information that identifies a service state of a node associated with the optical link identified by field 3602.

Field 3612 may store information that identifies an OPT and/or an OPR associated with a node that transmits and/or receives the optical link identified by field 3602.

Field 3614 may store information that identifies a Pre-FEC BER and/or a Post-FEC BER associated with the optical link group identified by field 3604. In some implementations, multiple optical links may be multiplexed together to form an optical link group. Field 3614 may identify a minimum and/or maximum pre-FEC BER associated with one of the optical links in the optical link group (e.g., an optical link identified by field 3602). Similarly, field 3614 may identify a minimum and/or maximum post-FEC BER associated with one of the optical links in the optical link group.

Field 3616 may store information that identifies a signal quality (e.g., "Q-Val") associated with the optical link identified by field 3602. A signal quality may include a signal-to-noise ratio, a signal interference to noise ratio (SINR), and/or another quality parameter. In some implementations, field 3602 may identify a signal quality associated with a single optical link and/or an optical link group. Additionally, or alternatively, field 3616 may identify a minimum and/or maximum signal quality associated with one of the optical links in the optical link group.

Fields 3608-3616 may be associated with one or more nodes (e.g., a source node and/or a destination node). In some implementations, UI 700 may display the information stored in fields 3608-3616 as being associated with a particular node. Additionally, or alternatively, UI 700 may display fields 3608-3616 in a different manner (e.g., order) based on user input (e.g., via user input element 705 and/or option element 830).

Figure 36B:
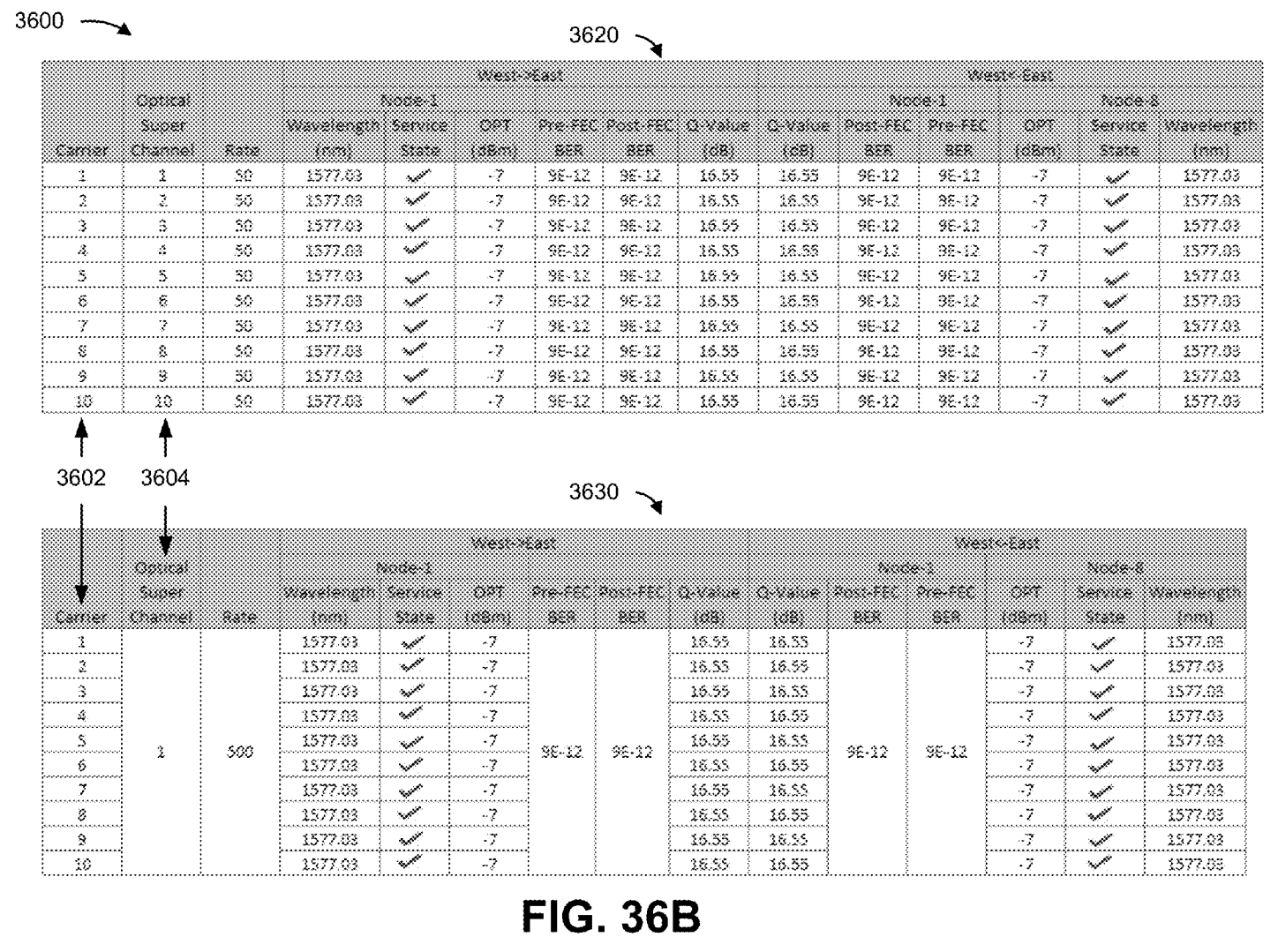

FIG. 36B is a diagram of an example data structure 3600 that stores information associated with an optical network. Data structure 3600 may be stored in a memory device (e.g., RAM, hard disk, etc.) associated with one or more devices and/or components shown in FIGS. 2-4. For example, data structure 3600 may be stored by NA 220 and/or user device 230. In some implementations, information stored by data structure 3600 may be displayed by UI 700 (e.g., by CPTE 3505). For example, data structure 3600 may be represented as a table on UI 700 (e.g., by chart element 720).

Data structure 3600 may include data structure 3620 and/or data structure 3630, both of which may include a collection of fields 3602-3616, as described herein in connection with FIG. 36A. Data structure 3600 includes fields 3602-3616 for explanatory purposes. In practice, data structure 3600 may include additional fields, fewer fields, different fields, or differently arranged fields than are described with respect to data structure 3600.

Field 3602 may store information that identifies an optical link (e.g., a channel). For example, field 3602 may identify an optical link using a number and/or another identifier (e.g., "1," "CH 1," "6a," etc.). Information associated with a set of optical links stored by data structure 3600 may be displayed by UI 700 based on user input.

Field 3604 may store information that identifies an optical link group (e.g., a super-channel) consisting of one or more optical links identified by field 3602. For example, field 3604 may identify an optical link group using a number and/or another identifier (e.g., "1," "SCH 1," "6a," etc.).

In FIG. 36B, data structure 3620 may represent a carrier group mode of "single," where channels are not grouped together to form super-channels (e.g., each channel is kept separate). Thus, the optical link groups identified by field 3604 in data structure 3620 consist of one optical link identified by field 3602. Data structure 3630 may represent a carrier group mode of "all," where ten channels are grouped together to form a super-channel. Thus, the optical link groups identified by field 3604 in data structure 3630 consist of ten optical links identified by field 3602.

Implementations described herein may assist a user in monitoring an optical network. This may be achieved by providing information associated with an optical network on a user device.

The foregoing disclosure provides illustration and description, but is not intended to be exhaustive or to limit the embodiments to the precise form disclosed. Modifications and variations are possible in light of the above disclosure or may be acquired from practice of the embodiments.

Certain implementations are described herein with reference to super-channels. However, implementations described herein may be applied to any optical links between network nodes, such as channels, super-channel, spectral slices, fibers, and/or any other optical data transmission link.

While series of blocks have been described with regard to FIGS. 5 and 6, the order of the blocks may be modified in some implementations. Further, non-dependent blocks may be performed in parallel.

Certain user interfaces have been described with regard to FIGS. 1B, 7, 8, 9A-9C, 10A-10B, 11, 12A-12D, 13, 14A-14C, 15-18, 19A-19D, 20A-20B, 21A-21B, 22A-22B, 23-35, and 36A-36B. In some implementations, the user interfaces may be customizable by a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

Certain data structures have been presented with regard to FIGS. 24-26, 28, 30, 36A, and 36B. These data structures are purely examples and merely serve to facilitate the description of the storage of information.

While the data structures presented with regard to FIGS. 24-26, 28, 30, 36A, and 36B are represented as tables with rows and columns, in practice, the data structures may include any type of data structure, such as a linked list, a tree, a hash table, a database, or any other type of data structure. The data structures may include information generated by a device and/or component. Additionally, or alternatively, the data structures may include information provided from any other source, such as information provided by one or more users, and/or information automatically provided by one or more other devices.

As used herein, the term "component" is intended to be broadly construed as hardware, firmware, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
   one or more processors to:
      receive a first user input that identifies an optical route in an optical network;
      receive a second user input that identifies a view type, where the view type comprises at least one of a data channel view, a control channel view, or an optical link termination view; and
      provide, based on the first user input and the second user input, a user interface that displays:
         a representation of a plurality of components associated with the optical route, the representation of the plurality of components being based on the second user input,
         a representation of one or more ports on each of the plurality of components,
         a representation of a first parameter associated with each of the one or more ports, the representation of the first parameter being based on the second user input, and
         a representation of an optical link associated with the optical route, the representation of the optical link identifying a port on each of the plurality of components that connects the optical link to each of the plurality of components.

2. The system of claim 1, where the first parameter is a power parameter that comprises at least one of an optical power at which an optical transmission is received at a port, of the one or more ports, or an optical power at which the optical transmission is transmitted at the port.

3. The system of claim 2, where:
   when the identified view type includes the data channel view, the power parameter is associated with a data channel associated with the optical transmission,
   when the identified view type includes the control channel view, the power parameter is associated with a control channel associated with the optical transmission, and
   when the identified view type includes the data channel view and the control channel view, the power parameter is associated with the data channel and the control channel.

4. The system of claim 1, where the representation of the one or more ports includes an indication of whether an optical transmission, transmitted via the optical link, is added, dropped, or routed via a component, of the plurality of components, that includes the one or more ports.

5. The system of claim 4, where when the identified view type includes the optical link termination view, the representation of the plurality of components includes a representation of a source device or a destination device via which the optical transmission is added or dropped.

6. The system of claim 4, where the representation of the one or more ports further includes an indication of whether the optical transmission is routed between two components, of the plurality of components, represented on the user interface.

7. The system of claim 1, where the one or more processors are further to:
   provide, on the user interface:
      a representation of an amplification capability associated with a component, of the plurality of components, the representation of the amplification capability including an indication of an amplification direction that identifies a capability of the component to amplify an optical transmission that traverses the component in a particular direction.

8. A non-transitory computer-readable medium, comprising:
   one or more instructions that, when executed by one or more processors, cause the one or more processors to:
      receive a first user input that identifies an optical route in an optical network;
      receive a second user input that identifies a view type; and
      provide, based on the first user input and the second user input, for display:
         a representation of a plurality of components associated with the optical route, the representation of the plurality of components being based on the second user input,
         a representation of one or more ports on each of the plurality of components, a representation of a first parameter associated with each of the one or more ports, the representation of the first parameter being based on the second user input, and a representation of an optical link associated with the optical route, the representation of the optical link identifying a port on each of the plurality of components that connects the optical link to each of the plurality of components.

9. The non-transitory computer-readable medium of claim 8, where the first parameter is a power parameter that comprises at least one of an optical power at which an optical transmission is received at a port, of the one or more ports, or an optical power at which the optical transmission is transmitted at the port.

10. The non-transitory computer-readable medium of claim 9, where the power parameter is associated with at least one of a data channel associated with the optical transmission or a control channel associated with the optical transmission, based on the identified view type.

11. The non-transitory computer-readable medium of claim 8, where the representation of the one or more ports includes an indication of whether an optical transmission, transmitted via the optical link, is added, dropped, or routed via a component, of the plurality of components, that includes the one or more ports.

12. The non-transitory computer-readable medium of claim 11, where when the identified view type indicates that optical link termination devices are to be displayed, the representation of the plurality of components includes a representation of a source device or a destination device via which the optical transmission is added or dropped.

13. The non-transitory computer-readable medium of claim 11, where the representation of the one or more ports further includes an indication of whether the optical transmission is routed between two components, of the plurality of components.

14. The non-transitory computer-readable medium of claim 8, where the view type comprises at least one of a data channel view, a control channel view, or an optical link termination view.

15. A method, comprising:
receiving, by a device, a first user input that identifies an optical route in an optical network; and
providing, by the device and based on the first user input, a user interface that displays:
a representation of a plurality of components associated with the optical route,
a representation of an amplification capability associated with a component, of the plurality of components, the representation of the amplification capability including an indication of an amplification direction that identifies a capability of the component to amplify an optical transmission that traverses the component in a particular direction,
a representation of one or more ports associated with each of the plurality of components,
a representation of a power parameter associated with each of the one or more ports, the power parameter comprising at least one of an optical power at which the optical transmission is received at a port, of the one or more ports, or an optical power at which the optical transmission is transmitted at the port, and
a representation of an optical link associated with the optical route, the representation of the optical link identifying a port on each of the plurality of components that connects the optical link to each of the plurality of components.

16. The method of claim 15, where the representation of the one or more ports includes an indication of whether the optical transmission is added, dropped, or routed via the component that includes the one or more ports.

17. The method of claim 16, where the representation of the one or more ports further includes an indication of whether the optical transmission is routed between two components, of the plurality of components.

18. The method of claim 15, further comprising:
receiving a second user input that identifies a view type; and
where the representation of the plurality of components and the representation of the power parameter are based on the second user input.

19. The method of claim 18, where the view type comprises at least one of a data channel view, a control channel view, or an optical link termination view.

20. The method of claim 19, where when the identified view type includes the optical link termination view, the representation of the plurality of components includes a representation of a source device or a destination device via which the optical transmission is added or dropped.

* * * * *